(12) United States Patent
Inoue et al.

(10) Patent No.: US 8,443,377 B2
(45) Date of Patent: May 14, 2013

(54) PARALLEL PROCESSING SYSTEM RUNNING AN OS FOR SINGLE PROCESSORS AND METHOD THEREOF

(75) Inventors: Hiroaki Inoue, Tokyo (JP); Junji Sakai, Tokyo (JP); Tsuyoshi Abe, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 1439 days.

(21) Appl. No.: 11/080,730

(22) Filed: Mar. 16, 2005

(65) Prior Publication Data

US 2005/0229184 A1  Oct. 13, 2005

(30) Foreign Application Priority Data

Mar. 17, 2004 (JP) .................. 2004-077249

(51) Int. Cl.
*G06F 3/00* (2006.01)
*G06F 13/00* (2006.01)

(52) U.S. Cl.
USPC ............ 719/313; 719/314; 719/316; 718/100

(58) Field of Classification Search ............... 719/313, 719/314, 316; 718/100
See application file for complete search history.

(56) References Cited

U.S. PATENT DOCUMENTS

| | | | |
|---|---|---|---|
| 5,142,684 A | 8/1992 | Perry et al. | |
| 5,317,747 A | 5/1994 | Mochida et al. | |
| 5,652,885 A * | 7/1997 | Reed et al. | 713/1 |
| 5,754,854 A | 5/1998 | Kanamori et al. | |
| 5,999,964 A | 12/1999 | Murakata et al. | |
| 6,542,908 B1 | 4/2003 | Ims | |
| 6,567,861 B1 | 5/2003 | Kasichainula et al. | |
| 6,820,264 B1 * | 11/2004 | Bashkansky et al. | 719/310 |
| 2003/0182355 A1 * | 9/2003 | Edahiro et al. | 709/106 |

FOREIGN PATENT DOCUMENTS

| | | |
|---|---|---|
| GB | 2 326 255 A | 12/1998 |
| GB | 2 389 932 A | 12/2003 |
| JP | 03-113563 | 5/1991 |
| JP | 03-257652 | 11/1991 |
| JP | 05-324574 | 12/1993 |
| JP | 06-075883 | 3/1994 |
| JP | 07-084804 | 3/1995 |
| JP | 3120963 | 10/2000 |
| JP | 2003-058515 | 2/2003 |
| JP | 2003-345614 | 12/2003 |
| JP | 2003-345614 A | 12/2003 |

* cited by examiner

*Primary Examiner* — H. S. Sough
*Assistant Examiner* — Kimberly Jordan
(74) *Attorney, Agent, or Firm* — Foley & Lardner LLP

(57) ABSTRACT

On a parallel processing system by an OS for single processors which operates, on a multiprocessor, an OS for single processors and an existing application to realize parallel processing by the multiprocessor with respect to the application, each processor includes a communication proxy unit which transfers data between tasks spreading over the processors by proxy and the communication proxy unit on a processor in which a task on a transmission side operates holds information about an address, on a processor, of a task on a reception side to receive data transferred from the task on the transmission side as proxy for the task on the reception side.

22 Claims, 37 Drawing Sheets

FIG.22 (MESSAGE RECEPTION OPERATION BY MESSAGE QUEUE SYSTEM)

FIG. 24 (MESSAGE TRANSMISSION OPERATION BY MESSAGE QUEUE SYSTEM)

PARALLEL PROCESSING SYSTEM RUNNING AN OS FOR SINGLE PROCESSORS AND METHOD THEREOF

BACKGROUNDS OF THE INVENTION

1. Field of the Invention

The present invention relates to an inter-processor communication system in a parallel processing system by a multiprocessor and, more particularly, to an inter-processor communication system in a parallel processing system by an OS for single processors which operates, on a multiprocessor, an OS for single processors and an existing application to enable the application to realize parallel processing by the multiprocessor.

2. Description of the Related Art

In data processing devices such as portable terminals including a cellular phone and a portable PC, it is a current practice that an operating system for single processors (hereinafter referred to as an OS for single processors) and an application for single processors (hereinafter simply referred to as an application) are executed basically on a single processor.

Under these circumstances, when using the above-described application on a multiprocessor basis without modification, the application should be executed on an OS for multiprocessors in place of the above-described OS for single processors.

Among such systems which control execution of an OS for multiprocessors and an application on a multiprocessor system as described above are, for example, the conventional art disclosed in Japanese Patent Laying-Open (Kokai) No. Heisei 3-257652 and Japanese Patent Laying-Open (Kokai) No. Heisei 3-113563.

Japanese Patent Laying-Open (Kokai) No. Heisei 3-257652 (Literature 1) discloses a method of controlling interruptions between processor elements in a multiprocessor system composed of a plurality of processor elements.

Japanese Patent Laying-Open (Kokai) No. Heisei 3-113563 (Literature 2) discloses a method of scheduling processes to be assigned to a plurality of processors in a multiprocessor system.

On the other hand, Japanese Patent Laying-Open (Kokai) No. 2003-058515 (Literature 3) discloses a method of executing an individual process in a plurality of processor elements.

When on an OS for multiprocessors, operating an existing application as in conventional art, however, the OS for multiprocessors provides services for multiprocessors even when the application uses only one among a plurality of the processors, or continues processing mutually exclusive of other processors even when no other application operates, so that the extra processing causes overheads and modifying the above-described application so as to be used for multiprocessors requires enormous labor and costs.

In particular, when realizing a parallel processing system by a multiprocessor in such small-sized data processing devices as portable terminals including a cellular phone and a portable PC, overheads in processing of an OS for multiprocessors and modification of an application become hindrances.

Under these circumstances, when an application is used without modification on an existing OS for single processors, demanded is realization of a parallel processing system by an OS for single processors that is capable of operating, on a multiprocessor, an existing application without modification, for which proposed is, for example, the parallel processing system by an OS for single processor whose patent application is filed by the applicant of the present invention and is disclosed in Japanese Patent Laying-Open No. 2003-345614 (Literature 4).

Furthermore, in conventional multiprocessor systems by an OS for multiprocessors, communication between tasks in the same processor is realized by using a UNIX domain socket and communication between tasks operating on the respective processors is realized by using a TCP/IP protocol. In other words, data communication between tasks is realized differently in the same processor and between processors by using different communication systems.

An application executed in a processor on which an OS for single processors operates is basically allowed to communicate within the same processor by using a dedicated communication system provided in the OS.

Therefore, for operating such an application between different processors on a multiprocessor system to enable data transfer between the processors similarly to a multiprocessor system by an OS for multiprocessors, modification of the application is required to have a function which enables data communication between processors.

When realizing, in small-sized data processing devices such as portable terminals including a cellular phone and a portable PC, a parallel processing system which operates an OS for single processors on each processor of multiprocessors, the above-described need of modification of an application bottlenecks the system realization.

Under these circumstances, demanded is such a parallel processing system as operates an OS for single processors on each of multiprocessors and as enables, without modification of an application for the OS for single processors, inter-processor communication by the application.

SUMMARY OF THE INVENTION

An object of the present invention is to provide an inter-processor communication system enabling, on a parallel processing system by an OS for single processors which operates, on a multiprocessor, an OS for single processors and an existing application without modifying them to enable the existing application to realize parallel processing by the multiprocessor, data transfer between processors by the application.

According to one aspect of the invention, an inter-processor communication system in a parallel processing system by an OS for single processors, wherein on a parallel processing system which operates, on a multiprocessor, an OS for single processors and an application, the multiprocessor being logically divided into two groups of a first processor side and a second processor side, and controls a unit of work which operates on a processor on the first processor side and can be parallelized within the application as a new unit of work on a processor on the second processor side, thereby executing parallel processing by the multiprocessor with respect to the application, each the processor includes a communication proxy unit which transfers data between units of work spreading over the processors by proxy.

In the preferred construction, the communication proxy unit on a processor in which a unit of work on a transmission side operates holds information about an address, on a processor, of a unit of work on the reception side to receive data transferred from the unit of work on the transmission side as proxy for the unit of work on the reception side.

In another preferred construction, address information of a processor in which a unit of work on a reception side operates and processing information containing information about a path, in a processor, of the unit of work are transferred by multicasting to the communication proxy unit on other processor, and the communication proxy unit on the other processor receives the processing information to enter a state of receiving data as proxy for the unit of work on the reception side.

In another preferred construction, the communication proxy unit on a processor in which a unit of work on a transmission side operates receives data transmitted from the OS for single processors as proxy for a unit of work on the reception side in response to a request from a unit of work on the transmission side, and transmits the received data to the communication proxy unit on a processor on the reception side through a predetermined data transfer unit which executes communication among the processors, and the communication proxy unit on the processor on the reception side which has received the data requests the OS for single processors on the reception side processor to transfer data to the unit of work.

In another preferred construction, the communication proxy unit processes data transfer between units of work spreading over the processors by proxy by a communication system using a socket.

In another preferred construction, the communication proxy unit processes data transfer between units of work spreading over the processors by proxy by a communication system using a message queue or FIFO.

In another preferred construction, the inter-processor communication system comprises an OS proxy unit which hooks calling of a binding processing function made by a unit of work on a reception side to request the OS for single processors for binding processing by proxy, wherein the OS proxy unit notifies binding processing information containing path information of the unit of work on the reception side by broadcasting to the communication proxy unit of other processor.

In another preferred construction, the communication proxy unit communicates with a unit of work in a processor to which the unit belongs based on an inter-process communication system enabling communication only within the processor to which the unit belongs.

In another preferred construction, the inter-process communication system enabling communication only within the processor to which the unit belongs is a UNIX domain socket.

According to another aspect of the invention, an inter-processor communication system in a parallel processing system by an OS for single processors, wherein on a parallel processing system which operates, on a multiprocessor, an OS for single processors and an application, and controls a unit of work which operates on one processor and can be parallelized within the application as a new unit of work on other processor, thereby executing parallel processing by the multiprocessor with respect to the application, each the processor includes a communication proxy unit which transfers data between units of work spreading over the processors by proxy.

In the preferred construction, the communication proxy unit on a processor in which a unit of work on a transmission side operates holds information about an address, on a processor, of a unit of work on the reception side to receive data transferred from the unit of work on the transmission side as proxy for the unit of work on the reception side.

In another preferred construction, address information of a processor in which a unit of work on a reception side operates and processing information containing information about a path, in a processor, of the unit of work are transferred by multicasting to the communication proxy unit on other processor, and the communication proxy unit on the other processor receives the processing information to enter a state of receiving data as proxy for the unit of work on the reception side.

In another preferred construction, the communication proxy unit on a processor in which a unit of work on a transmission side operates receives data transmitted from the OS for single processors as proxy for a unit of work on the reception side in response to a request from a unit of work on the transmission side, and transmits the received data to the communication proxy unit on a processor on the reception side through a predetermined data transfer unit which executes communication among the processors, and the communication proxy unit on the processor on the reception side which has received the data requests the OS for single processors on the reception side processor to transfer data to the unit of work.

In another preferred construction, the communication proxy unit processes data transfer between units of work spreading over the processors by proxy by a communication system using a socket.

In another preferred construction, the communication proxy unit processes data transfer between units of work spreading over the processors by proxy by a communication system using a message queue or FIFO.

According to another aspect of the invention, an inter-processor communication system in a parallel processing system by an OS for single processors, wherein on a parallel processing system which operates, on a multiprocessor, an OS for single processors and a unit of work as a task, each the processor includes a communication proxy unit which transfers data between units of work spreading over the processors by proxy.

In the preferred construction, the communication proxy unit on a processor in which a unit of work on a transmission side operates holds information about an address, on a processor, of a unit of work on the reception side to receive data transferred from the unit of work on the transmission side as proxy for the unit of work on the reception side.

In another preferred construction, address information of a processor in which a unit of work on a reception side operates and processing information containing information about a path, in a processor, of the unit of work are transferred by multicasting to the communication proxy unit on other processor, and the communication proxy unit on the other processor receives the processing information to enter a state of receiving data as proxy for the unit of work on the reception side.

In another preferred construction, the communication proxy unit on a processor in which a unit of work on a transmission side operates receives data transmitted from the OS for single processors as proxy for a unit of work on the reception side in response to a request from a unit of work on the transmission side, and transmits the received data to the communication proxy unit on a processor on the reception side through a predetermined data transfer unit which executes communication among the processors, and the communication proxy unit on the processor on the reception side which has received the data requests the OS for single processors on the reception side processor to transfer data to the unit of work.

In another preferred construction, the communication proxy unit processes data transfer between units of work spreading over the processors by proxy by a communication system using a socket.

In another preferred construction, the communication proxy unit processes data transfer between units of work spreading over the processors by proxy by a communication system using a message queue or FIFO.

According to a further aspect of the invention, an inter-processor communication program in a parallel processing system by an OS for single processors, wherein on a parallel processing system which operates, on a multiprocessor, an OS for single processors and an application, the multiprocessor being logically divided into two groups of a first processor side and a second processor side, and controls a unit of work which operates on a processor on the first processor side and can be parallelized within the application as a new unit of work on a processor on the second processor side, thereby executing parallel processing by the multiprocessor with respect to the application, each the processor executes a communication proxy function of transferring data between units of work spreading over the processors by proxy.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, description will be made of a parallel processing system by an OS for single processors to which an inter-processor communication system of the present invention is applied. In the parallel processing system which will be described in the following, parallel processing is executed on a multiprocessor by adding a mechanism of asking a plurality of processors for processing or adding a mechanism of protecting a critical section in providing OS services to a plurality of processors without giving any modification to a conventional OS for single processors.

Figure 1:
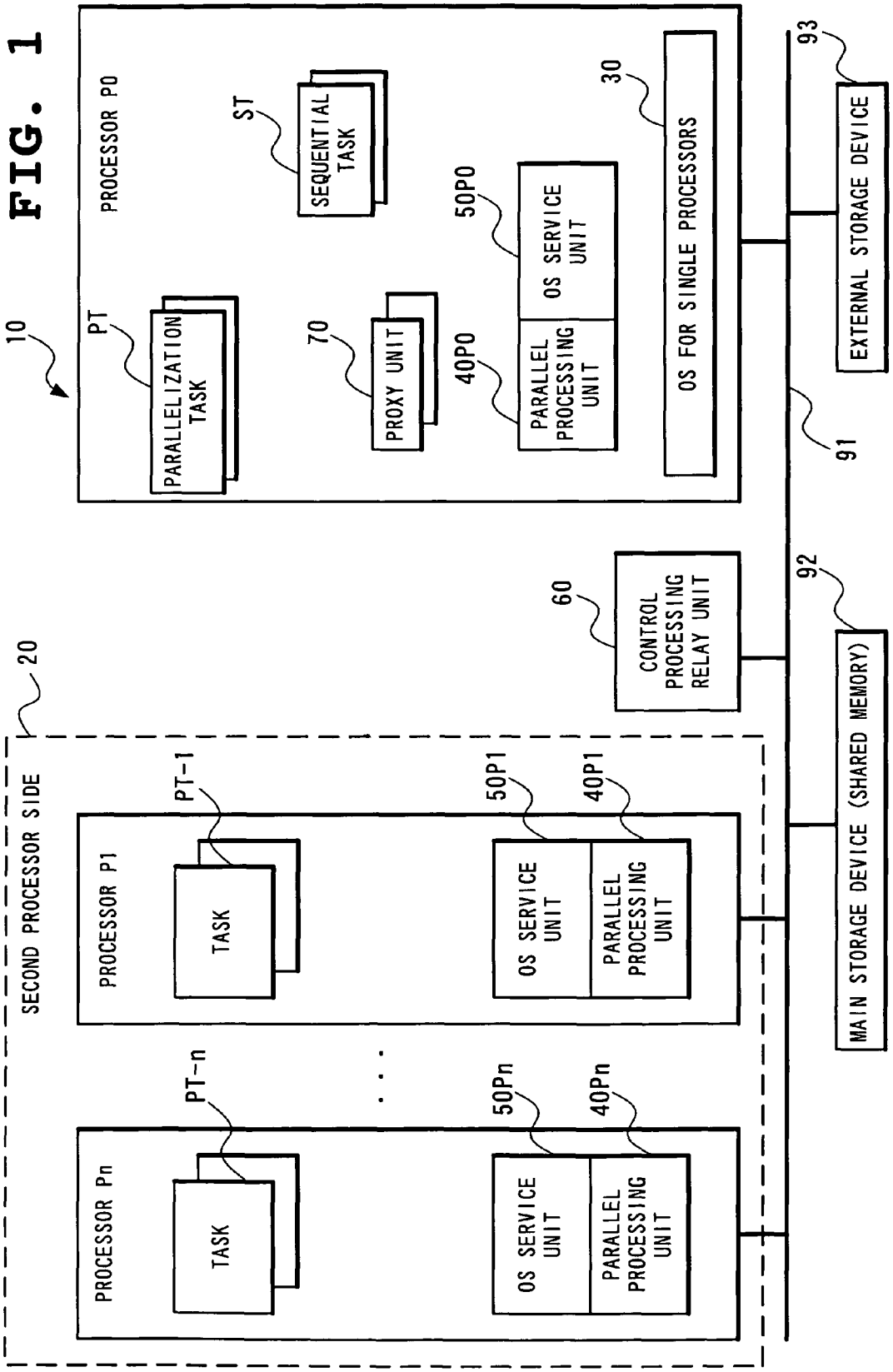
FIG. 1 is a block diagram showing a structure of a parallel processing system according to a first example of the present invention.

FIG. 1 is a block diagram showing a structure of a parallel processing system as a first example.

As shown in FIG. 1, the parallel processing system of the first example includes a multiprocessor composed of a plurality of processors (CPU) P0 to Pn (n is an integer not less than 1) connected through a system bus 91, which is logically divided into two groups of a first processor side 10 and a second processor side 20, with an OS 30 for single processors mounted which operates on the processor P0 on the first processor side 10 and with parallel processing units 40P0 to 40Pn for executing parallel processing and OS service units 50P0 to 50Pn for processing OS service mounted on the processor P0 on the first processor side 10 and the processors P1 to Pn on the second processor side 20, respectively. Connected to the system bus 91 are a main storage device 92 as a shared memory shared by the respective processors P0 to Pn and an external storage device 93 such as a disk device.

The above-described multiprocessor may be structured not only to include a plurality of processors of the same kind but also to include a plurality of processing devices of different kinds such as a DSP and a security engine.

Between the first processor side 10 and the second processor side 20, a control processing relay unit 60 is uniquely provided for transmitting and receiving a control signal and data and a proxy unit 70 is provided on the first processor side 10 through which the OS 30 for single processors communicates with a task executed on the second processor side 20.

The processor on the above-described first processor side 10 does not necessarily exist as a single processor but exist as a plurality of processors. It is possible, for example, that two processors are provided on the first processor side 10 and each is mounted with a different OS for single processors.

Used as the OS 30 for single processors activated by the processor on the first processor side 10 is an existing OS. For example, a real time OS and a UNIX OS are used without modification.

Task used in this specification represents a unit of work for executing parallel processing of a process and a thread on a UNIX OS, a task on a real time OS and the like.

In the parallel processing system of the present example, an application operates on the OS for single processors on the first processor side 10 and among the units of work of the application, a task (sequential task) which can not be parallelized is processed by the processor P0 on the first processor side 10 and a task which can be parallelized within the application is created as a new task on the second processor side 20 and parallel-processed.

The parallel processing unit 40P0 and the parallel processing units 40P1 to 40Pn have a function of performing creation, activation, stop, termination and deletion of a task and other control related to tasks. Here, the parallel processing unit 40P0 of the first processor side 10 executes such processing as creation, activation, stop, termination and deletion of a task through the control processing relay unit 60 with respect to the parallel processing units 40P1 to 40Pn of the respective processors P1 to Pn on the second processor side 20. As to signal notification, it is processed bidirectionally from both the parallel processing unit 40P0 and the parallel processing units 40P1 to 40Pn.

The OS service unit 50P0 and the OS service units 50P1 to 50Pn have a function as an interface for conducting various kinds of accesses to an external apparatus and control of the same and an interface for conducting various kinds of accesses to a resource shared among tasks and control of the same.

The control processing relay unit 60 is a unit for transmitting and receiving a control signal and data between the first processor side 10 and the second processor side 20 and used in control between a plurality of tasks processed in parallel to each other by a plurality of processors.

The proxy unit 70 is associated with tasks (a part or all of them) executed on the second processor side 20 and is mounted for signal notification (notification of various kinds of control signals for controlling tasks) between the task on the second processor side 20 and the OS 30 for single processors.

In the following, detailed description will be made of operation of thus structured parallel processing system of the first example with reference to the drawings.

Assume here that the application operates on the OS for single processors on the first processor side 10 and among the units of work of the application, a unit to be processed by the processor P0 on the first processor side 10 is defined as a sequential task ST and a unit of work which is a task that can be parallelized within the application and is parallel-processed by the second processor side 20 as tasks PT-1 to PT-n is defined as a parallelization task PT.

Figure 2:
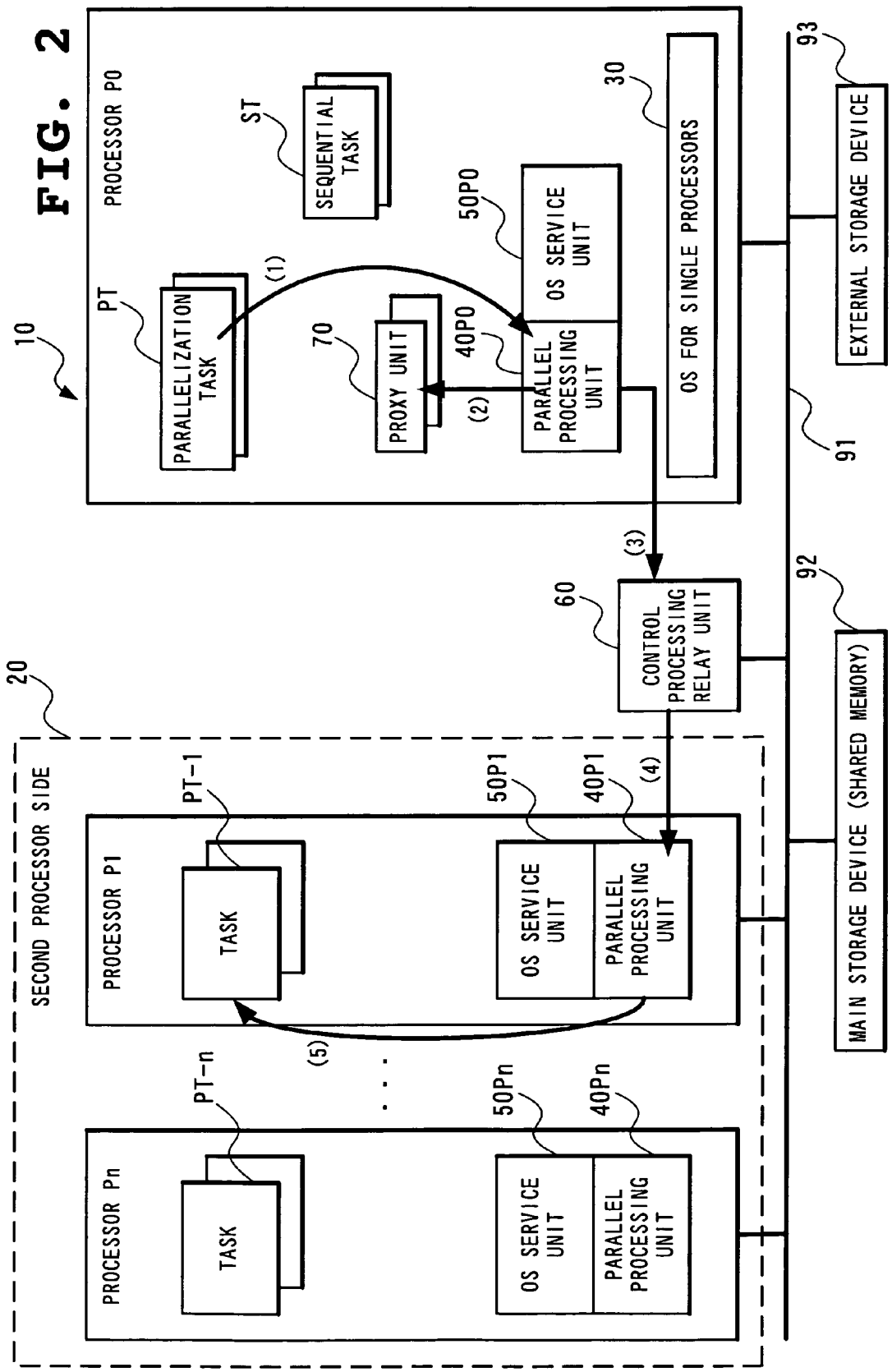
FIG. 2 is a diagram for use in explaining operation of activating parallel processing by a parallel processing unit in the parallel processing system according to the first example.

First, description will be made of operation of activating parallel processing by the parallel processing units 40P0 and 40P1~40Pn with reference to FIGS. 2 and 3.

(1) In a case of activating the parallelization task PT on the first processor side 10 as any of the tasks PT-1 to PT-n on the second processor side 20, command the parallel processing unit 40P0 to create any of the tasks PT-1 to PT-n as a unit of work to be activated on the second processor side 20.

Commands from the parallel processing unit 40P0 and the parallel processing units 40P1 to 40Pn include, for example, create (task creation), delete (task deletion), activate (task activation), terminate (task termination), signal (signal command), etc. Among those commands, create (task creation), delete (task deletion), activate (task activation) and terminate (task termination) are commands sent from the first processor side 10 to the second processor side 20 and a signal (signal command) is sent bidirectionally both from the first processor side 10 and the second processor side 20.

Figure 3:
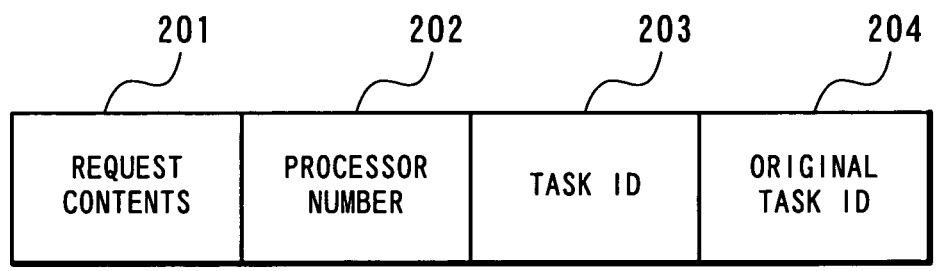
FIG. 3 is a diagram showing arrangement of a message for making a request in the parallel processing activation by the parallel processing unit of the parallel processing system.

These commands are made by a message as shown in FIG. 3. More specifically, by transmitting to the parallel processing unit 40P0 a message composed of a request contents 201 indicative of the contents of a request (task creation in this case), a processor number 202 designating the processor P1~Pn on the second processor side 20 which is to process the task, a task number indicative of the task PT-1~PT-n to be newly created and an original task number indicative of a parallelization task PT requesting task creation, task creation is requested. As to other commands than the task creation, the commands will be sent according to the message shown in FIG. 3.

(2) The parallel processing unit 40P0 responsively activates the proxy unit 70 corresponding to the task PT-1~PT-n to be created. The proxy unit 70 is activated in order to prevent management contents of the task from being shared between the first processor side 10 and the second processor side 20 and to complete the exclusive processing on the first processor side 10. At this time, the task number of the task PT-1~PT-n is held in the proxy unit 70.

(3) The parallel processing unit 40P0 further sets data necessary for task creation such as the above-described task number and request contents (task creation on the processors P1 to Pn on the second processor side 20) and communication reason information designating "parallel processing" at the control processing relay unit 60.

This processing results in conducting, for the control processing relay unit 60, setting of contents to be communicated to the main storage device 92 (shared memory) which will be described later and processing for inter-processor interruption.

Here, communication reason information represents a recipient (accepter) of data transferred to the control processing relay unit 60 and in the above-described case, data set in the control processing relay unit 60 will be obtained by the parallel processing unit 40P1~40Pn of the designated processor P1~Pn.

(4) The parallel processing unit 40P1~40Pn on the designated processor P1~Pn on the second processor side 20 obtains the request contents (data required for task control) having "parallel processing" as the communication reason information from the control processing relay unit 60.

(5) Then, the parallel processing unit 40P1~40Pn creates and activates the task PT-1~PT-n on the processor P1~Pn based on the request contents obtained.

The foregoing processing enables a unit of work of the parallelization task PT as a unit of work of the application operating on the OS for single processors on the first processor side 10 to be parallel-processed as the task PT-1~PT-n on the second processor side 20.

Although the foregoing operation has been described with respect to a case where the parallel processing units 40P1 to 40Pn create and activate the tasks PT-1 to PT-n on the processors P1 to Pn based on the obtained request contents, the parallelization task PT on the first processor side 10 may be created in advance as any of the tasks PT-1 to PT-n on the second processors side 20 and the parallel processing units 40P1 to 40Pn may activate the tasks PT-1 to PT-n on the processors P1 to Pn based on the obtained request contents.

Next, description will be made of OS service processing operation executed by the OS service units 50P0 and 50P1~50Pn.

The OS service units 50P0 and 50P1~50Pn have a function of providing, based on a command from the tasks PT-1 to PT-n created on the processors P1 to Pn on the second processor side 20, services related to various kinds of accesses to an external apparatus and control of the same and various kinds of accesses to a resource shared by other task and control of the same which are the services by the OS30 for single processors. The main target services provided by the OS30 for single processors are equivalents of a system call and an API provided by an ordinary OS.

Figure 4:
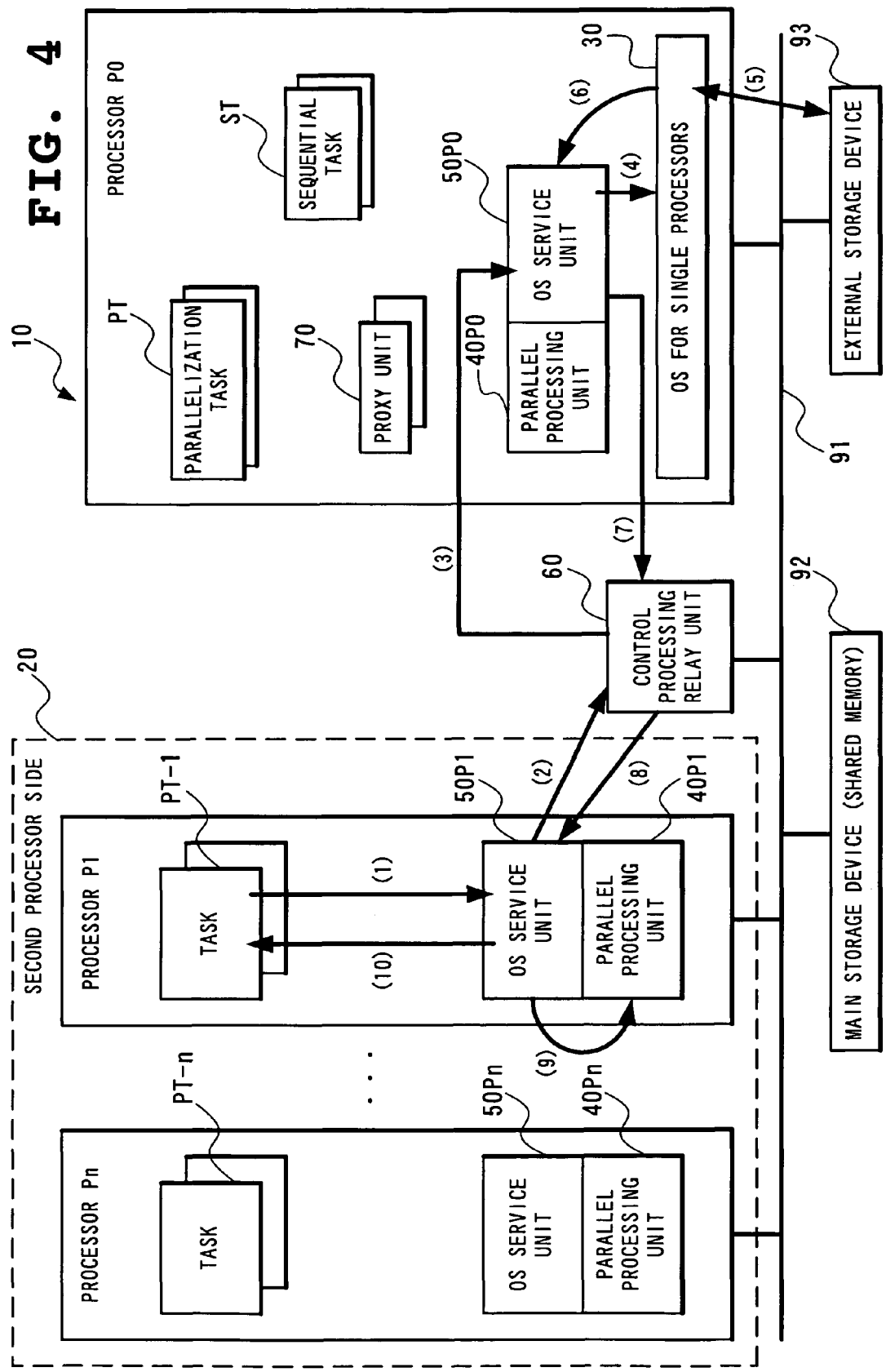
FIG. 4 is a diagram for use in explaining operation of an OS service unit to be executed in response to a file access request from a task on a second processor side in the parallel processing system according to the first example.

Description will be made of operation of the OS service units 50P0 and 50P1 to 50Pn in response to a file access (e.g. various kinds of processing with respect to a file on the external storage device 93) command from the tasks PT-1 to PT-n on the processors P1 to Pn on the second processor side 20 with reference to FIG. 4.

Here, file access includes such processing as open (open a file), close (close a file), read (read a file), write (write a file), seek move a file writing position), remove (delete a file) and rename (change a file name).

(1) When the need of file access processing arises in the tasks PT-1 to PT-n on the second processor side 20, the tasks PT-1 to PT-n request the OS service units 50P1 to 50Pn on the second processor side 20 to provide services for file access. Called up by this file access service command, for example, are a write function defined as processing of writing to a file by the OS service units 50P1 to 50Pn and a read function defined as file reading processing.

Here, the OS service units 50P1 to 50Pn set data necessary for the processing (file access processing by the OS30 for single processors) on the first processor side 10. Necessary data here includes such information as a request content (e.g. write request), a descriptor of a file to be accessed (file descriptor), a pointer to a character string, a length of a character string and a task number.

(2) With the communication reason information "OS service", by setting the necessary data containing the request contents at the control processing relay unit 60, the OS service unit 50P1~50Pn issues a file access command to the first processor side 10.

Thereafter, the task PT-1~PT-n having issued the service command for file access enters a waiting state and in the corresponding processor P1~Pn, processing is switched to other task by the parallel processing unit 40P1~40Pn (task switching).

(3) The OS service unit 50P0 on the first processor side 10 obtains, from the control processing relay unit 60, the above-described file access command having "OS service" as the communication reason information.

(4) The OS service unit 50P0 on the first processor side 10 requests file access from the OS30 for single processors according to the obtained request contents.

(5) As a result, the OS30 for single processors makes a file access (write, read or the like) to the external storage device 93 based on the command. This file access processing is executed using the file access service without modification which the OS30 for single processors originally has.

(6) Upon completion of the requested file access processing, the OS30 for single processors sends a returned value for the file access command back to the OS service unit 50P0 on the first processors side 10 to return the processing.

(7) Furthermore, the OS service unit 50P0 sets the communication content, which is data including the returned value and the task number of the task PT-1~PT-n that has requested the file access, at the control processing relay unit 60 with "OS service" as the communication reason information, thereby notifying the processors P1-Pn on the second processor side 20 of the completion of the file access.

(8) The OS service unit 50P1~50Pn of the corresponding processor P1~Pn receives thus set returned value and the notification of completion from the control processing relay unit 60.

(9) Then, the OS service unit 50P1~50Pn on the second processor side 20 asks the parallel processing unit 40P1~40Pn to activate the task PT-1~PT-n which has given the file access command.

As a result, the processing switches to the task PT-1~PT-n at the waiting state.

(10) The task PT-1~PT-n activated by the parallel processing unit 40P1~40Pn receives the returned value of the file access from the OS service unit 50P1~50Pn to continue the processing.

The foregoing processing enables, without providing an individual processing unit for file access on the second processor side 20, the task PT-1~PT-n on the second processor side 20 to make file access while using the service of the OS30 for single processors without modification. Also with this arrangement, exclusive processing for file access is completed on the first processor side 10, so that parallel processing can be realized with no overhead caused by such exclusive processing as in operating an application on an OS for multiprocessors.

In a case where the task PT-1~PT-n on the processor P1~Pn on the second processor side 20 makes file access to read-only data on the external storage device 93, for example, direct access may be made to the external storage device 93 from each processor P1~Pn without such processing by the OS service unit 50P1~50Pn as described above.

Figure 5:
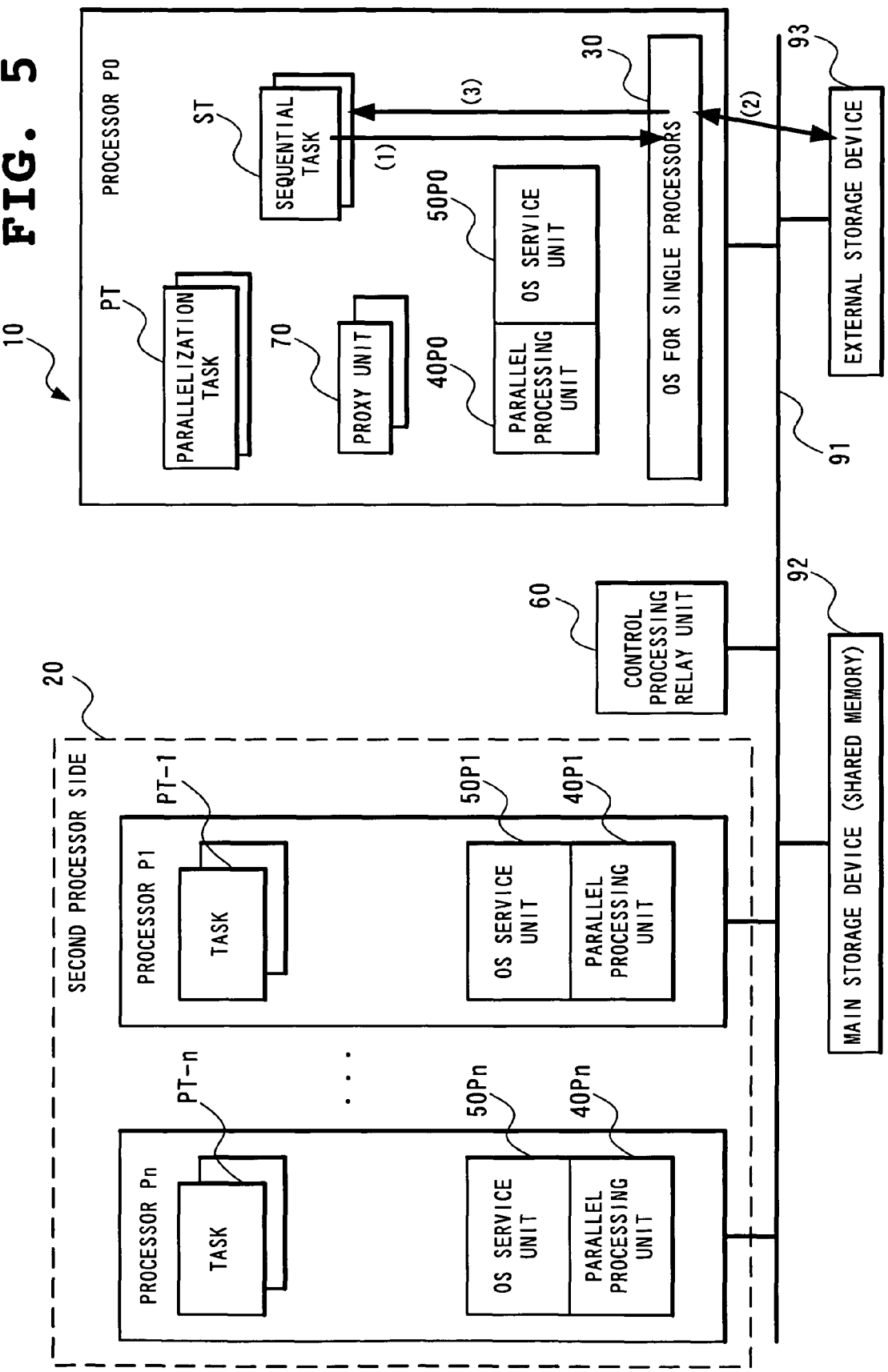
FIG. 5 is a diagram for use in explaining operation executed in response to a file access request from a sequential task on a first processor side.

Here, as to a file access command from the sequential task ST on the processor P0 on the first processor side 10, the processing is directly executed by the OS30 for single processors without using the OS service unit. In the following, the processing will be described with reference to FIG. 5.

(1) The sequential task ST on the processor P0 requests the OS30 for single processors to make file access.

(2) As a result, the OS30 for single processors conducts file access (write, read, etc.) to the external storage device 93 or the like based on the command. The file access processing is executed by using the file access service that the OS30 for single processors originally has without modification.

(3) When the file access processing is completed, the OS30 for single processors sends a returned value for the file access command back to the sequential task ST to return the processing.

Since in response to the OS service command from the sequential task ST, mutual exclusive control or the like is unnecessary, no extra overhead will be generated.

Processing operation by the control processing relay unit 60 will be described with reference to FIGS. 6 and 7.

Figure 6:
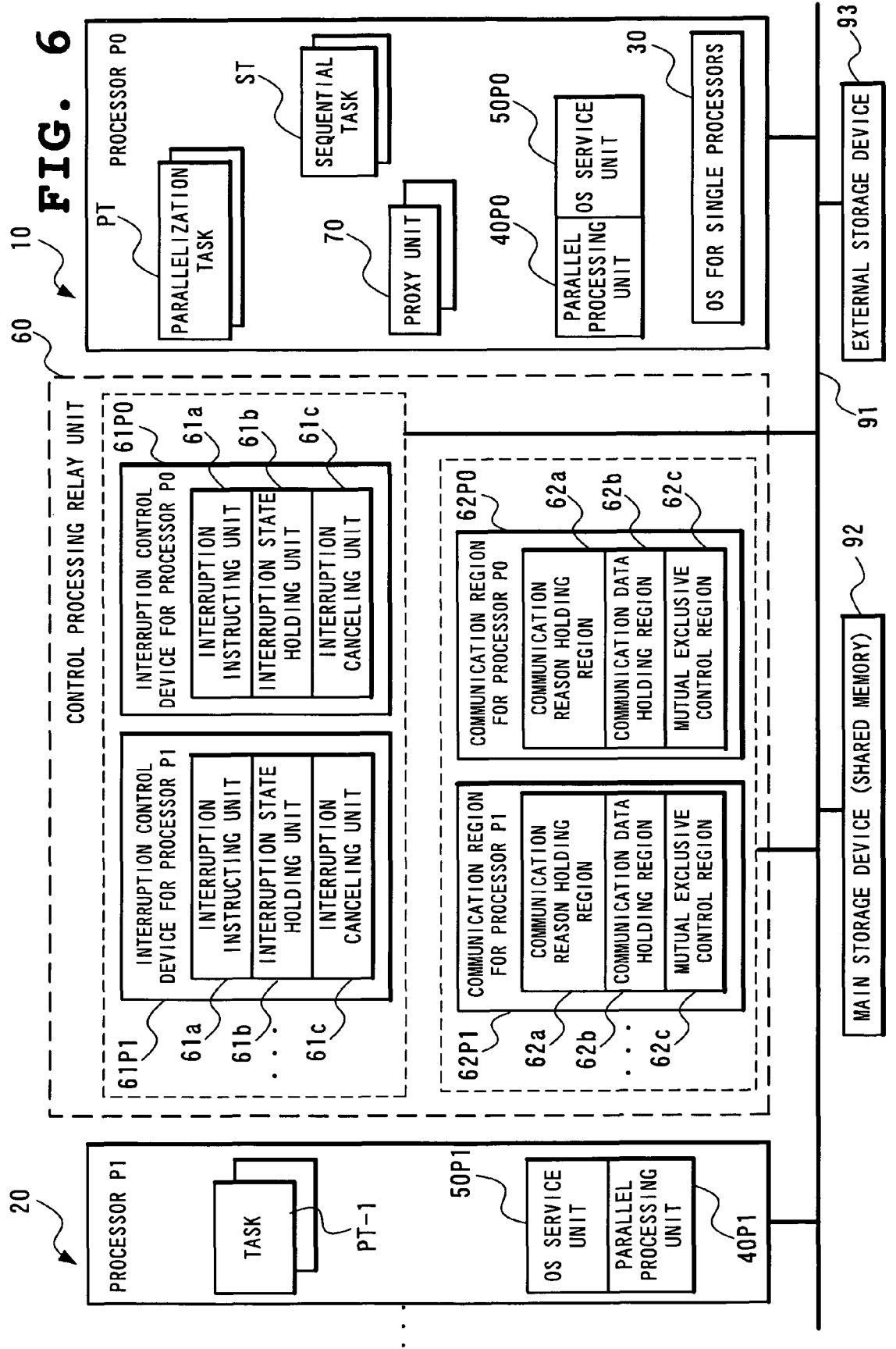
FIG. 6 is a block diagram showing an internal structure of a control processing relay unit in the parallel processing system according to the first example.
Figure 7:
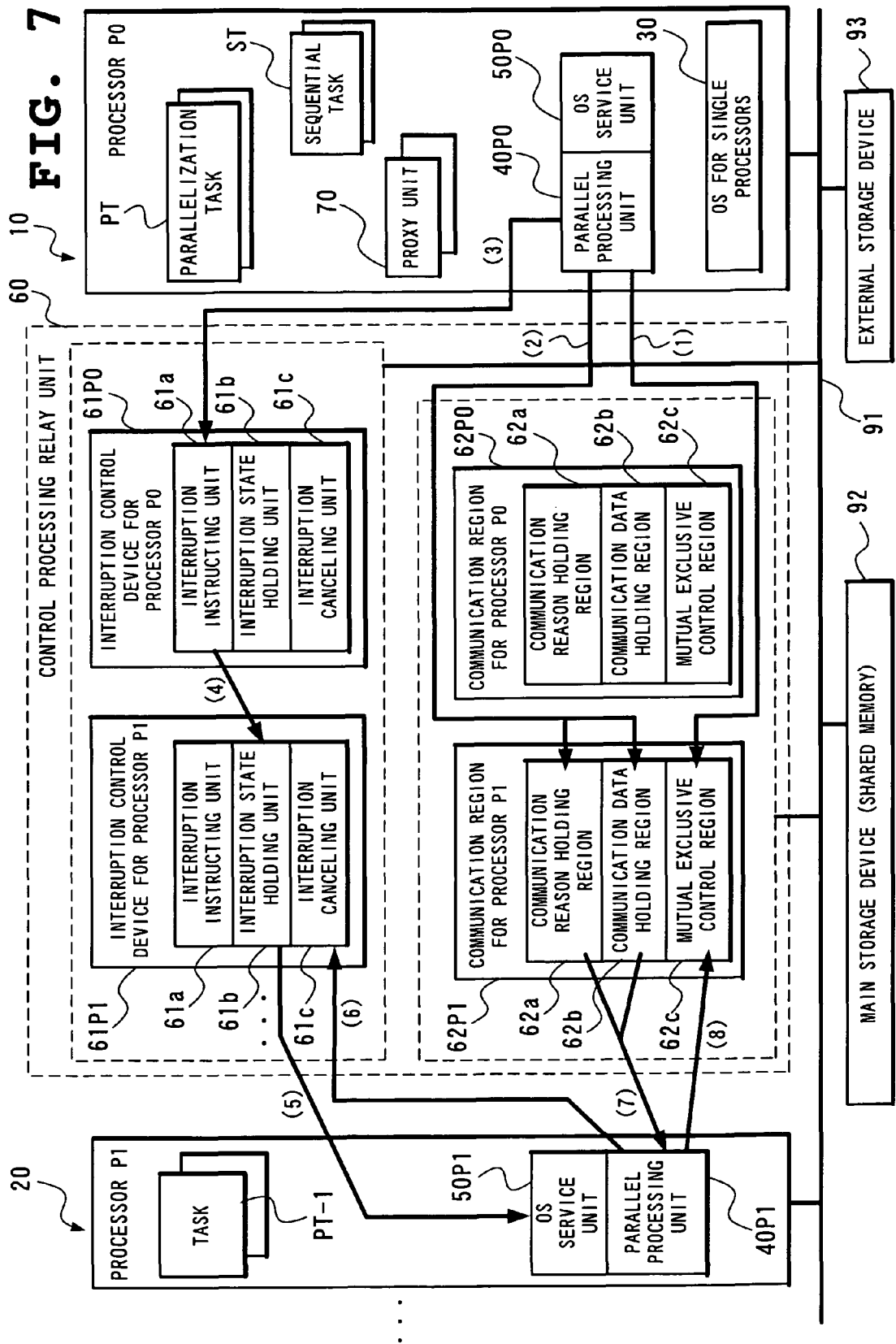
FIG. 7 is a diagram for use in explaining processing operation of the control processing relay unit in the parallel processing system according to the first example.

First, structure of the control processing relay unit 60 is shown in FIG. 6. As illustrated in the figure, the control processing relay unit 60 includes interruption control devices 61P0 to 61Pn corresponding to the respective processors P0 to Pn and communication regions 62P0 to 62Pn corresponding to the respective processors P0 to Pn. Here, the communication regions 62P0 to 62Pn are ensured in the main storage device 92.

The interruption devices 61P0 to 61Pn each further include an interruption instructing unit 61a for instructing other processor on an interruption, an interruption state holding unit 61b for holding information that an interruption is made in response to an interruption instruction and an interruption canceling unit 61c for clearing an interruption.

The communication regions 62P0 to 62Pn each include a communication reason holding region 62a for holding communication reason information from a processor as a communication source, a communication data holding region 62b for holding communication data to be communicated and a mutual exclusive control region 62c for locking a communication region in order to ensure communication.

At this time point, in the communication data holding region 62b, a pointer to the main storage device 92 will be stored, in which communication data to be communicated (necessary data including request contents) is stored.

Operation will be described with respect to processing of communication from the parallel processing unit 40P0 on the first processor side 10 to the processor P1 on the second processor side 20 as an example with reference to FIG. 7.

(1) The parallel processing unit 40P0 locks the mutual exclusive control region 62c of the communication region 62P1 for the processor P1. More specifically, by bringing a lock variable stored in the mutual exclusive control region 62c to a locked state, prevent the communication region 62P1 for the processor P1 from being used by other processor.

When the region is already locked by other processor, wait for the lock to be released.

(2) When the lock of the communication region 62P1 is obtained, the parallel processing unit 40P0 stores the communication reason information and the communication data (necessary data including request contents) in the communication reason holding region 62a and the communication data holding region 62b of the communication region 62P1, respectively.

Communication reason information to be stored is, in a case of communication processing for creating a task as described above, information indicative of "parallel processing" (e.g. data such as a numerical value predetermined corresponding to the parallel processing).

(3) The parallel processing unit 40P0 instructs the interruption instructing unit 61a of its own interruption control device 61P0 to interrupt the processor P1.

(4) The interruption instructing unit 61a of the interruption control device 61P0 sets the information indicative of the interruption at the interruption state holding unit 61b of the interruption control device 61P1 corresponding to the processor P1. This brings the processor P1 to an interrupted state.

(5) The parallel processing unit 40P1 of the processor P1 determines from the state of the interruption state holding unit 61b of the interruption control device 61P1 in the control processing relay unit 60 that the interruption is set.

(6) The parallel processing unit 40P1 of the processor P1 releases itself from the interrupted state by clearing the interruption information in its own interruption state holding unit 61b of the control processing relay unit 60.

(7) The parallel processing unit 40P1 of the processor P1 obtains the communication reason information and the communication data (required data including the request contents) from the communication reason holding region 62a and the communication data holding region 62b of its own communication region 62P1 in the control processing relay unit 60, respectively.

(8) Upon being allowed to receive next communication, the parallel processing unit 40P1 of the processor P1 releases the lock of the mutual exclusive control region 62c of its own communication region 62P1. More specifically, by bringing the lock variable stored in the mutual exclusive control region 62c to the unlocked state, the communication region 62P1 for the processor P1 is released so that it may be used by other processor.

Thus, using the control processing relay unit 60 realizes transmission and reception of control signals and data between the first processor side 10 and the second processor side 20.

Figure 8:
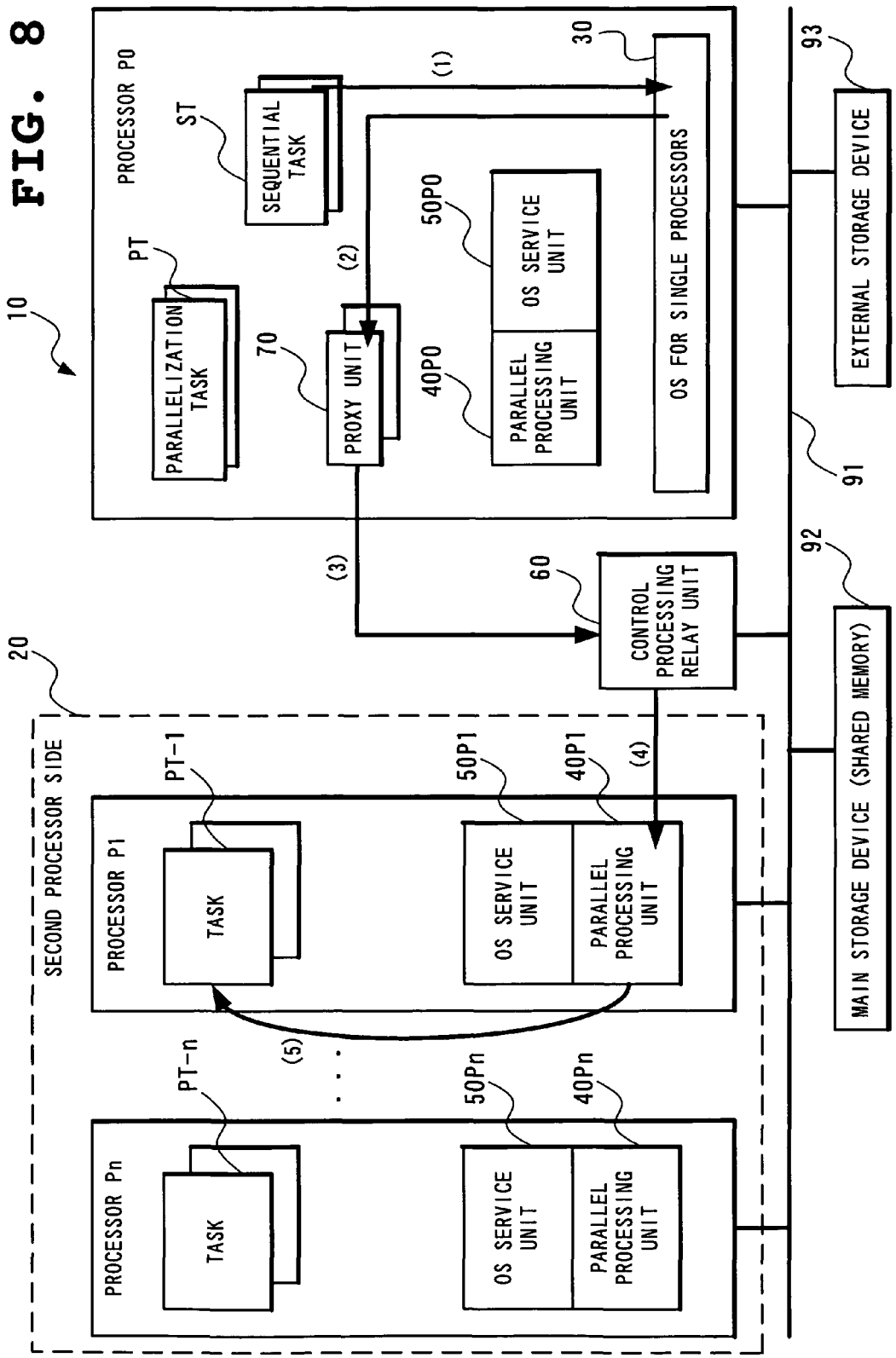
FIG. 8 is a diagram for use in explaining signal notification processing operation by a proxy unit in the parallel processing system according to the first example.

Operation of signal notification processing by the proxy unit 70 will be described with reference to FIG. 8.

The proxy unit 70 has a function of enabling the OS30 for single processors to communicate with the tasks PT-1 to PT-n generated on the second processor side 20 by using a signal (control signal). The task numbers of the corresponding tasks PT-1 to PT-n are held in the proxy unit 70.

The proxy unit 70 may be one-to-one associated with each of the plurality of tasks PT-1 to PT-n, or the plurality of tasks PT-1 to PT-n may be associated with one proxy unit 70.

(1) The sequential task ST on the first processor side 10 requests signal notification service from the OS30 for single processors. The signal communicated by the signal notification is a control signal for controlling the tasks PT-1 to PT-n activated on the respective processors P1 to Pn on the second processor side 20 by the service function which the OS30 for single processors originally has.

(2) The OS30 for single processors notifies the signal to the corresponding proxy unit 70.

(3) Through the control processing relay unit 60, the proxy unit 70 notifies the notified signal to the processor P1~Pn in which its corresponding task PT-1 exists on the second processor side 20. At this point, "parallel processing" is set as the communication reason information.

(4) Since the communication reason information to the control processing relay unit 60 is "parallel processing", the parallel processing unit 40P1~40Pn of the corresponding processor on the second processor side 20 obtains a signal notification command from the control processing relay unit 60.

(5) The parallel processing unit 40P1~40Pn having obtained the signal notification command notifies the corresponding task PT-1~PT-n of the signal (control signal).

Thus, since the proxy unit 70 is associated with the task PT-1~PT-n on the processor P0~Pn on the second processor side 20 by the task number, the signal notification service by the OS30 for single processors can be performed on the first processor side 10 with respect to the tasks PT-1 to PT-n.

Lastly, inter-task cooperative operation on the second processor side 20 will be described with reference to FIGS. 9 and 10.

Figure 9:
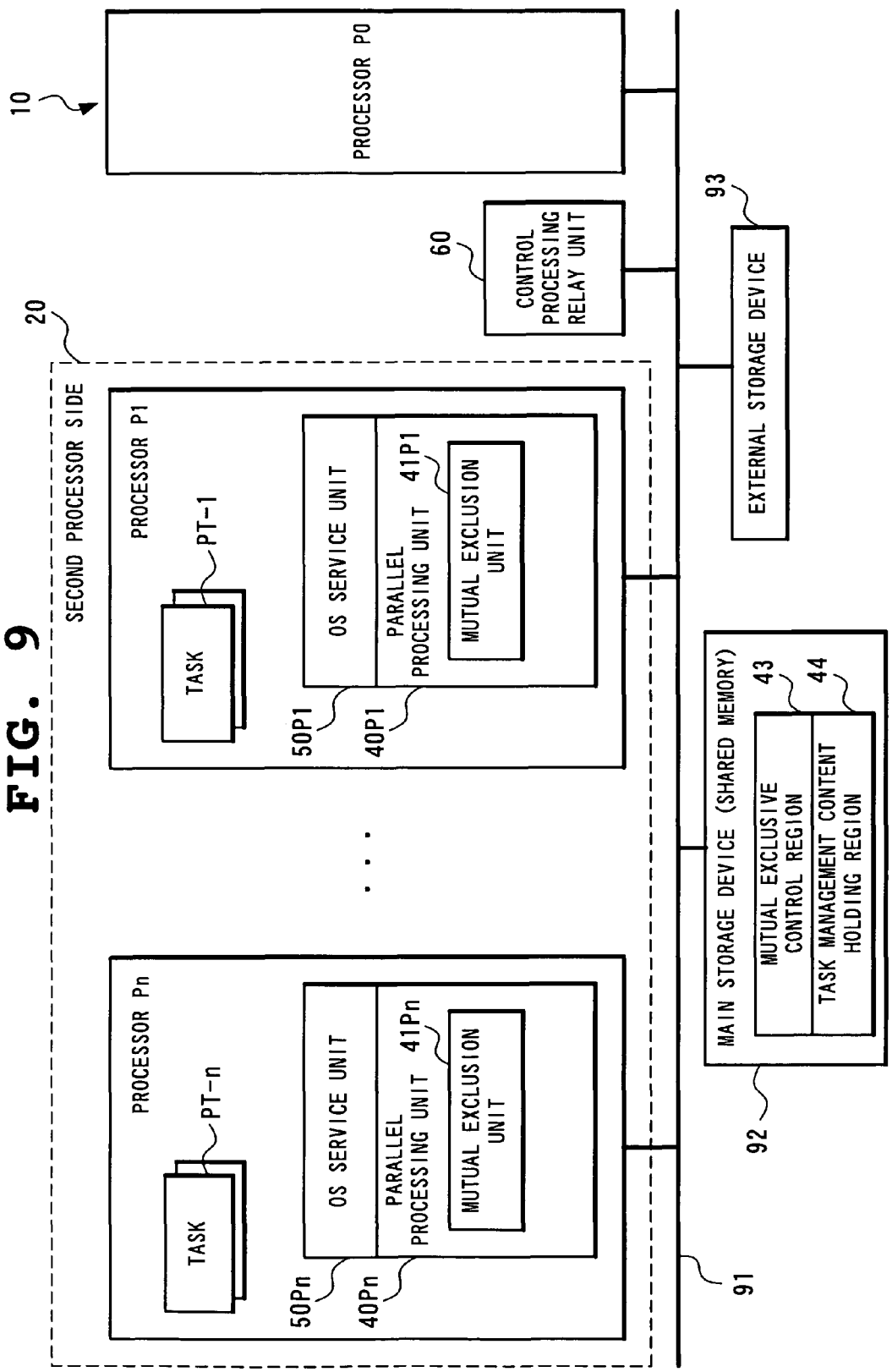
FIG. 9 is a block diagram showing a structure for realizing cooperative operation between tasks on the second processor side in the parallel processing system according to the first example.
Figure 10:
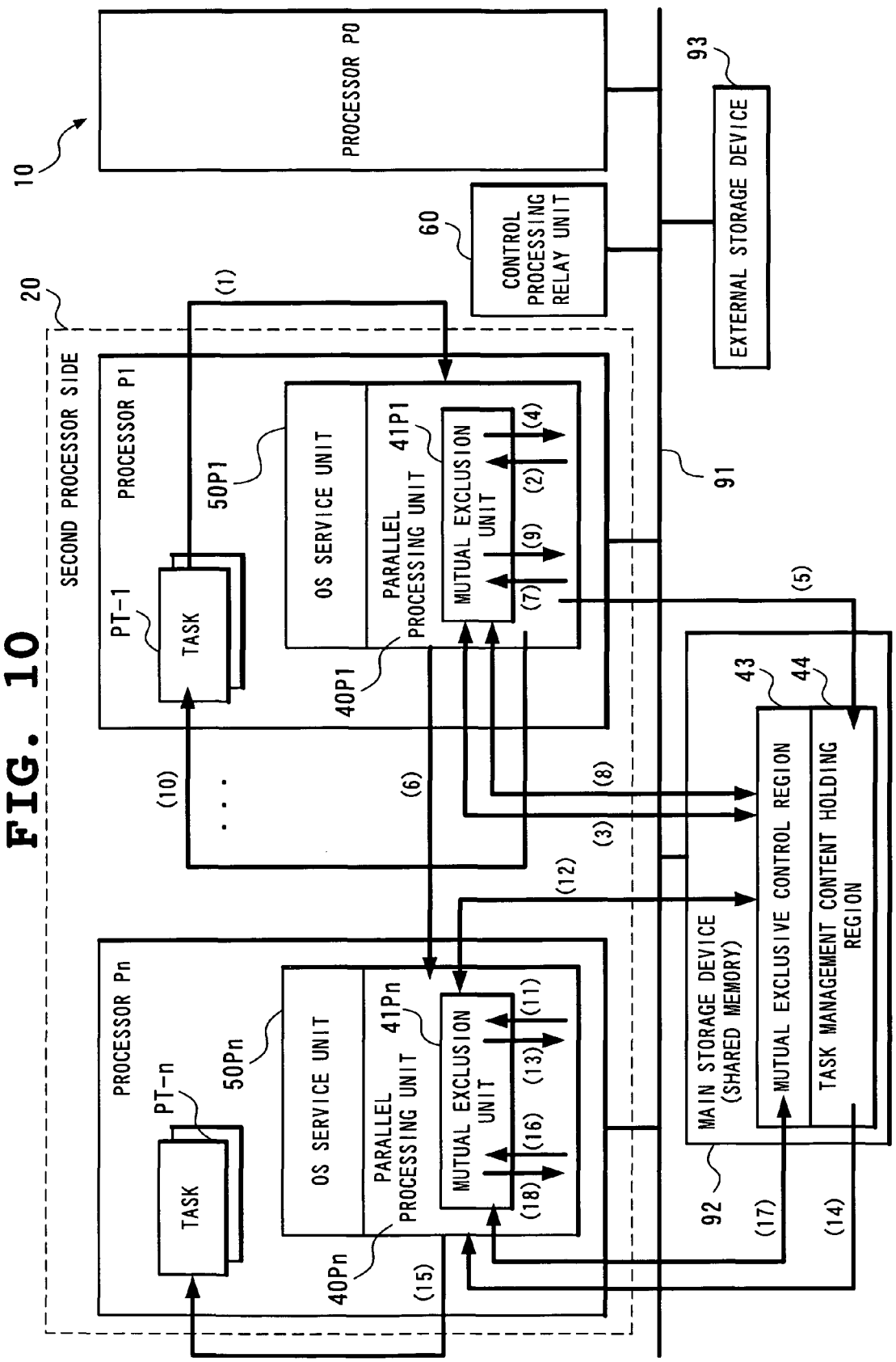
FIG. 10 is a diagram for use in explaining cooperative operation between tasks on the second processor side in the parallel processing system according to the first example.

FIG. 9 shows the structure of the parallel processing units 40P1 to 40Pn for obtaining cooperation among the tasks. As illustrated in the figure, the parallel processing units 40P1 to 40Pn are provided with mutual exclusion units 41P1 to 41Pn.

The main storage device 92 also includes a mutual exclusive control region 43 and a task management content holding region 44 to obtain task cooperation.

(1) The task PT-1 on the processor P1 requests desired parallel processing from its own parallel processing unit 40P1.

(2) The parallel processing unit 40P1 of the processor P1 requests lock acquisition from the mutual exclusion unit 41P1 in order to ensure the resources for use in parallel processing.

(3) The mutual exclusion unit 41P1 obtains the lock by using the mutual exclusive control region 43 of the main storage device 92.

(4) The mutual exclusion unit 41P1 notifies the parallel processing unit 40P1 that the lock has been obtained.

(5) The parallel processing unit 40P1 holds, in the task management content holding region 44, the management content (request contents, task number and other required data) of the task PT-1 having requested parallel processing on the processor P1.

(6) The parallel processing unit 40P1 interrupts other processor P2~Pn which is executing a low-priority task. Assume here that the processor Pn is interrupted.

(7) The parallel processing unit 40P1 asks the mutual exclusion unit 41P1 to release thus ensured lock.

(8) The mutual exclusion unit 41P1 unlocks the mutual exclusive control region 43 of the main storage device 92.

(9) The mutual exclusion unit 41P1 notifies the parallel processing unit 40P1 of the completion of the unlocking.

(10) The parallel processing unit 40P1 returns the processing to the task PT-1.

(11) The parallel processing unit 40Pn of the processor Pn requests lock acquisition from the mutual exclusion unit 41Pn in order to ensure the resources for use in parallel processing.

(12) The mutual exclusion unit 41Pn obtains the lock by using the mutual exclusive control region 43 of the main storage device 92.

(13) The mutual exclusion unit 41Pn notifies the parallel processing unit 40Pn of the completion of the lock acquisition.

(14) The parallel processing unit 40Pn obtains the task management contents stored in the task management content holding region 44.

(15) The parallel processing unit 40Pn creates and activates a new task based on the task management contents.

(16) The parallel processing unit 40Pn requests, from the mutual exclusion unit 41Pn, release of thus ensured lock.

(17) The mutual exclusion unit 41P*n* unlocks the mutual exclusive control region 43 of the main storage device 92.

(18) The mutual exclusion unit 41P*n* notifies the parallel processing unit 40P*n* of the completion of the unlocking.

Such task cooperative operation as described above allows the task PT-1~PT-n activating on a certain processor P1~Pn to have its own unit of work be parallel-processed by other processor.

As an example of applications to thus structured parallel processing system, description will be made of a case where the application is operated on a mobile terminal of a multi-processor.

Figure 11:
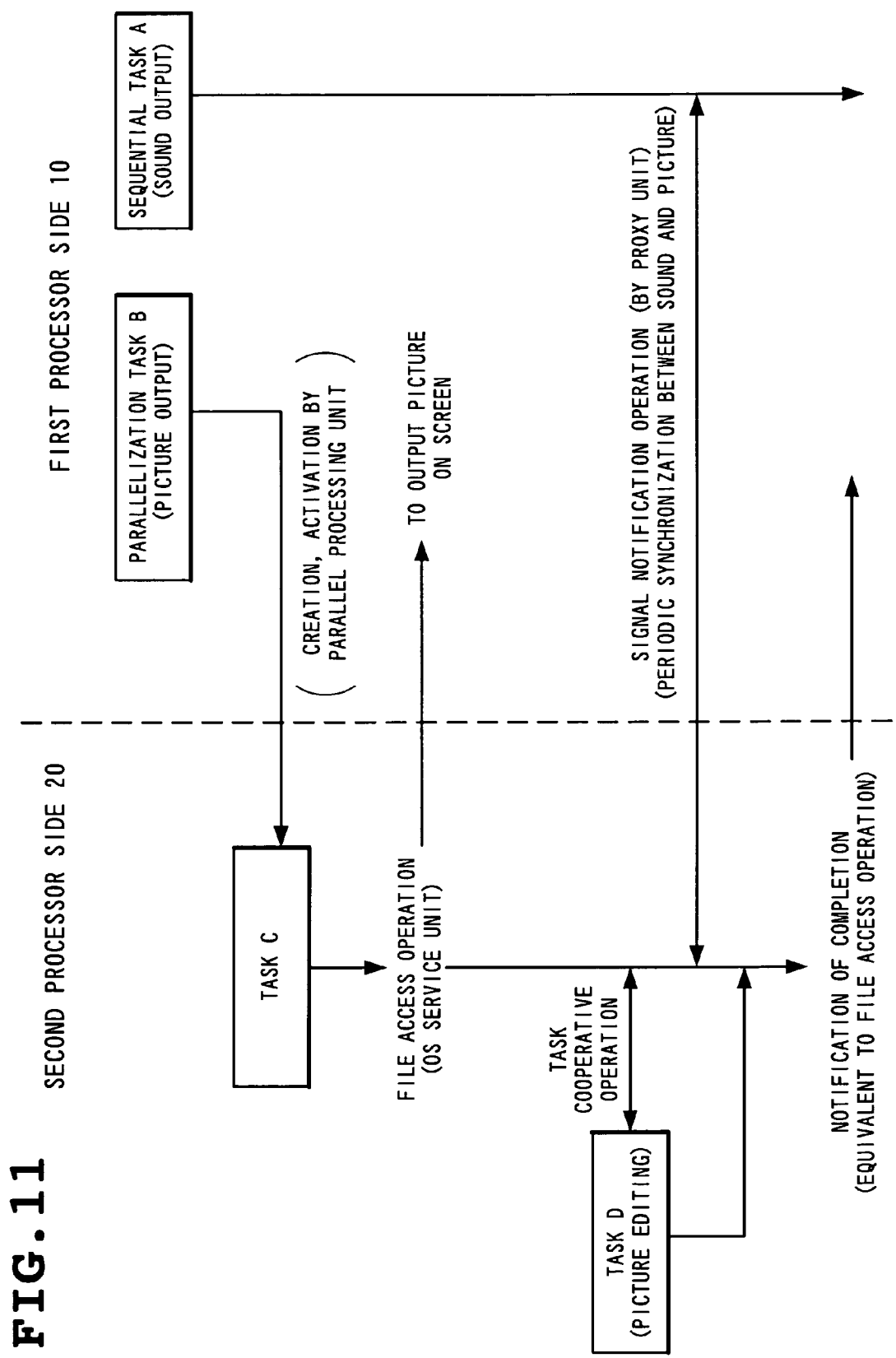
FIG. 11 is a diagram for use in explaining a case of operating an application on a mobile terminal of a multiprocessor as an example of application to the parallel processing system.

Here, the description will be made with reference to FIG. 11, assuming a case where with the application having a function of reproducing picture (moving picture) and sound simultaneously on a mobile terminal and with sound output processing being defined as a sequential task A and picture output processing being defined as a parallelization task B, the application is operated on the processor P0 on the first processor side 10.

The parallelization task B is created and activated as a task C on any of the processors P1 to Pn on the second processor side 20 by the above-described parallel processing unit.

The created task C outputs the picture on a screen by file access processing of the OS service unit.

Concerning the sound output by the sequential task A, the sound is output by the service of the OS30 for single processors.

For periodically synchronizing the sound and the picture, synchronization is attained by giving a signal notification between the sequential task A and the task C through the signal notification operation by the proxy unit 70.

In addition, when executing processing of editing the picture in the task C, the editing processing is created and activated as a task D on other processor by task cooperation processing.

When the picture output processing by the task C is completed, the task C notifies the OS for single processors of the termination by the file access operation.

In the present parallel processing system, provision of the parallel processing units 40P0 to 40P*n*, the OS service units 50P0 to 50P*n*, the control processing relay unit 60 and the proxy unit 70 as modules enables the OS30 for single processors and the application to operate without overheads on a multiprocessor system structure without modifying the OS30 for single processors and the application operated on the processor P0, while receiving benefits from the parallel processing by the multiprocessor.

Figure 12:
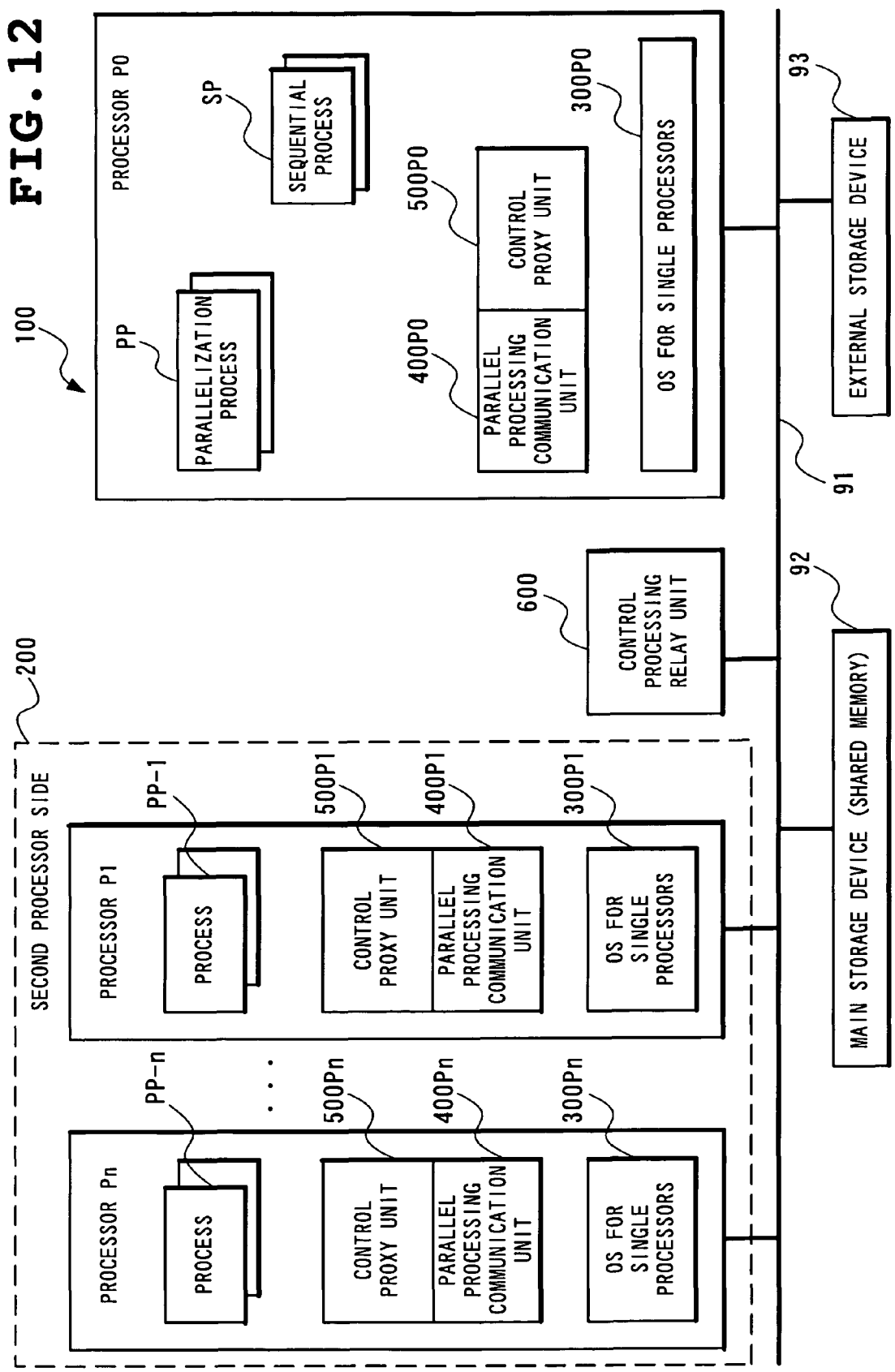
FIG. 12 is a block diagram showing a structure of a parallel processing system according to a second example to which the present invention is applied.

Next, a parallel processing system of a second example to which the present invention is applied will be described with reference to FIG. 12 and the drawings to follow. FIG. 12 is a block diagram showing a structure of the parallel processing system according to the second example, in which components common to FIG. 1 are referenced by the same reference numerals. Illustrated in the second example shown in FIG. 12 is a case where the parallel processing units 40P0 to 40P*n* in the first example are formed of parallel processing communication units 400P0 to 400P*n* and control proxy units 500P0 to 500P*n*, respectively.

As shown in FIG. 12, the parallel processing system of the present example is the same as the first example in that a multiprocessor formed of a plurality of processors (CPU) P0 to Pn (n is an integer not less than 1) connected through a system bus 91 is logically divided into two groups, i.e., a first processor side 100 and a second processor side 200.

In the second example, OSes 300P0 to 300P*n* for single processors are provided which operate on the processor P0 on the first processor side 100 and the respective processors (CPU) P0 to Pn on the second processor side 200.

In addition, the parallel processing communication units 400P0 to 400P*n* and the control proxy units 500P0 to 500P*n* for parallel processing are mounted on the processor P0 on the first processor side 100 and the processors P1 to Pn on the second processor side 200, respectively. A main storage device 92 as a shared memory which is shared among the respective processors P0 to Pn and an external storage device 93 such as a disk device are connected to the system bus 91.

Also, a control processing relay unit 600 is uniquely provided for transmitting and receiving control signals and data between the first processor side 100 and the second processor side 200.

Since regarding the proxy unit 70 shown in the first example through which the OS 300P0 for single processors on the first processor side 100 communicates with processes executed on the second processor side 200, the unit executes completely the same function in the second example as that in the first example, no description will be made here for the sake of convenience.

While in the first example, it has been described that the switching of tasks is performed in response to a file access command from the tasks on the processors P1 to Pn on the second processor side 20, also in the present example, file access from the second processor side 200 is possible and switch of processes PP-1 to PP-n on the second processor side 200 which have given a file access command is conducted by the OSes 300P1 to 300P*n* for single processors on the second processor side 200.

As to the OSes 300P0 to 300P*n* for single processors mounted on the respective processors P0 to Pn, they are different from those of the first example in that not only OSes having no virtual memory mechanism which realizes a memory protection function such as a real-time OS but also OSes having a virtual memory mechanism such as Linux and Windows as existing OSes can be used and that a memory protection mechanism can be realized on all or a part of the processors P0 to Pn.

In addition, the OSes 300P0 to 300P*n* for single processors need not be OSes of the same kind but may be OSes of kinds different from each other.

In the present example, the task, which is a unit of work for performing parallel processing, is memory-protected between the processors and in that sense, will be referred to as a process to distinguish from the task in the first example.

In the parallel processing system according to the present example, among the units of work of an application operating on the OS 300P0 for single processors on the first processor side 100, those processes which cannot be parallelized (sequential processes SP) are processed by the processor P0 on the first processor side 100, and those tasks which can be parallelized within the application are created as new processes PP-1 to PP-n on the second processor side 200 and parallel-processed.

The parallel processing communication unit 400P0 and the parallel processing communication units 400P1 to 400P*n* have the function of transmitting and receiving control information related to process creation, activation, stop, termination and deletion and other control regarding the processes between the processes and the OSes 300P0 to 300P*n* for single processors.

Here, control information and data related to creation, activation, stop, termination, deletion or the like of tasks are transmitted and received between the first processor side 100 and the second processor side 200 through the control processing relay unit 600.

In addition, the control proxy unit 500P0 and the control proxy units 500P1 to 500P*n* have the function of obtaining a processing command from the OS 300P0~300P*n* for single processors to the process and activating the process.

The control processing relay unit 600 is a unit for transmitting and receiving control signals and data between the first processor side 10 and the second processor side 20 and is used for control between the plurality of processes parallel-processed by the plurality of processors.

In the following, operation of thus structured parallel processing system according to the second example will be described in detail with reference to the drawings.

Assume here that the application operates on the OS 300P0 for single processors on the first processor side 100, and among the units of work of the application, a unit of work to be processed by the processor P0 on the first processor side 100 is defined as a sequential process SP, and units of work which are processes that can be parallelized within the application and are parallel-processed by the second processor side 200 as the tasks PP-1 to PP-n are defined as a parallelization process PP.

In the parallel processing system in the second example, after a certain process (task) is activated, synchronous activation of parallel processing in which the parallelization process PP as a process (task) on the calling side waits for the termination of the activated process PP-1~PP-n and asynchronous activation of parallel processing in which the parallelization process PP as a process (task) on the calling side needs not wait for the termination of the activated process PP-1~PP-n are both possible.

Figure 13:
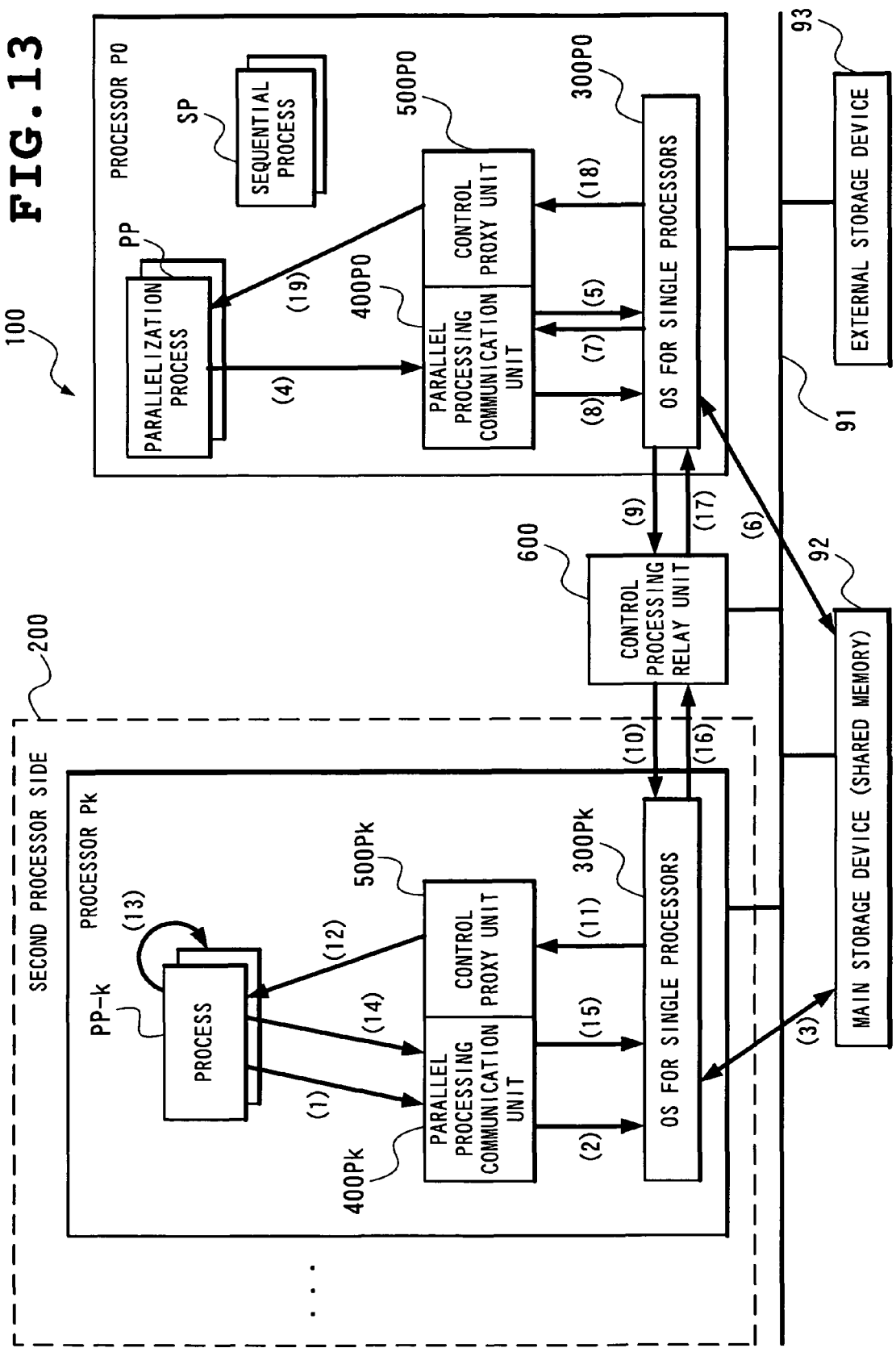
FIG. 13 is a diagram for use in explaining operation of synchronously activating parallel processing of processes in the parallel processing system according to the second example.

First, operation for the synchronous activation of parallel processing of a process will be described with reference to FIG. 13.

Assume here that in a processor Pk ($1 \leq k \leq n$) on the second processor side 200, the parallelization process PP on the first processor side 100 is created in advance as a process PP-k which is a unit of work to be activated on the second processor side 200.

(1) The process PP-k on the processor Pk ($1 \leq k \leq n$) on the second processor side 200 registers, in a parallel processing communication unit 400P*k*, the information about the processing belonging to its own process. As a result, the process PP-k enters the standby state.

(2) The parallel processing communication unit 400P*k* makes a request for accessing necessary data on the main storage device 92 (shared memory) through an OS 300P*k* for single processors.

(3) As a result, the information about the processing belonging to the process PP-k is stored in the main storage device 92 (shared memory).

(4) The process PP on the processor P0 requests synchronous processing from the parallel processing communication unit 400P0. Thereafter, the process PP enters the standby state.

(5) The parallel processing communication unit 400P0 having received the request makes a request to access data on the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). Thus, a processor number which executes the process PP-k and a process number are obtained.

(8) The parallel processing communication unit 400P0 makes a communication request based on the information obtained from the main storage device 92 (shared memory) through the OS 300P0 for single processors.

(9) The OS 300P0 for single processors sets the information required for communication at the control processing relay unit 600.

(10) As a result, the processing command is sent from the control processing relay unit 600 to the OS 300P*k* for single processors of the processor Pk.

(11) The control proxy unit 500P*k* of the processor Pk obtains the processing command sent through the OS 300P*k* for single processors.

(12) Then, the control proxy unit 500P*k* activates the process PP-k according to the processing command obtained.

(13) As a result, the process PP-k at the standby state executes the processing.

(14) After finishing the processing, the process PP-k notifies the parallel processing communication unit 400P*k* of the information to that effect.

(15) The parallel processing communication unit 400P*k* having received the notification makes a communication request based on the information notified through the OS 300P*k* for single processors.

(16) The OS 300P*k* for single processors sets the information required for communication at the control processing relay unit 600.

(17) As a result, the processing command is sent from the control processing relay unit 600 to the OS 300P0 for single processors in the processor P0.

(18) The control proxy unit 500P0 of the processor P0 obtains the processing command sent through the OS 300P0 for single processors.

(19) Then, the control proxy unit 500P0 activates the process PP according to the processing command obtained.

Thus, synchronous processing is realized between the process PP on the processor P0 on the first processor side 100 and the process PP-k on the second processor side 200.

Figure 14:
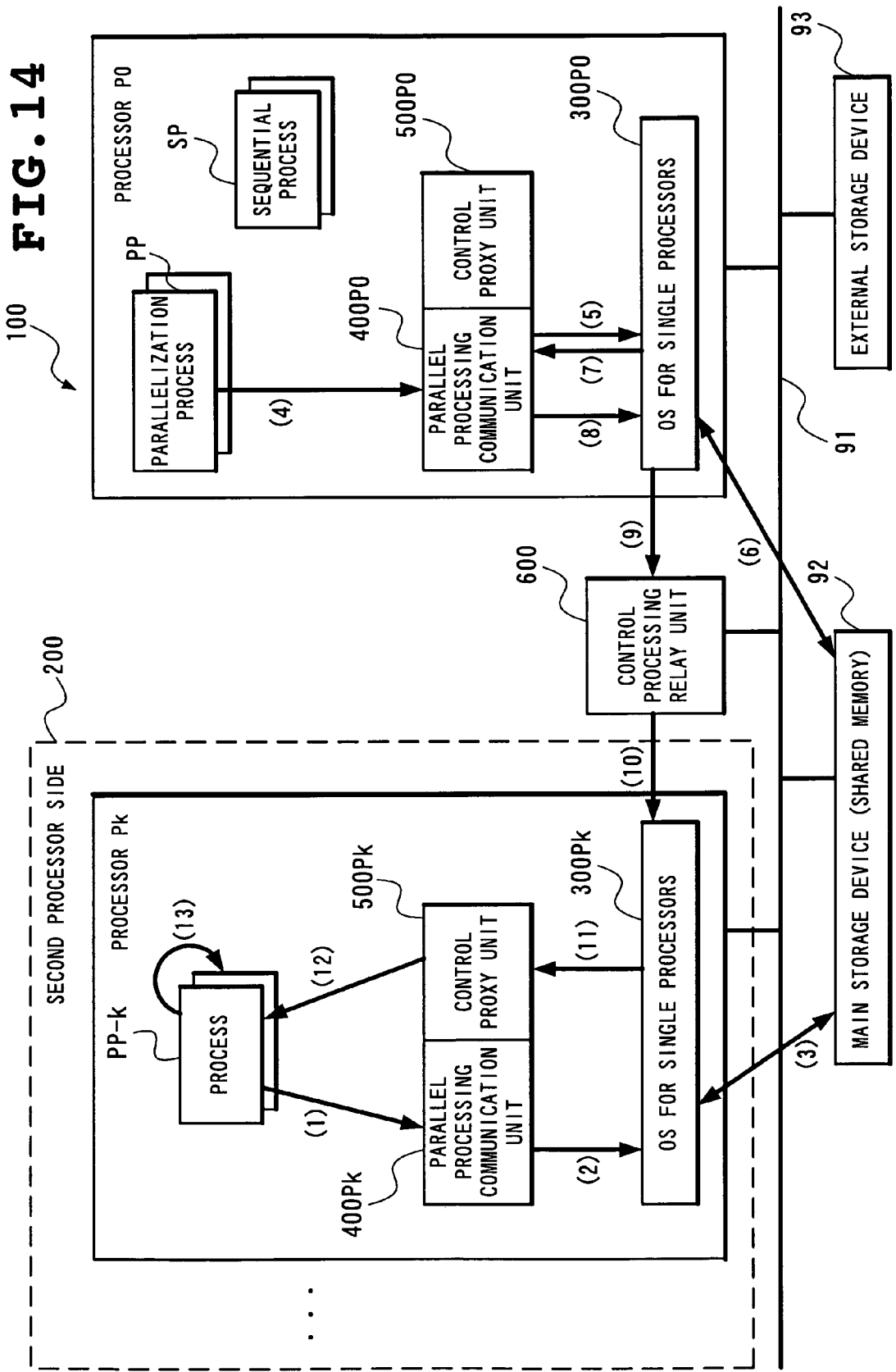
FIG. 14 is a diagram for use in explaining operation of asynchronously activating parallel processing of processes in the parallel processing system according to the second example.

Next, operation for the asynchronous activation of parallel processing of a process will be described with reference to FIG. 14.

Also assume here that in the processor Pk ($1 \leq k \leq n$) on the second processor side 200, the parallelization process PP on the first processor side 100 is created in advance as the process PP-k which is a unit of work to be activated on the second processor side 200.

(1) The process PP-k which was performing the processing on the processor Pk ($1 \leq k \leq n$) on the second processor side 200 registers, in the parallel processing communication unit 400P*k*, the information about the processing belonging to its own process. As a result, the process PP-k enters the standby state.

(2) The parallel processing communication unit 400P*k* makes a request for accessing required data on the main storage device 92 (shared memory) through the OS 300P*k* for single processors.

(3) As a result, the information about processing belonging to the process PP-k is stored in the main storage device 92 (shared memory).

(4) The process PP on the processor P0 requests asynchronous processing from the parallel processing communication unit 400P0. In this case, the process PP thereafter continues the processing without entering the standby state.

(5) The parallel processing communication unit 400P0 having received the request makes an access request for data on the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). As a result, a processor number executing the process PP-k and a process number are obtained.

(8) The parallel processing communication unit 400P0 makes a communication request based on the information obtained from the main storage device 92 (shared memory) through the OS 300P0 for single processors.

(9) The OS 300P0 for single processors sets information required for communication at the control processing relay unit 600.

(10) Thus, the processing command is sent from the control processing relay unit 600 to the OS 300Pk for single processors in the processor Pk.

(11) The control proxy unit 500Pk of the processor Pk obtains the processing command sent through the OS 300Pk for single processors.

(12) The control proxy unit 500Pk then activates the process PP-k according to the processing command obtained.

(13) Thus, the process PP-k at the standby state executes the processing.

In the foregoing manner, asynchronous processing is realized between the process PP on the processor P0 on the first processor side 100 and the process PP-k on the second processor side 200.

The processing operation by the control processing relay unit 600 in the parallel processing system according to the second example will be described with reference to FIGS. 15 and 16.

Figure 15:
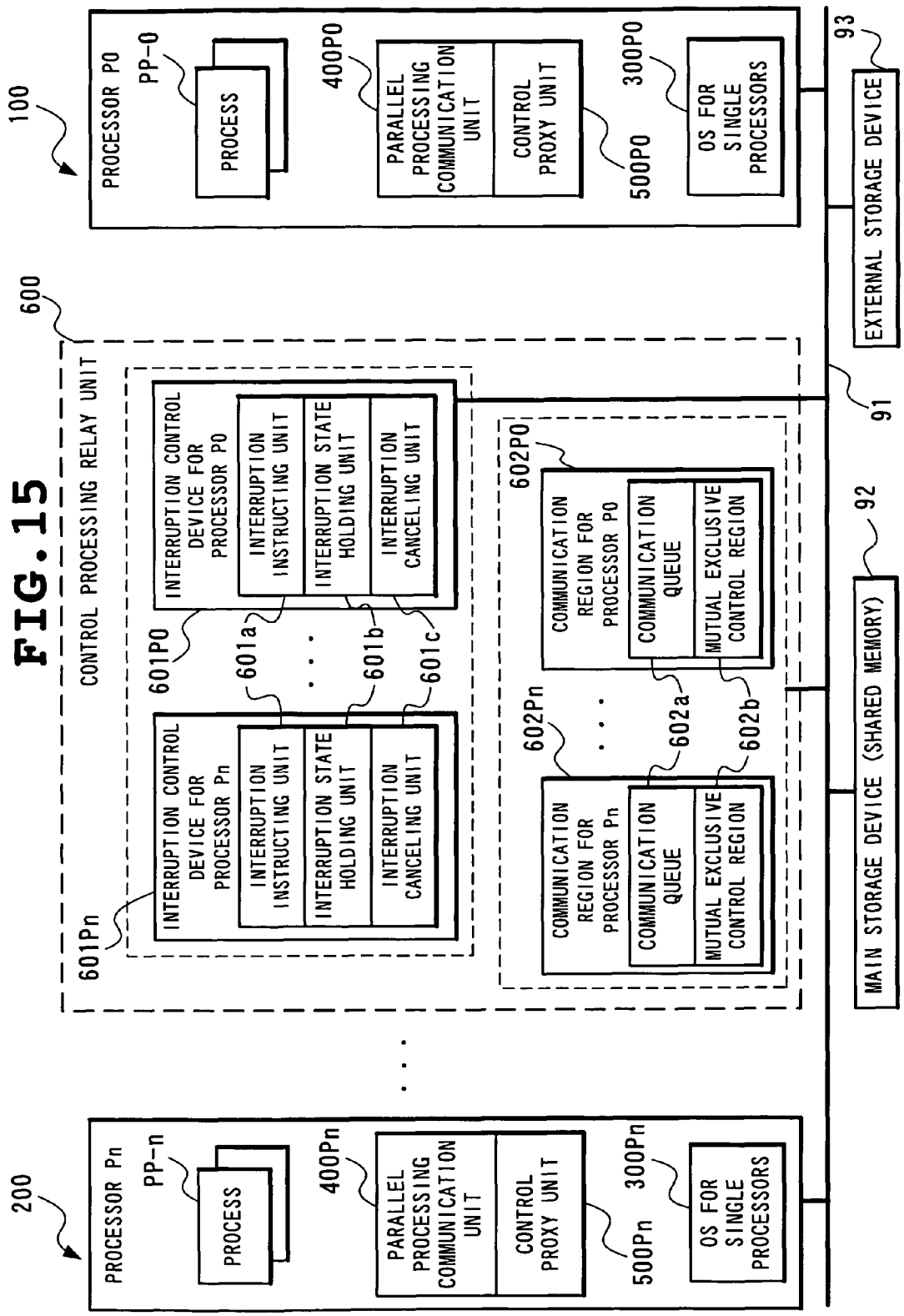
FIG. 15 is a block diagram showing an internal structure of a control processing relay unit in the parallel processing system according to the second example.
Figure 16:
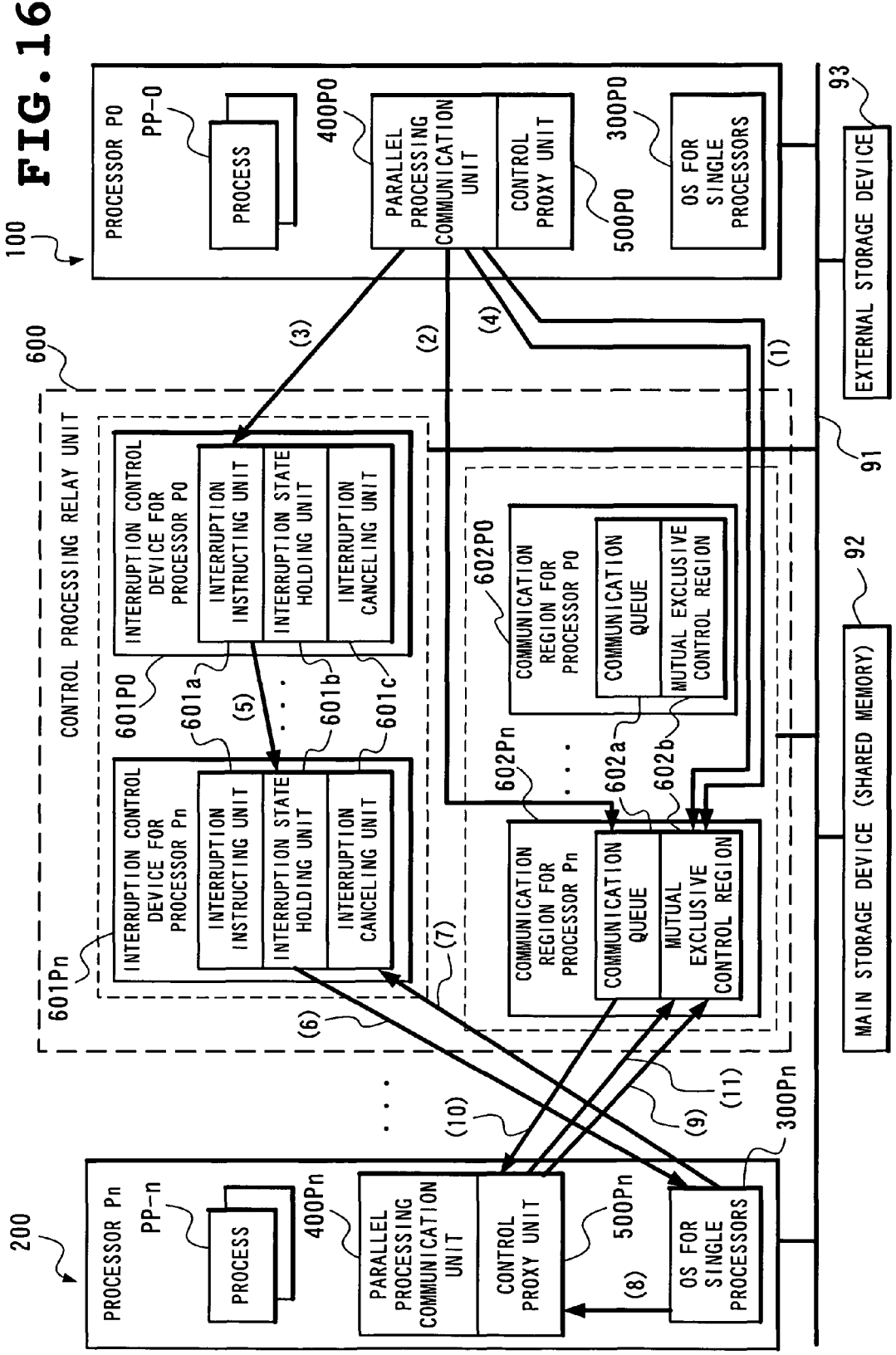
FIG. 16 is a diagram for use in explaining processing operation of the control processing relay unit in the parallel processing system according to the second example.

First, structure of the control processing relay unit 600 is shown in FIG. 15. As illustrated in the figure, the control processing relay unit 600 is structured to include interruption control devices 601P0 to 601Pn corresponding to the respective processors P0 to Pn and communication regions 602P0 to 602Pn corresponding to the respective processors P0 to Pn. Here, the communication regions 602P0 to 602Pn are ensured in the main storage device 92.

The interruption control devices 601P0 to 601Pn each have the same structure as that of the control processing relay unit 60 according to the first example shown in FIG. 6 and is formed of an interruption instructing unit 601a, an interruption state holding unit 601b and an interruption canceling unit 601c.

Also, the communication regions 602P0 to 602Pn each basically have the same structure as that of the first example shown in FIG. 6 and is formed of a communication queue 602a as a combination of the communication reason holding region 62a and the communication data holding region 62b shown in FIG. 6, and a mutual exclusive control region 602c.

As an example, operation of the communication processing from the parallel processing communication unit 400P0 on the first processor side 100 to the processor Pn on the second processor side 200 will be described with reference to FIG. 16.

(1) The parallel processing communication unit 400P0 locks the mutual exclusive control region 602b of the communication region 602Pn for the processor Pn. More specifically, bring a lock variable stored in the mutual exclusive control region 602b to a locked state to prevent the communication region 602Pn for the processor Pn from being used by other processor.

(2) The parallel processing communication unit 400P0 stores the communication reason information and the communication data (required data including the request contents) in the communication queue 602a of the communication region 602Pn.

As the communication reason information to be stored, in a case of the communication processing for process creation/activation as mentioned above, information indicative of "activation of process" (e.g. data such as a predetermined numeric value corresponding to the parallel processing) is stored.

(3) At the time point of (1), if the communication queue 602a of the communication region 602Pn is empty, the parallel processing communication unit 400P0 instructs the interruption instructing unit 601a of its own interruption control device 601P0 to interrupt the processor Pn.

(4) The parallel processing communication unit 400P0 of the processor P0 brings the mutual exclusive control region 602b of the communication region 602Pn for the processor Pn to the unlocked state. If the communication queue 602a of the communication region 602Pn is not empty at the time point of (1), the processing terminates at this point because no interruption is required.

(5) The interruption instructing unit 601a of the interruption control device 601P0 sets information indicative of an interruption at the interruption state holding unit 601b of the interruption control device 601Pn corresponding to the processor Pn. As a result, the processor Pn enters the interrupted state.

(6) The OS 300Pn for single processors of the processor Pn accepts the interruption based on the condition of the interruption state holding unit 601b of the interruption control device 601Pn for the processor Pn.

(7) The OS 300Pn for single processors in the processor Pn releases its interrupted state by clearing the interruption information of its own interruption state holding unit 601b by means of the interruption canceling unit 601c in the interruption control device 601Pn.

(8) The OS 300Pn for single processors in the processor Pn activates its own control proxy unit 500Pn.

(9) The control proxy unit 500Pn of the processor Pn sets a lock at the mutual exclusive control region 602b of its own communication region 602Pn.

(10) The control proxy unit 500Pn of the processor Pn further deletes the communication reason information and the communication data from the communication queue 602a of its own communication region 602Pn.

(11) The control proxy unit 500Pn of the processor Pn unlocks the mutual exclusive control region 602b of the communication region 602Pn for the processor Pn. This makes the communication region 602Pn for the processor Pn be usable by other processor.

Thus, by using the control processing relay unit 600, transmission and reception of control signals and data between the first processor 100 side and the second processor 200 side is realized.

Figure 17:
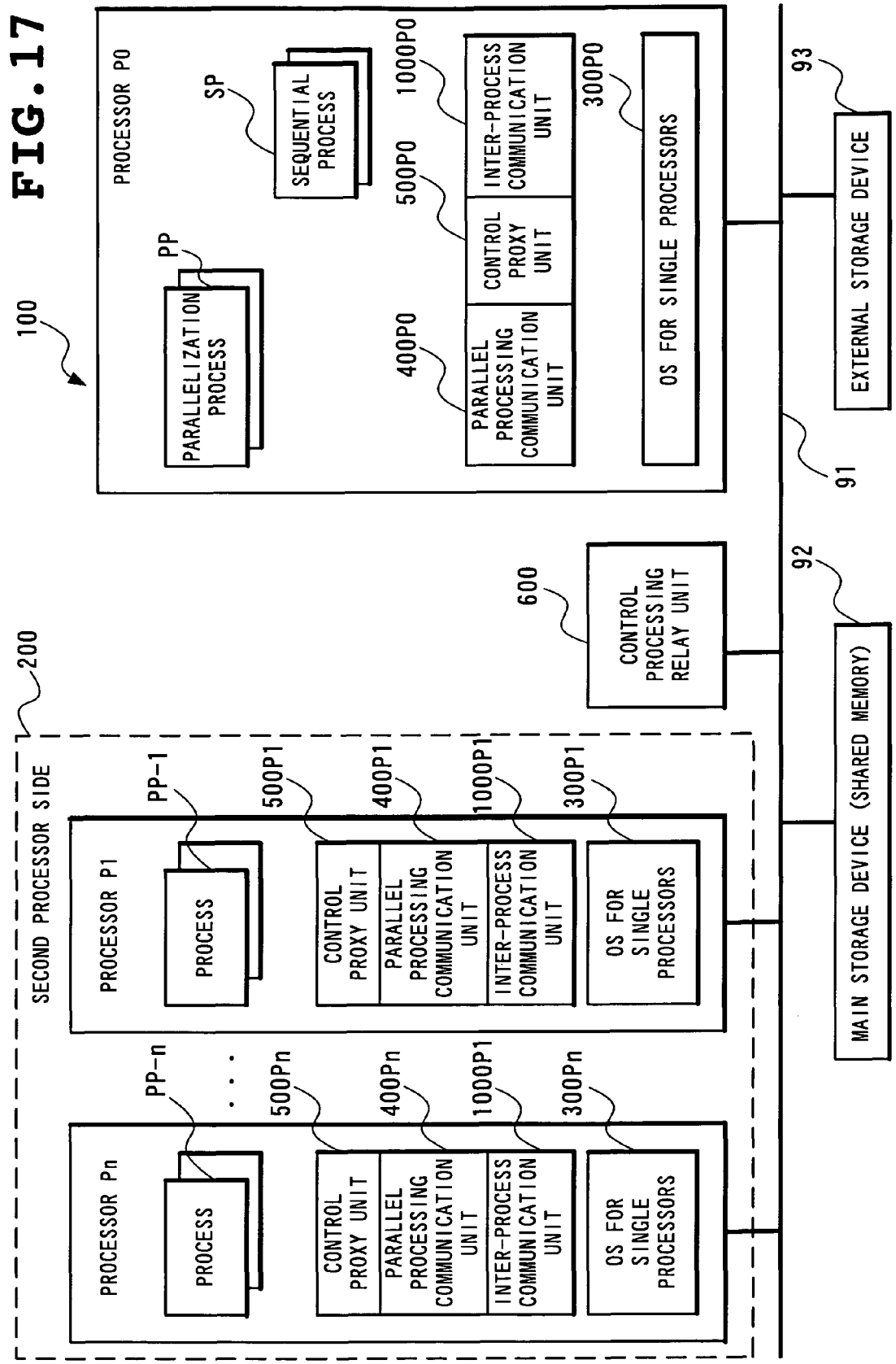
FIG. 17 is a block diagram showing a structure of a parallel processing system according to a third example to which the present invention is applied.

Next, a parallel processing system according to a third example to which the present invention is applied will be described with reference to FIG. 17 and the drawings to follow. FIG. 17 is a block diagram showing a structure of the parallel processing system according to the third example, in which components common to those in FIG. 13 are referenced by the same reference numerals.

In the above-described synchronous processing in the second example, between processes, it is necessary for one process to repeat checking whether data on the main storage device 92 is updated by other process, resulting in requiring extra processing as much as the repetition, while the present example enables high-performance synchronization and data transmission and reception between processes which require none of such extra processing.

As shown in FIG. 17, the parallel processing system according to the third example includes, similarly to the second example, a multiprocessor composed of a plurality of processors (CPU) P0 to Pn (n is an integer not less than 1) connected through a system bus 91 which is logically divided into two groups of a first processor side 100 and a second processor side 200, with OSes 300P0 to 300Pn for single processors mounted which operate on the processor P0 on the first processor side 100 and the processors (CPU) P1 to Pn on the second processor side 200.

The third example is characterized in further including, in addition to the parallel processing communication units 400P0~400Pn for executing parallel processing of the processor P0 on the first processor side 100 and the processors P1 to Pn on the second processor side 200 and the control proxy units 500P0 to 500Pn in the second embodiment, inter-process communication units 1000P0 to 1000Pn for realizing communication between the respective processes executed on the processor P0 on the first processor side 100 and on the processors P1 to Pn on the second processor side 200.

In other words, the present example enables the inter-process communication function which is conventionally mounted on an OS for multiprocessors to be realized on a parallel processing system by an OS for single processors which operates an OS and an application for single processors on a multiprocessor, thereby enabling an inter-process communication function to be provided on a user-level.

Since also in the present example, the proxy unit 70 by which the OS 300P0 for single processors on the first processor side 100 communicates with a process executed on the second processor side 200 as shown in the first example executes completely the same function as that in the first example, no description will be made thereof for the sake of convenience.

Since structure and operation of other components than the above-described inter-process communication units 1000P0 to 1000Pn are completely the same as those described above in the second example, description will be made only of the inter-process communication units 1000P0 to 1000Pn.

The inter-process communication units 100P0 to 1000Pn realize communication between the processes executed on the processors P1 to Pn by using such system as a semaphore or a message queue.

Description will be made here with respect to a case where the inter-process communication units 1000P0 to 1000Pn conduct inter-process communication using the semaphore system.

Figure 18:
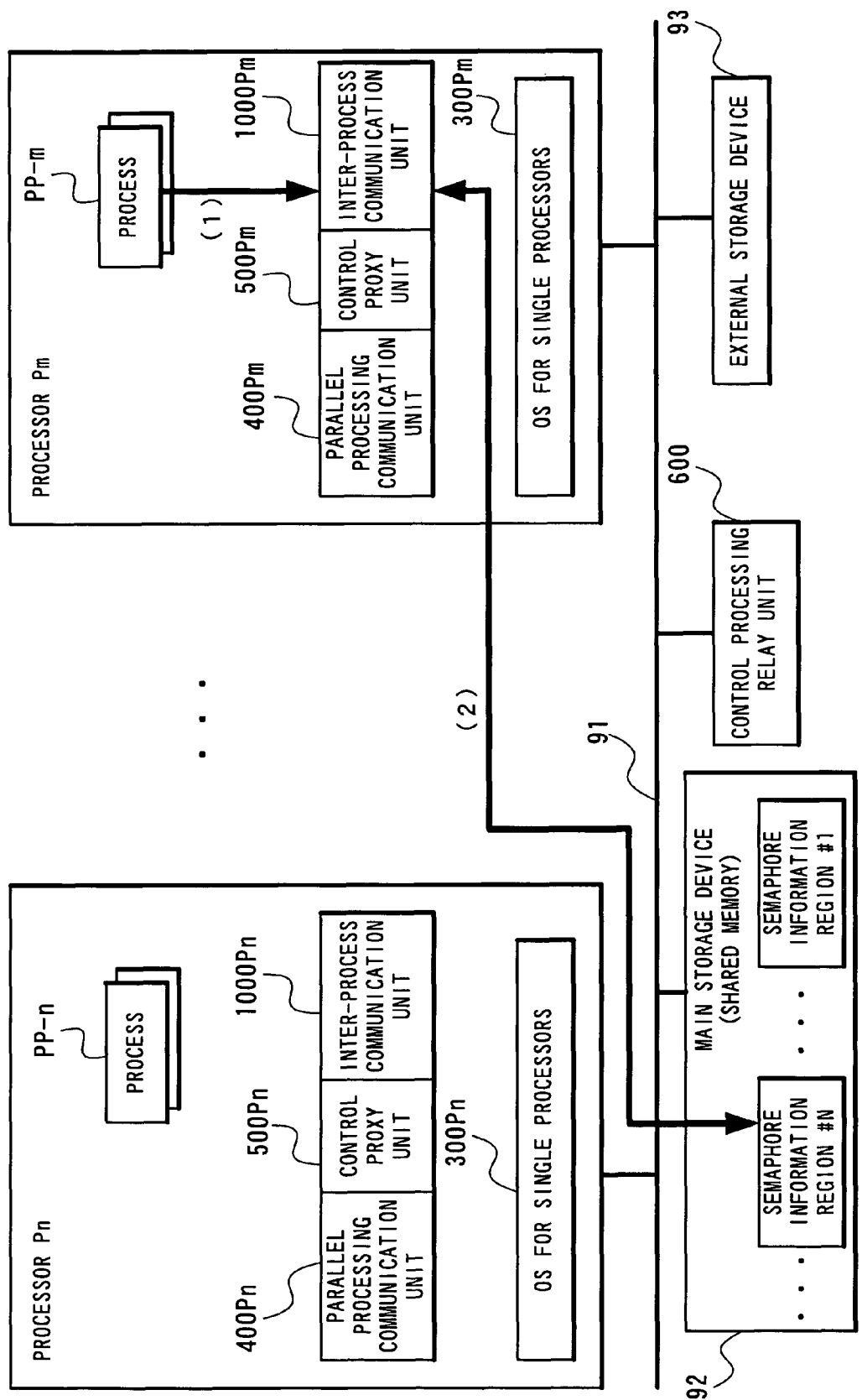
FIG. 18 is a diagram for use in explaining operation to be executed when a process in a processor conducts semaphore-up or -down by using a semaphore system by means of an inter-process communication unit in the parallel processing system according to the third example.

As illustrated in FIG. 18, description will be made of a case where when a process PP-m and a process PP-n are executed on a processor Pm and a processor Pn on the second processor side 200, respectively, the process PP-m and the process PP-n communicate by using the semaphore system by means of the inter-process communication units 1000Pm and 1000Pn.

Semaphore is a system for a plurality of processes to communicate and synchronize with each other on a multi-task OS on which a plurality of processes are simultaneously executed and is a kind of shared flag (counter) to which processes to be synchronized with each other pay attention to execute processing according to a change of the counter, thereby realizing communication (synchronization).

First, with reference to FIG. 18, description will be made of operation of the process PP-m on the processor Pm of upping or downing a semaphore information region (shared flag) of the main storage device 92. Assume here that semaphore-up is to increment a counter value of the semaphore information region and semaphore-down is to decrement the counter value of the semaphore information region. When semaphore-down is not allowed, the process sleeps to enter a waiting state and is waked up by semaphore-up.

(1) When the process PP-m on the processor Pm ups or downs the semaphore (semaphore counter), it makes a request to that effect to the inter-process communication unit 1000Pm.

(2) The inter-process communication unit 1000Pm having received the request accesses a semaphore information region #N (as many semaphore information regions as a number predetermined by the system are ensured) as a shared flag distinguishable by a semaphore number ensured in the main storage device 92 to determine whether the semaphore can be upped or downed.

Figure 19:
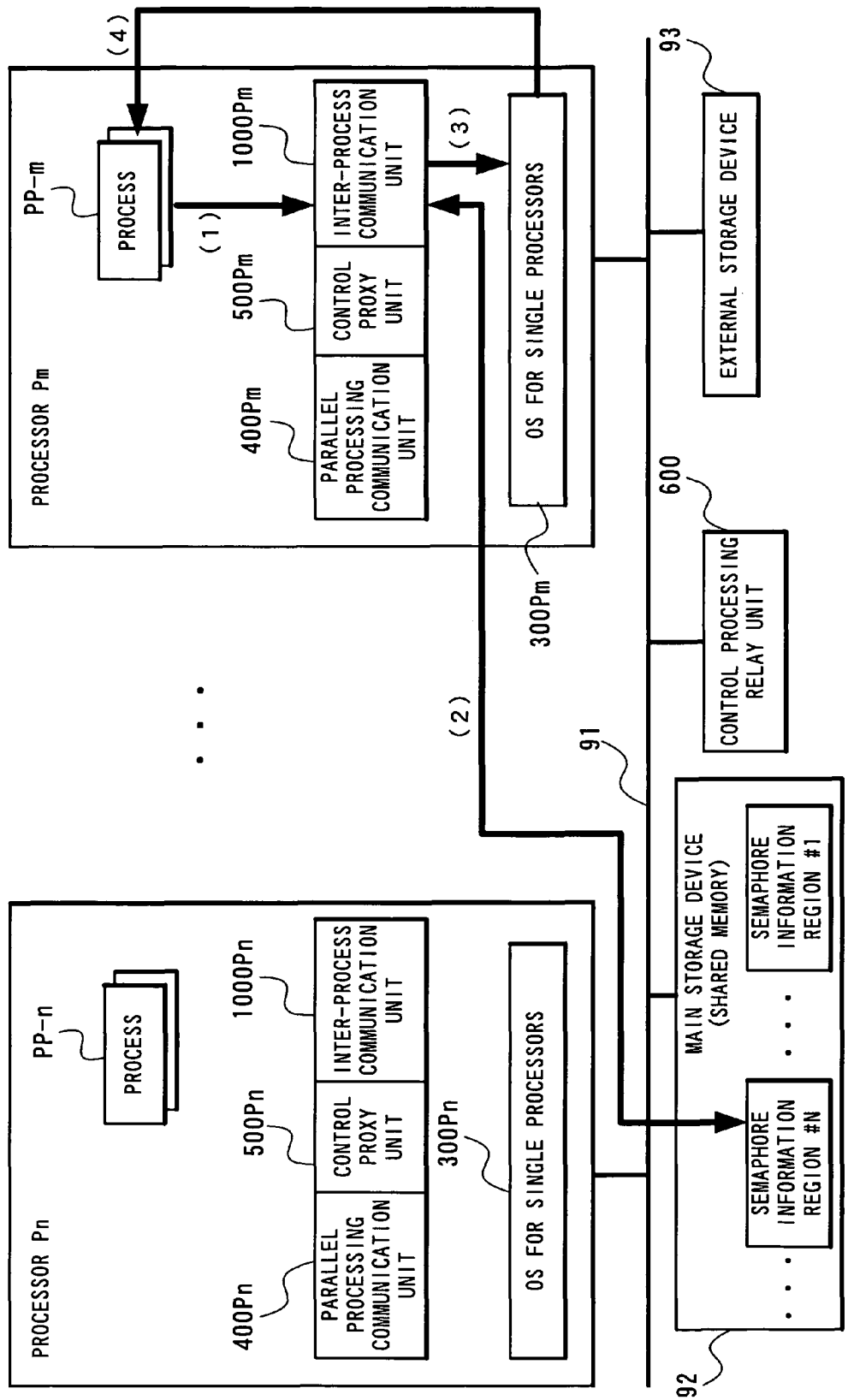
FIG. 19 is a diagram for use in explaining operation to be executed when a process in a processor conducts semaphore-down by using the semaphore system by means of the inter-process communication unit in the parallel processing system according to the third example.

Next, with reference to FIG. 19, description will be made of a case where the process PP-m on the processor Pm downs the semaphore (semaphore flag).

(1) The process PP-m on the processor Pm requests the inter-process communication unit 1000Pm to down the semaphore (semaphore flag).

(2) The inter-process communication unit 1000Pm having received the request accesses the semaphore information region #N ensured in the main storage device 92. Here, an initial value "0" is set as a counter value of the semaphore at the semaphore information region #N and is fixed not to be downed in advance even trying. It is therefore determined that the semaphore can not be downed.

(3) The inter-process communication unit 1000Pm requests the OS 300Pm for single processors to make the process PP-m sleep by using a system call.

(4) The OS 300Pm for single processors makes the process PP-m sleep by using the system call to take out the same from a run queue.

In other words, being not allowed to down the semaphore in the above-described case, the process PP-m sleeps.

Figure 20:
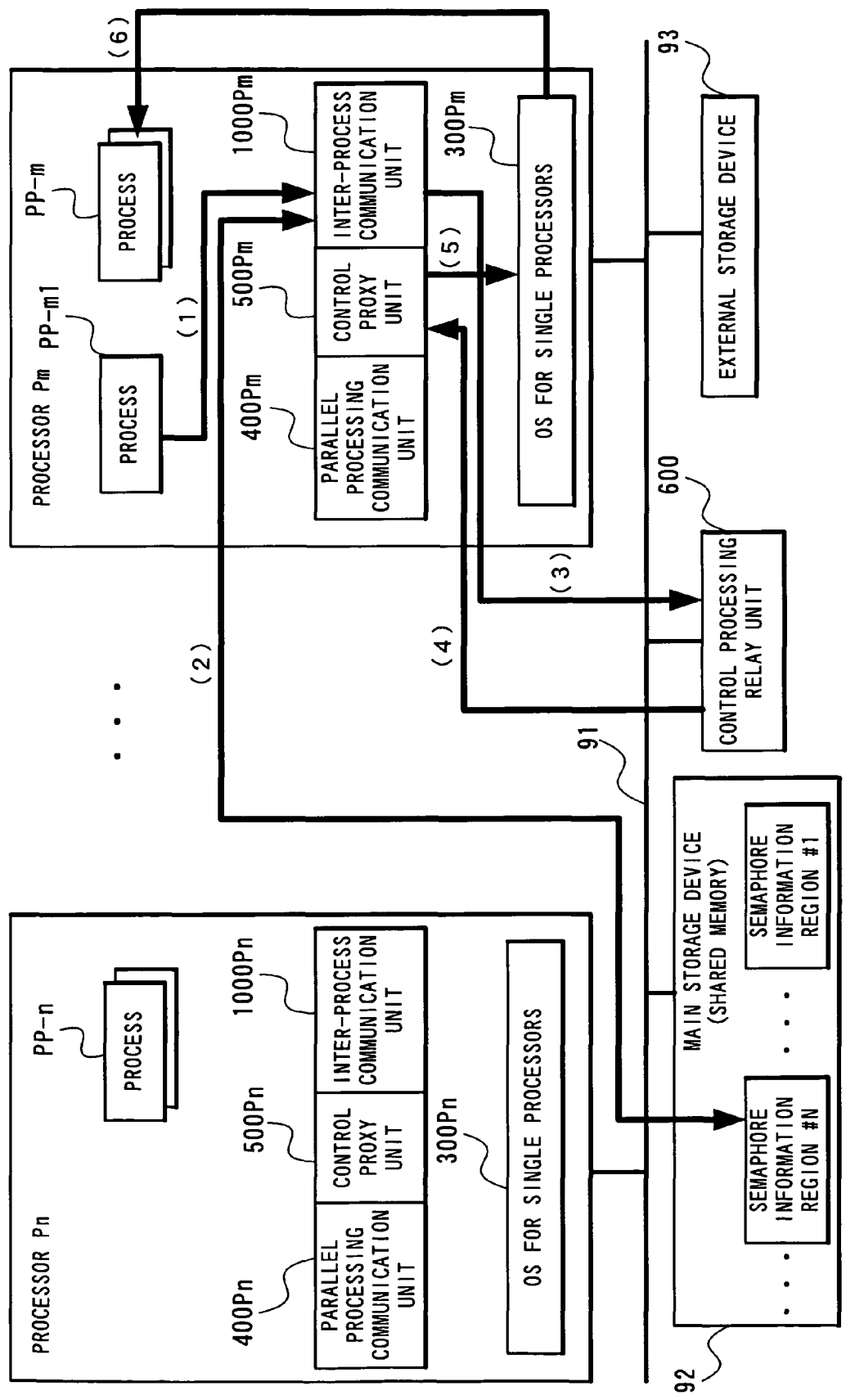
FIG. 20 is a diagram for use in explaining operation to be executed when semaphore-up is conducted between processes in the same processor by using the semaphore system by means of the inter-process communication unit in the parallel processing system according to the third example.

Moreover, with reference to FIG. 20, description will be made of operation executed when with the process PP-m sleeping as described above, a process PP-m1 on the same processor Pm ups the semaphore.

(1) The process PP-m1 requests the inter-process communication unit 1000Pm to up the semaphore.

(2) The inter-process communication unit 1000Pm accesses the semaphore information region #N ensured in the main storage device 92 to determine that there exists the process PP-m waiting for semaphore.

(3) The inter-process communication unit 1000Pm further transmits a message (control message) to a control processing relay unit 600 to request wake-up of the process PP-m.

(4) The control proxy unit 500Pm receives the message from the control processing relay unit 600. Message relay by the control processing relay unit 600 is conducted based on the operation described with reference to FIGS. 15 and 16.

(5) The control proxy unit 500Pm determines from the message that the request is made for wake-up of a process waiting for semaphore to give the OS 300Pm for single processors a request for waking up the process PP-m at the waiting state by using a system call.

(6) The OS 300Pm for single processors wakes up the requested process PP-m by using the system call to connect the same to a run queue. In this case, the waked up process PP-m again tries to down the semaphore.

Requesting wake-up of the process PP-m directly from the inter-process communication unit 1000Pm to the control proxy unit 500Pm by using the communication function of the OS 300Pm for single processors without using control message relay by means of the control processing relay unit 600 described in the processing (3) and (4) set forth above leads to elimination of the processing (3) and (4) to enable high-speed processing.

Figure 21:
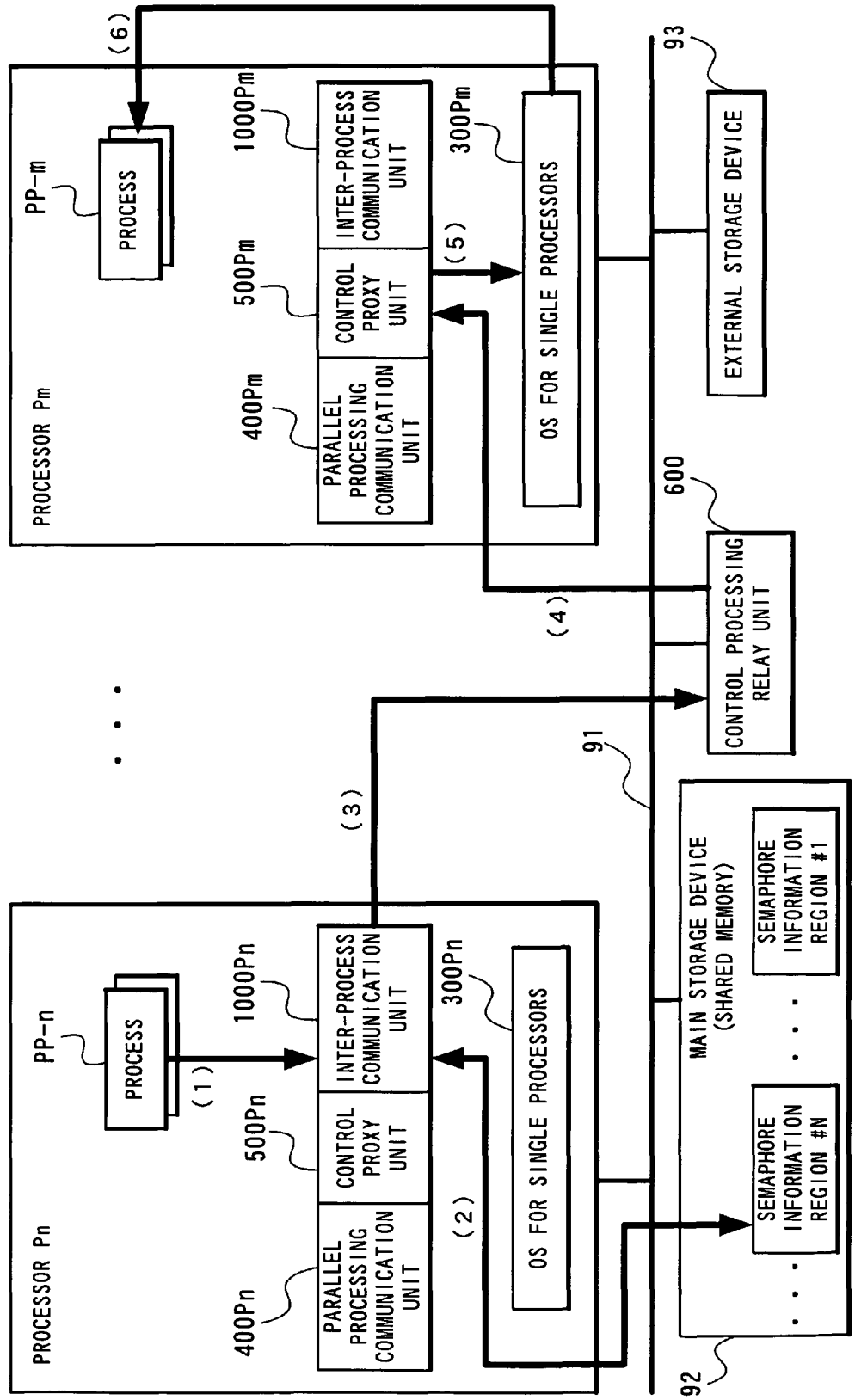
FIG. 21 is a diagram for use in explaining operation to be executed when semaphore-up is conducted between processes in different processors by using the semaphore system by means of the inter-process communication unit in the parallel processing system according to the third example.

With reference to FIG. 21, description will be made of operation executed in a case where with the process PP-m on the processor Pm sleeping as described above, the process PP-n on other processor Pn ups the semaphore.

(1) The process PP-n on the processor Pn requests semaphore-up from the inter-process communication unit 1000P$n$ of its own processor Pn.

(2) The inter-process communication unit 1000P$n$ accesses the semaphore information region #N ensured in the main storage device 92 to determine that there exists the process PP-m waiting for semaphore.

(3) The inter-process communication unit 1000P$n$ further transmits a message (control message) to the control processing relay unit 600 to request wake-up of the process PP-m.

(4) Subsequently, the control proxy unit 500P$m$ of the processor Pm receives the message from the control processing relay unit 600. Message relay by the control processing relay unit 600 is conducted based on the operation described with reference to FIGS. 15 and 16.

(5) The control proxy unit 500P$m$ determines from the message that the request is made for wake-up of a process waiting for semaphore to give the OS 300P$m$ for single processors a request for waking up the process PP-m at the waiting state by using a system call.

(6) The OS 300P$m$ for single processors wakes up the requested process PP-m by using the system call to connect the same to a run queue. In this case, the waked up process PP-m again tries to down the semaphore.

Figure 22:
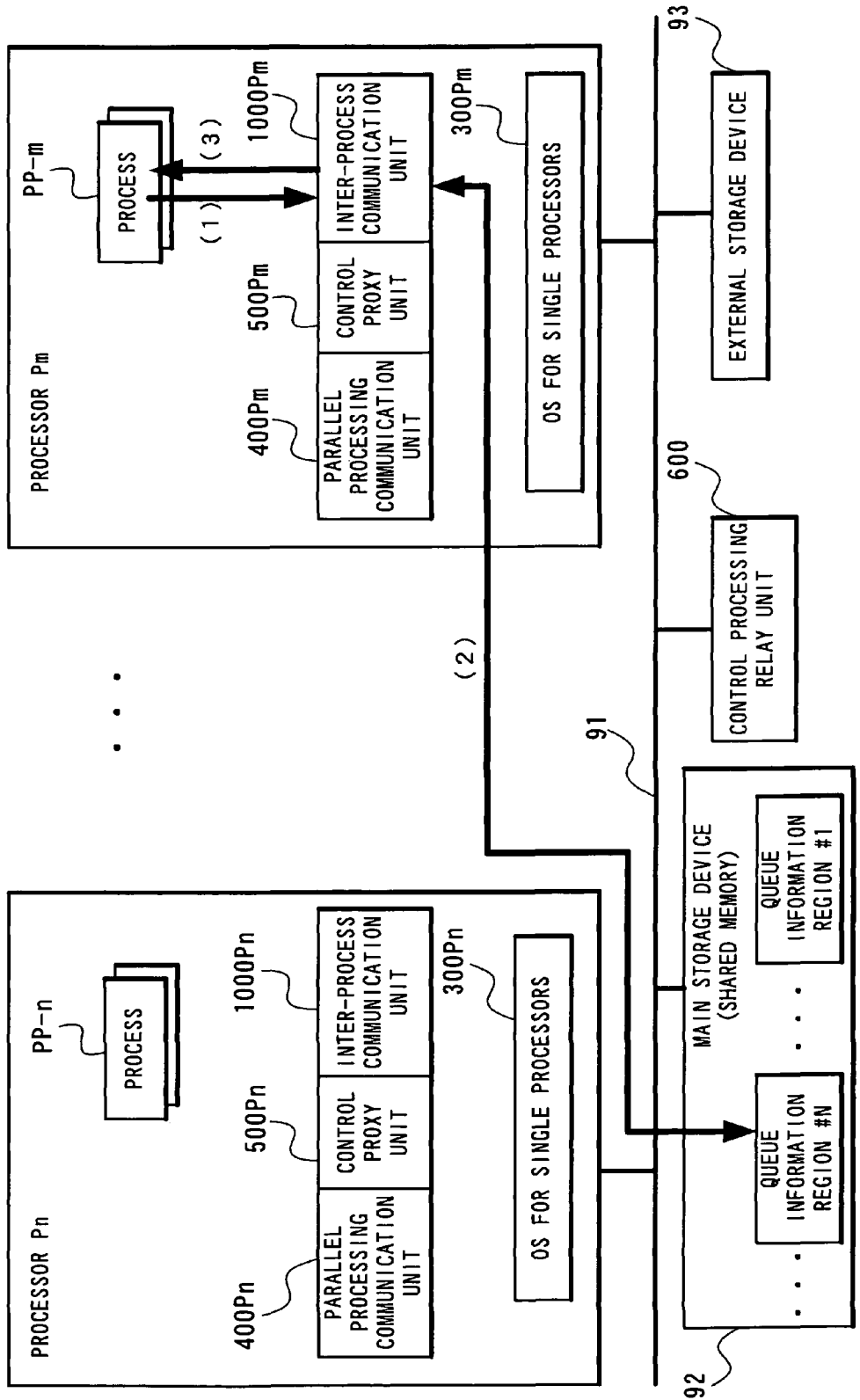
FIG. 22 is a diagram for use in explaining operation to be executed when a process in a processor receives a message by using a message queue system by means of the inter-process communication unit in the parallel processing system according to the third example.

Next, as shown in FIG. 22, description will be made of a case where with the process PP-m and the process PP-n being executed on the processor Pm and the processor Pn on the second processor side 200, the process PP-m and the process PP-n communicate with each other by using a message queue system by means of the inter-process communication units 1000P$m$ and 1000P$n$.

Message queue system, which is a communication method between a plurality of processes, is a system of creating a "queue" as literally indicated by the name and storing a message (processed data transmitted and received between processes) as information in the queue. In the message queue system, a receiver side process is allowed to receive the message in an arbitrary order. When any of the processes receives the message, the message will disappear from the queue.

With reference to FIG. 22, description will be made of a case where the process PP-m on the processor Pm receives a message by using the message queue system. In this case, a message to be obtained exists in a queue information region #N (as many queue information regions as a number predetermined by the system are ensured) distinguishable by a queue number ensured in the main storage device 92.

(1) In order to receive a message, the process PP-m on the processor Pm makes a requests to that effect to the inter-process communication unit 1000P$m$.

(2) The inter-process communication unit 1000P$m$ having received the request accesses the queue information region #N ensured in the main storage device 92 to receive the message.

(3) Then, the inter-process communication unit 1000P$m$ copies the received message onto the requesting source process PP-m. At this time point, the message is erased from the queue information region #N ensured in the main storage device 92.

Next, with reference to FIG. 23, description will be made of second operation executed when the process PP-m on the processor Pm receives a message by the message queue system. In this case, a message to be obtained fails to exist in the queue information region #N ensured in the main storage device 92.

(1) In order to receive a message, the process PP-m on the processor Pm makes a request to that effect to the inter-process communication unit 1000P$m$.

(2) The inter-process communication unit 1000P$m$ having received the request accesses the queue information region #N ensured in the main storage device 92. In this case, determination is made that the message to be obtained fails to exist in the ensured queue information region #N to disable reception of the message.

(3) The inter-process communication unit 1000P$m$ requests the OS 300P$m$ for single processors to make the process PP-m sleep by using a system call.

(4) The OS 300P$m$ for single processors makes the process PP-m sleep by using the system call to disconnect the same from the run queue.

In other words, the process PP-m is not allowed to receive the message, so that it sleeps in the above-described case.

Figure 24:
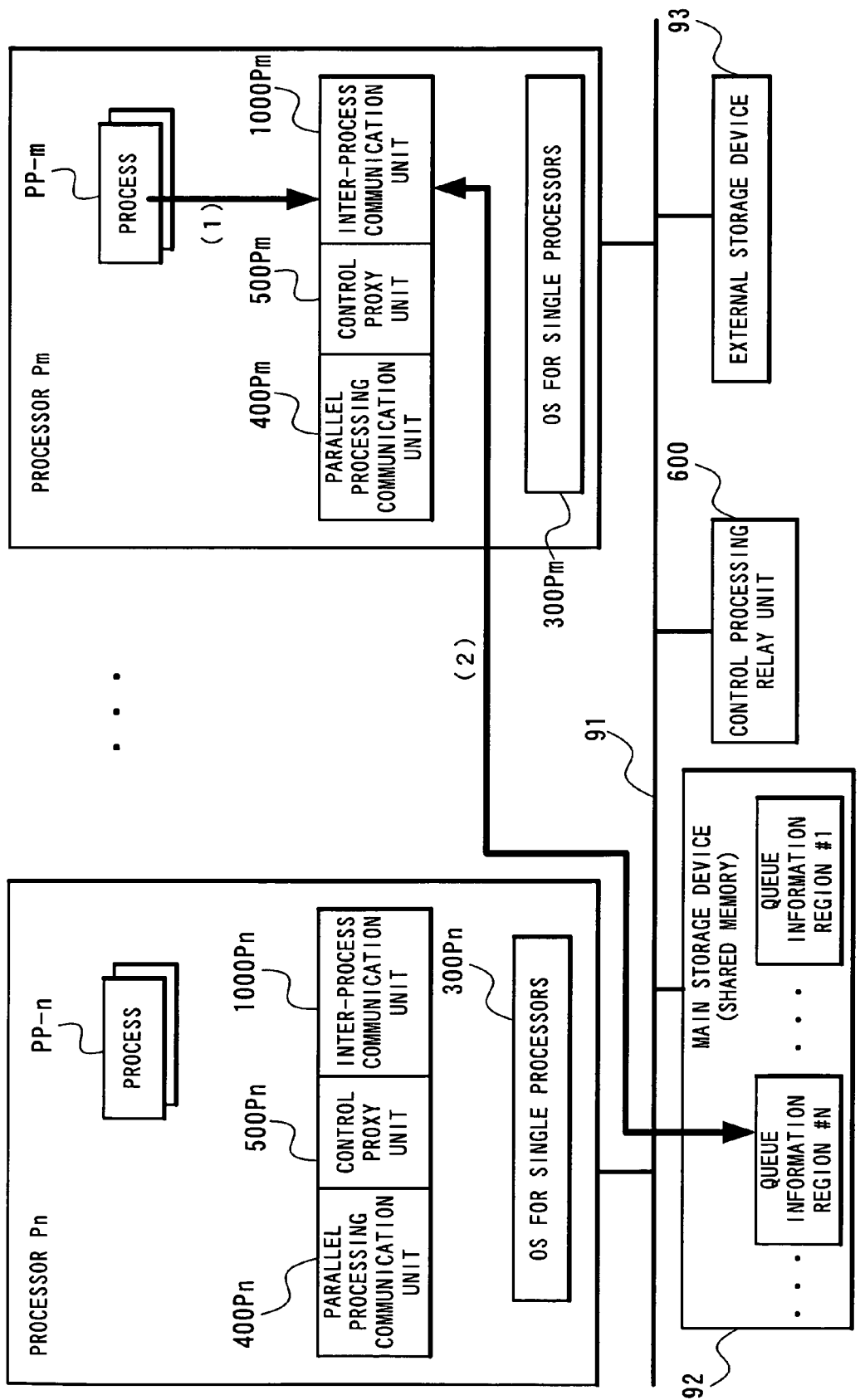
FIG. 24 is a diagram for use in explaining operation to be executed when a process in a processor transmits a message by using the message queue system by means of the inter-process communication unit in the parallel processing system according to the third example.

With reference to FIG. 24, description will be made of operation executed when the process PP-m on the processor Pm transmits a message by the message queue system. In this case, no process exists which is waiting for a message to be transmitted and only the message transmission to the queue information region #N ensured in the main storage device 92 is conducted.

(1) In order to transmit a message, the process PP-m on the processor Pm makes a request to that effect to the inter-process communication unit 1000P$m$.

(2) The inter-process communication unit 1000P$m$ having received the request accesses the queue information region #N ensured in the main storage device 92 to store the message from the process PP-m.

Figure 25:
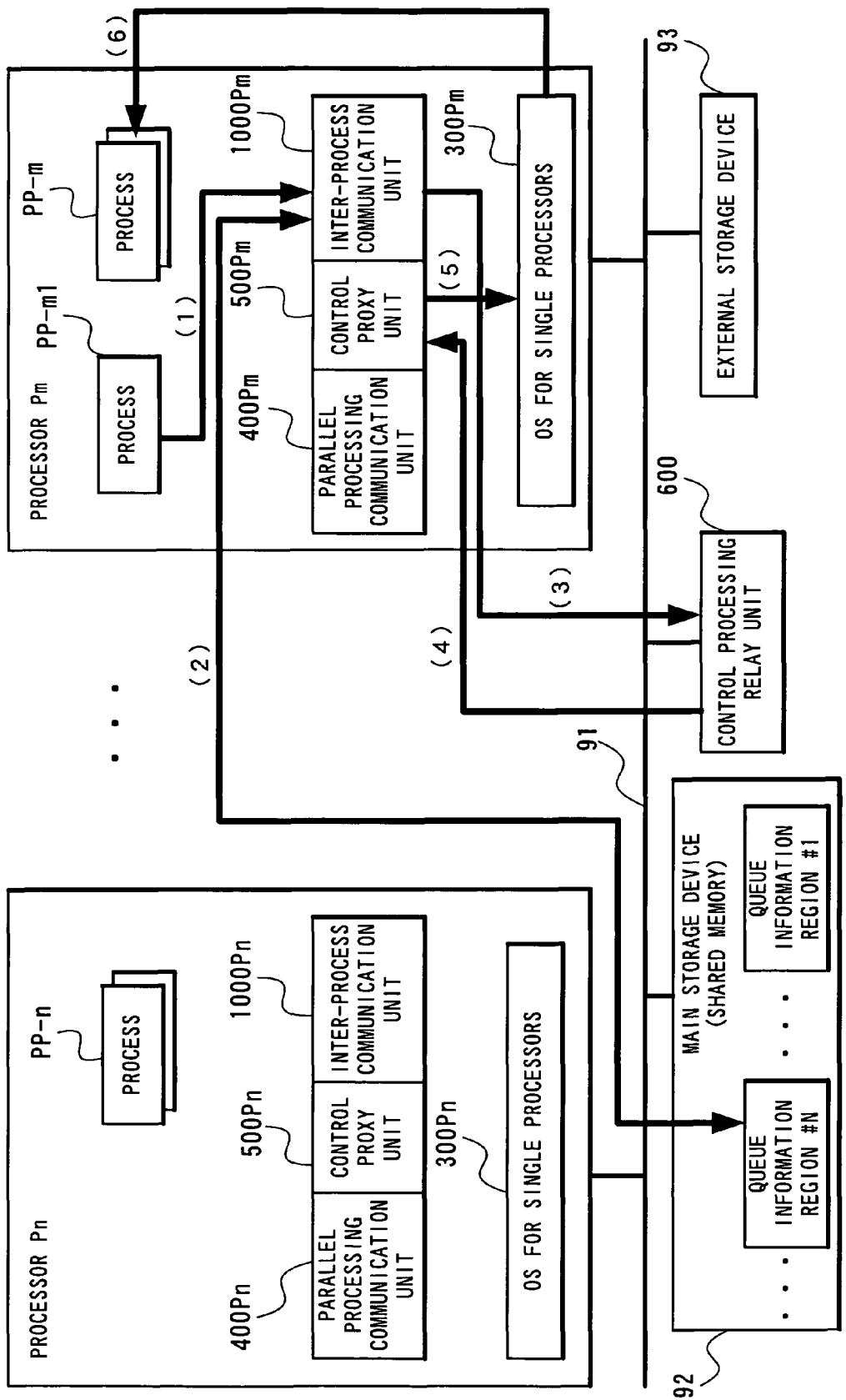
FIG. 25 is a diagram for use in explaining operation to be executed when message transmission and reception is conducted between processes in the same processor by using the message queue system by means of the inter-process communication unit in the parallel processing system according to the third example.

With reference to FIG. 25, description will be further made of operation executed when a process on the processor Pm transmits a message by the message queue system. In this case, there exists a process waiting for a message to be transmitted. In other words, this is a case where with the process PP-m being unable to receive a message and sleeping, a message is sent from a process PP-m1 as shown in the example in FIG. 23.

(1) The process PP-m1 requests message transmission from the inter-process communication unit 1000P$m$.

(2) The inter-process communication unit 1000P$m$ accesses the queue information region #N ensured in the main storage device 92 to store the message from the process PP-m1. Here, determination is made that there exists the process PP-m waiting for a message.

(3) The inter-process communication unit 1000P$m$ further transmits a control message to the control processing relay unit 600 to request wake-up of the process PP-m.

(4) The control proxy unit 500P$m$ receives the control message from the control processing relay unit 600.

(5) The control proxy unit 500P$m$ determines from the control message that the command is for waking up a process waiting for a message and requests the OS 300P$m$ for single processors to wake up the above-described process PP-m at the waiting state by using a system call.

(6) The OS 300P$m$ for single processors wakes up the requested process PP-m by using the system call to connect the same to the run queue.

In this case, the waked up process PP-m again tries to receive the message. As a result, the message from the process PP-m1 is received by the process PP-m.

Requesting wake-up of the process PP-m directly from the inter-process communication unit 1000P*m* to the control proxy unit 500P*m* by using the communication function of the OS 300P*m* for single processors without using control message relay by the control processing relay unit 600 shown in the above-described processing (3) and (4) leads to elimination of the processing (3) and (4) to enable high-speed processing.

Figure 23:
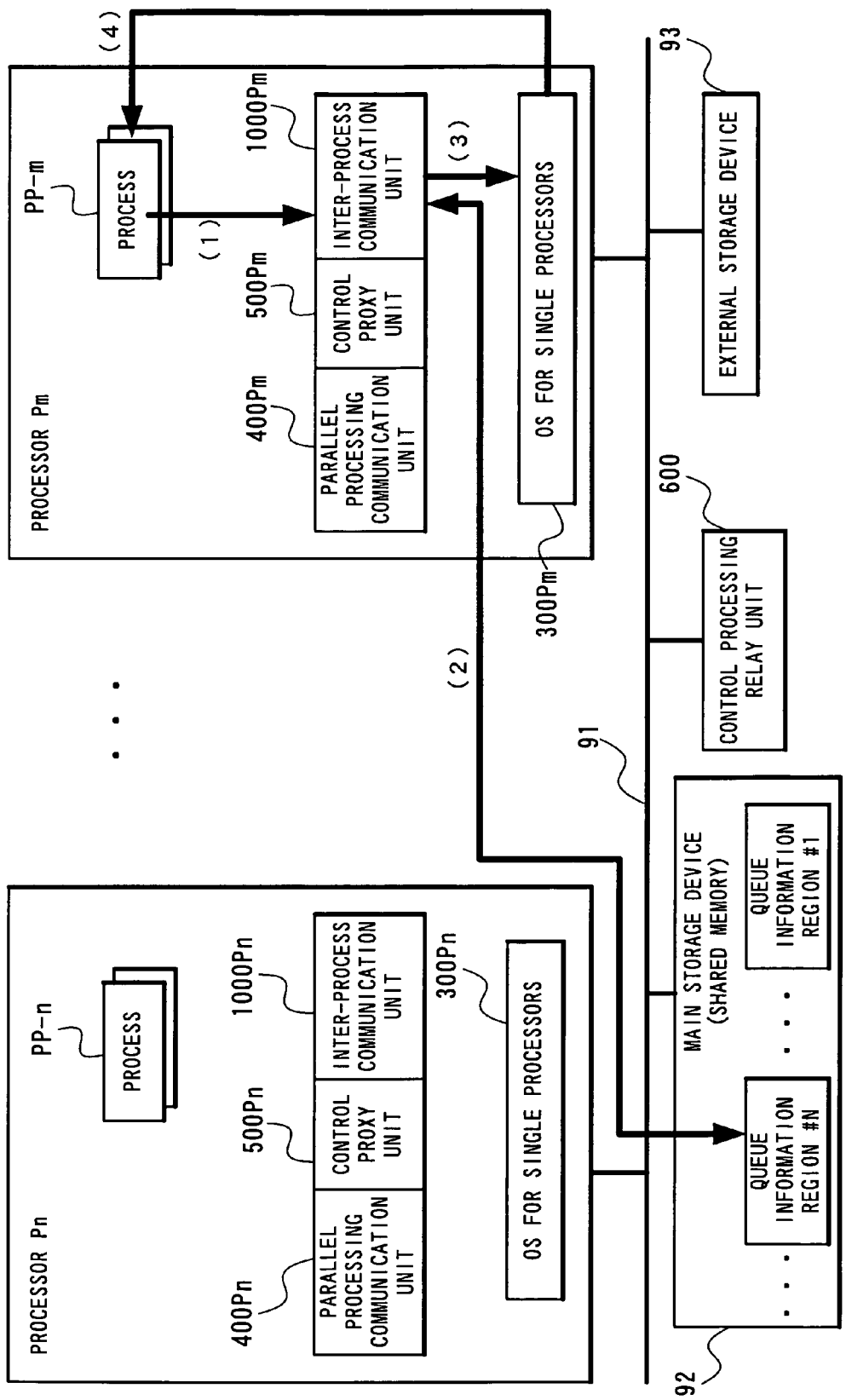
FIG. 23 is a diagram for use in explaining operation to be executed when a process in a processor receives a message by using the message queue system by means of the inter-process communication unit in the parallel processing system according to the third example.
Figure 26:
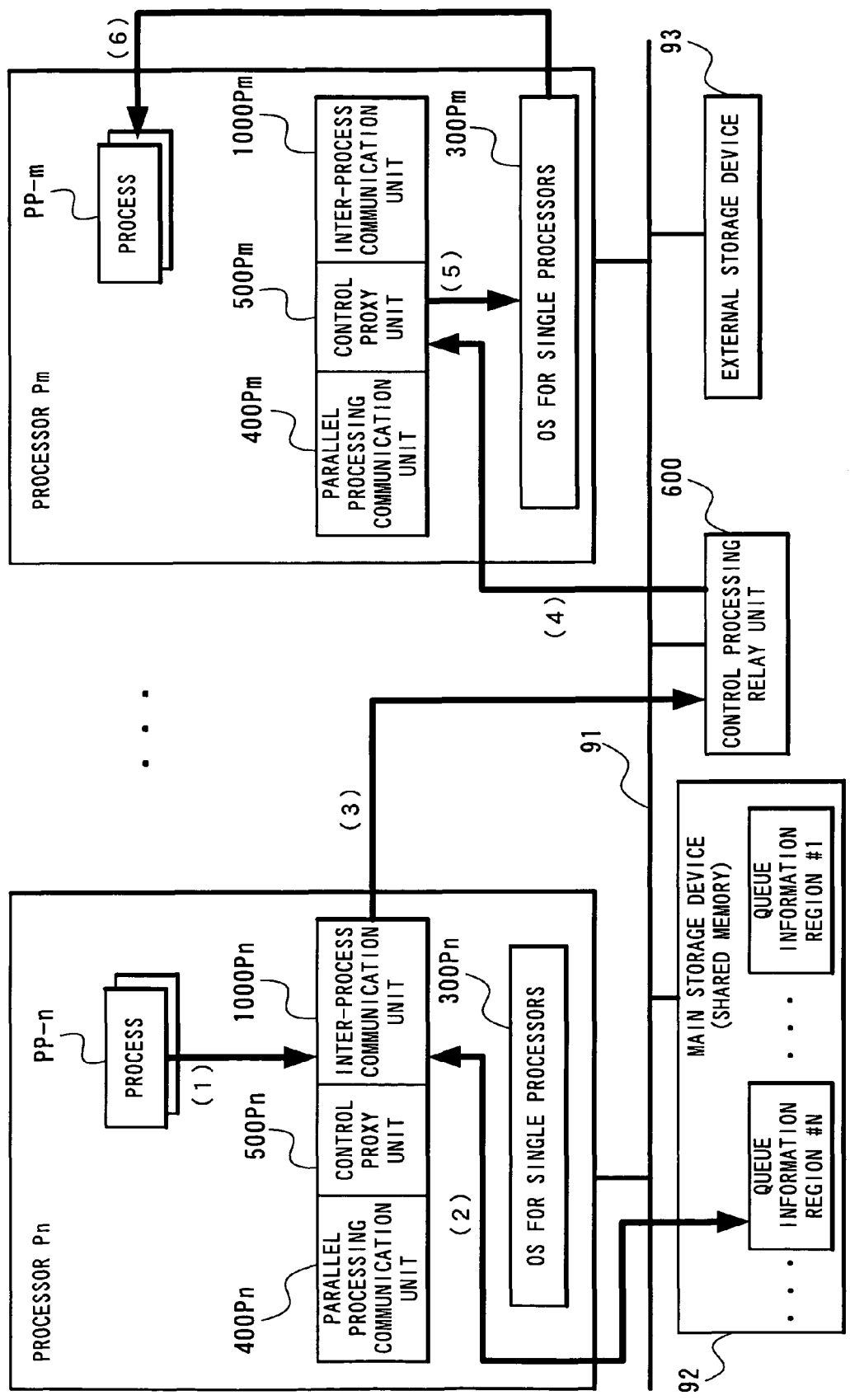
FIG. 26 is a diagram for use in explaining operation to be executed when message transmission and reception is conducted between processes in different processors by using the message queue system by means of the inter-process communication unit in the parallel processing system according to the third example.

With reference to FIG. 26, description will be made of operation executed in a case where with the process PP-m on the processor Pm sleeping to wait for a message, the process PP-n on other processor Pn transmits a message as shown in FIG. 23.

(1) The process PP-n on the processor Pn requests the inter-process communication unit 1000P*n* of its own processor Pn to transmit a message.

(2) The inter-process communication unit 1000P*n* accesses the queue information region #N ensured in the main storage device 92 to store the message from the process PP-n. It is determined here that there exists the process PP-m waiting for a message.

(3) The inter-process communication unit 1000P*n* further transmits a control message to the control processing relay unit 600 to request wake-up of the process PP-m.

(4) Subsequently, the control proxy unit 500P*m* of the processor Pm receives the control message from the control processing relay unit 600.

(5) The control proxy unit 500P*m* determines from the control message that the command is for waking up a process waiting for a message and gives the OS 300P*m* for single processors a request for waking up the above-described process PP-m at the waiting state by using a system call.

(6) The OS 300P*m* for single processors wakes up the requested process PP-m by using the system call to connect the same to a run queue.

In this case, the waked up process PP-m again tries to receive the message. As a result, the message from the process PP-n is received by the process PP-m to execute inter-process communication between different processors.

According to the present example, process control such as process switching and data transmission and reception are enabled by process communication (synchronization or message transmission and reception) within the same processor or between different processors by the inter-process communication units 100P0 to Pn by using the semaphore system or the message queue system in the manner as described in the foregoing.

Although inter-process communication by an OS for single processors is conducted limitedly between processes in the same processor and process communication between different processors should be conducted by using a network having heavy processing loads or the like, using the semaphore system and the message queue system by the control processing relay unit 600 and the inter-process communication units 1000P0 to Pn whose processing speed is faster than that of network communication realizes inter-process communication having a high processing speed also in a multiprocessor system mounted with an OS for single processors.

As to inter-process communication within the same processor, substantially equivalent performance can be obtained to the processing performance required from sleep to wake-up of a process by an OS for single processors.

A further advantage is that unlike an OS for multiprocessors, even if each processor is mounted with a different OS for single processors, inter-process communication between processors is possible.

Next, description will be made of a specific example of the above-described inter-process communication by using the semaphore system and the message queue system by means of the inter-process communication units 1000P0 to 1000P*n* with reference to FIG. 27.

Figure 27:
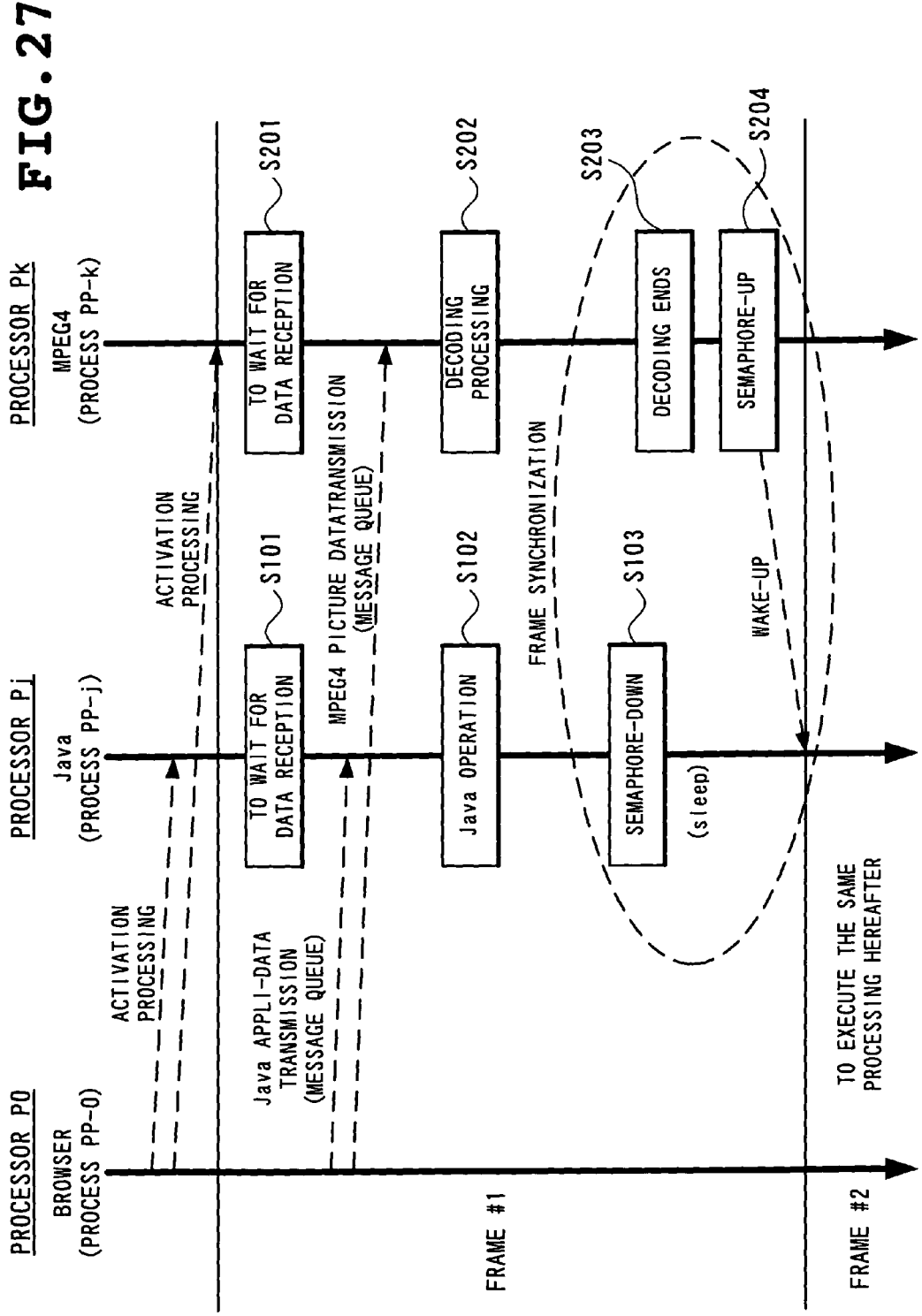
FIG. 27 is a diagram for use in explaining a specific example of inter-process communication by using the semaphore system and the message queue system in the parallel processing system according to the third example.
Figure 28:
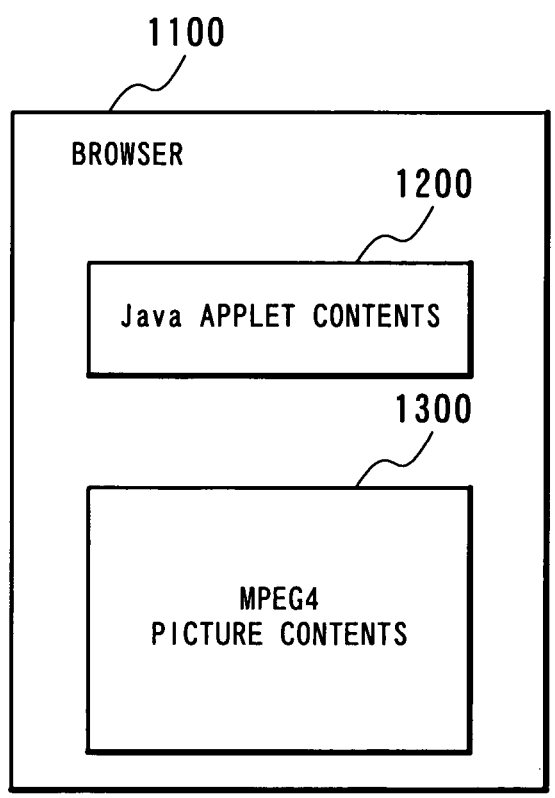
FIG. 28 is a diagram for use in explaining display contents on a browser screen in the specific example shown in FIG. 27.

In FIG. 27, the process PP-0, a process PP-j and the process PP-k are executed on the processor P0, a processor Pj and the processor Pk, respectively. Here, the process PP-0 operates as a browser, the process PP-j as a java applet and the process PP-k as an MPEG4 application and as illustrated in FIG. 28, within a window embedded in a browser 1100 by the process PP-0, java applet contents 1200 by the process PP-j and MPEG4 picture contents 1300 by the process PP-k are displayed in synchronization with each other.

In this example, among the units of work of the application operating on the OS 300P0 for single processors on the first processor side 100, the process PP-0 is operated on the processor P0 and the process PP-j and the process PP-k, which are the processes that can be parallelized within the application, are parallel-processed in the processor Pj and the processor Pk on the second processor side 200.

In FIG. 27, when the java applet (process PP-j) and the MEPG4 application (process PP-k) are activated, both wait for reception of java application data and MPEG4 picture data from the browser (process PP-0) (Steps S101 and S201).

Here, from the process PP-0 of the processor P0, by using message transmission by means of the inter-process communication unit 1000P0, the java application data and the MPEG4 picture data are transmitted as a message and received by the java applet (process PP-j) and the MPEG4 application (process PP-k).

As a result, operation by the java applet (process PP-j) is started (Step S102) to start decoding processing by the MPEG4 application (process PP-k) (Step S202).

In this example, since it is clear in advance that operation by the java applet (process PP-j) ends earlier than the decoding processing by the MPEG4 application (process PP-k), the initial value of the semaphore counter is set to "0" such that after finishing the operation, the java applet (process PP-j) waits for completion of the processing by the MPEG4 application (process PP-k), thereby preventing the java applet (process PP-j) having finished the operation earlier from downing the semaphore. In addition, the MPEG4 application (process PP-k) is defined to up the semaphore after finishing the processing.

Although the java applet (process PP-j) tries to down the semaphore (Step S103), it can not down the same because the initial value of the counter is "0", so that it sleeps to wait for semaphore.

When the MPEG4 application (process PP-k) ends the processing (Step S203), it requests semaphore-up (Step S204). As a result, the java applet (process PP-j) waiting for semaphore is waked up and allowed to down semaphore.

Repeating the foregoing operation for each frame results in displaying the contents 1200 of the java applet by the process PP-j and the MEPG4 picture contents 1300 by the process PP-k in synchronization with each other within the window embedded in the browser 1100 by the process PP-0.

Figure 29:
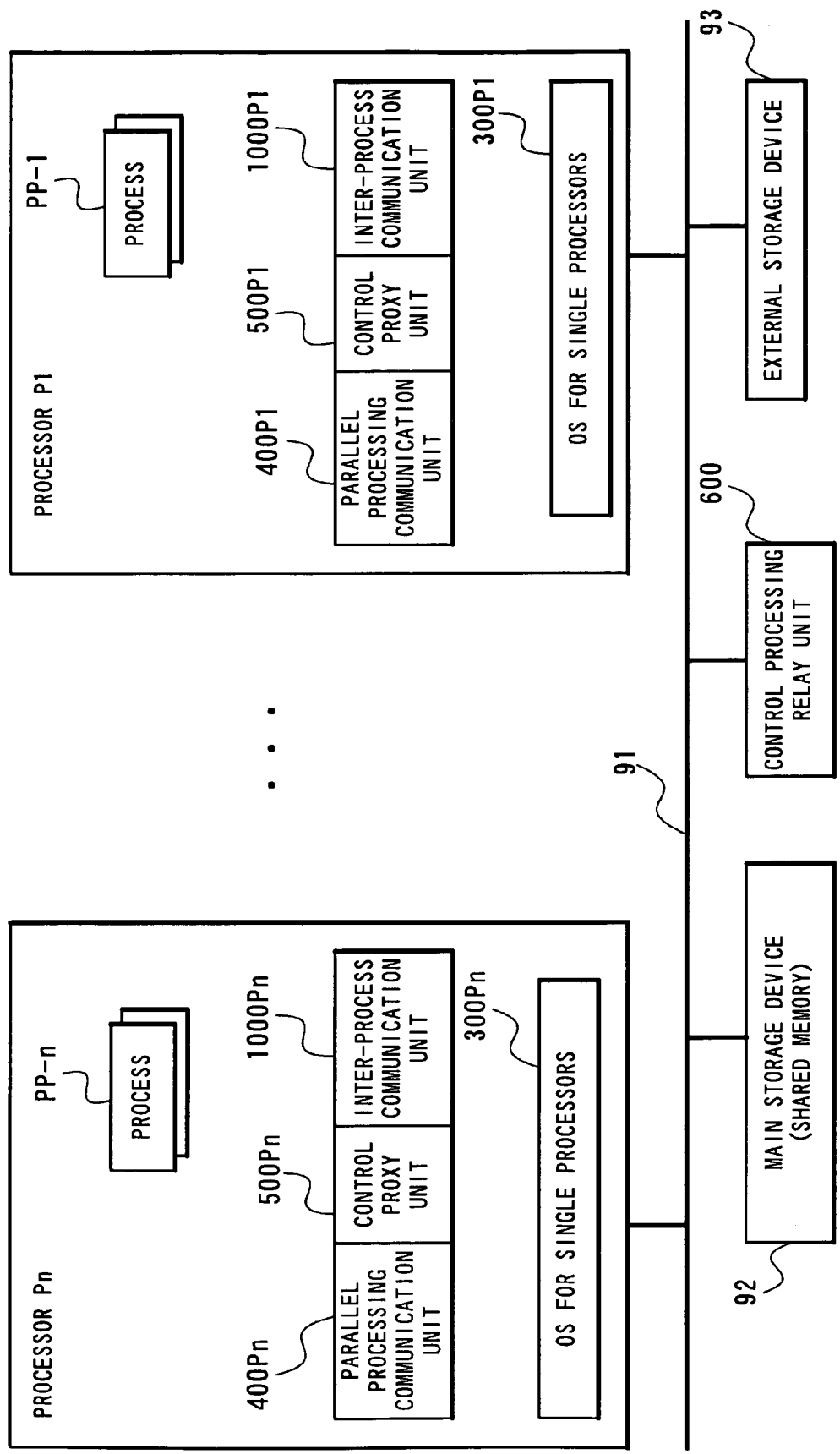
FIG. 29 is a block diagram showing a structure of a parallel processing system according to a fourth example to which the present invention is applied.

Next, a parallel processing system according to a fourth example of the present invention will be described with reference to FIG. 29. FIG. 29 is a block diagram showing a structure of the parallel processing system according to the fourth example, in which components common to those in FIG. 13 are referenced by the same reference numerals.

As shown in FIG. 29, the parallel processing system according to the fourth example includes a multiprocessor composed of a plurality of processors (CPU) P1~Pn (n is an integer not less than 2) connected through a system bus 91, which are mounted with OSes 300P1 to 300P*n* for single processors operating on the respective processors P1 to Pn.

More specifically, the present example differs from the first to third examples in that the multiprocessor is not logically divided into two groups, the first processor side and the second processor side.

The fourth example, similarly to the above-described third example, is characterized in further including, in addition to parallel processing communication units 400P1 to 400P*n* and control proxy units 500P1 to 500P*n* for executing parallel processing of the processors P1 to Pn, inter-process communication units 1000P1 to 1000P*n* for realizing communication between the respective processes executed on the processors P1 to Pn.

On the other hand, process control on each of the processors P1 to Pn is possible without having OS service units 50P1 to 50P*n* as provided in the first example and the parallel processing communication units 400P1 to 400P*n* as provided in the first to third examples. The OSes 300P1 to 300P*n* for single processors on the respective processors P1 to Pn need not be the same OS but be different from each other.

In other words, the present example as well enables the inter-process communication function which is conventionally mounted on an OS for multiprocessors to be realized on a parallel processing system by an OS for single processors which operates an OS for single processors and an application on a multiprocessor, thereby enabling an inter-process communication function to be provided on a user-level.

Execution of each process in each of the processors P1 to Pn is made without requiring mutual exclusive control with other processor.

Inter-process communication within an individual processor P1~Pn and inter-process communication between the processors are conducted, as described in the third example, by using the semaphore system and the message queue system by means of the inter-process communication units 1000P1 to 1000P*n* to execute synchronization processing and data transmission and reception between the processes.

Description will be made of an inter-processor communication system according to the present invention applicable to such parallel processing systems by an OS for single processors as described above with reference to FIG. 30. The inter-processor communication system of the present invention is applicable to any of the parallel processing systems illustrated as the first to fourth examples.

While the above-described parallel processing systems of the third and the fourth examples are the inter-process communication systems which enable synchronization and data transmission and reception between processes by using the semaphore system and the message queue system, in which data is sent and received by using a queue information region ensured in a main storage device as a shared memory, the inter-processor communication system of the present invention is characterized in that inter-processor data transfer is enabled between tasks on other processors by using a communication function provided by an API of an OS for single processors without using such a shared memory, and without modifying an application.

Among APIs mounted on an OS for single processors, communication functions provided as a complicated API include a network (TCP/IP), for example, and communication functions provided as a simple API include semaphore and message queue systems, for example.

The inter-processor communication system of the present invention is allowed to use any of the communication functions.

Description will be here made of a first embodiment in which the inter-processor communication system of the present invention is applied to the parallel processing system shown as the third example in FIG. 17.

Figure 30:
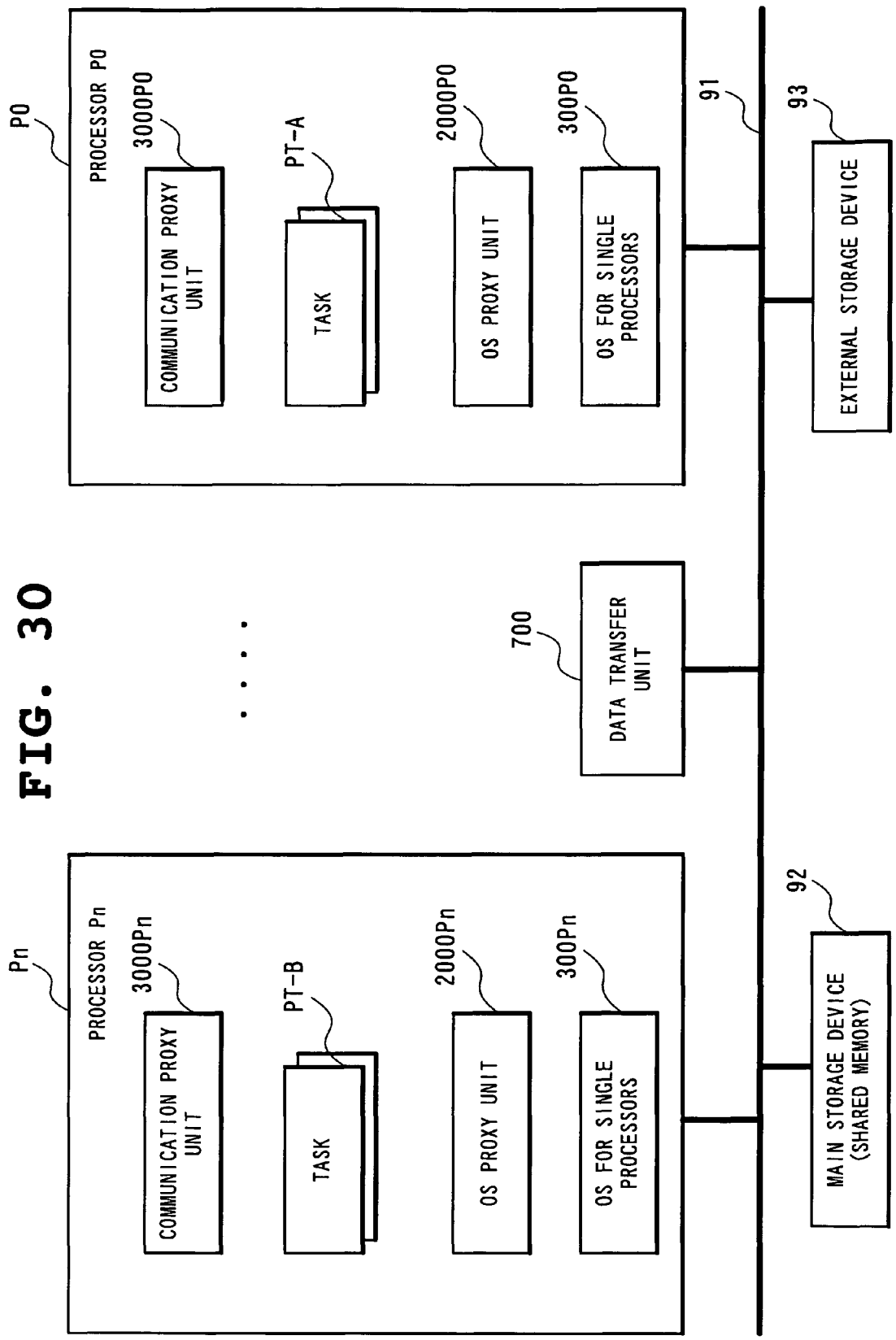
FIG. 30 is a block diagram showing a structure of an inter-processor communication system of a parallel processing system according to a first embodiment of the present invention.

As shown in FIG. 30, the inter-processor communication system according to the first embodiment is structured to include OS proxy units 2000P0~2000P*n* and communication proxy units 3000P0~3000P*n* in the processor P0 and the processors P1~Pn of the parallel processing system shown in FIG. 17, respectively, and a data transfer unit 700.

Here, description will be made only of the components necessary for inter-processor communication according to the present embodiment and description of the remaining components shown in FIG. 17 will be omitted for convenience' sake.

Each of the OS proxy units 2000P0~2000P*n* is mounted as a module (library) executed on the OS for single processors and on the processor P0 and has a function of receiving a call for a binding processing function from a task on its processor to request, as a proxy, the OS for single processors for binding processing and a function of transferring binding processing information to the communication proxy unit on other processor through the data transfer unit 700 in response to a call for a binding processing function from the task on its own processor.

Each of the communication proxy units 3000P0~3000P*n* is mounted as a module (task) executed on the OS for single processors and on the processor P0 and has a function of executing, as a proxy, inter-processor data transfer processing by a task on the processor and a function of requesting, for proxy reception, the OS for single processors of its own processor for binding processing.

Each of the communication proxy units 3000P0~3000P*n* is realized, for example, by a UNIX domain socket which is an inter-process communication system enabling tasks within its own processor to communicate only within its own processor.

Provision of the communication proxy units 3000P0~3000P*n* enables a task on each processor to conduct inter-processor data transfer with a task on other processor by the same processing operation as that of the data transfer between tasks within the processor.

Address information (e.g. IP address) of each of the processors P0~Pn is set in advance at the OS proxy units 2000P0~2000P*n* and the communication proxy units 3000P0~3000P*n*.

The data transfer unit 700 has a function of transferring data between the communication proxy units of the processors and can be realized by such communication systems as an INET domain of TCP/IP and a message queue.

In the present embodiment, mounting the communication proxy units 2000P0~2000P*n* and the OS proxy units 3000P0~3000P*n* enables data transfer between the processors to be realized, for example, in UNIX without modifying an application described in the UNIX domain communication system.

More specifically, only linking the OS proxy units 3000P0~3000P*n* as a library by a task (application) enables communication between the processors without modifying the application.

In the following, operation of inter-process data transfer in the inter-processor communication system according to the present embodiment will be described.

Here, the description will be made of operation in a case of conducting inter-processor data transfer from a task PT-B on the processor Pn to a task PT-A on the processor P0.

Figure 32:
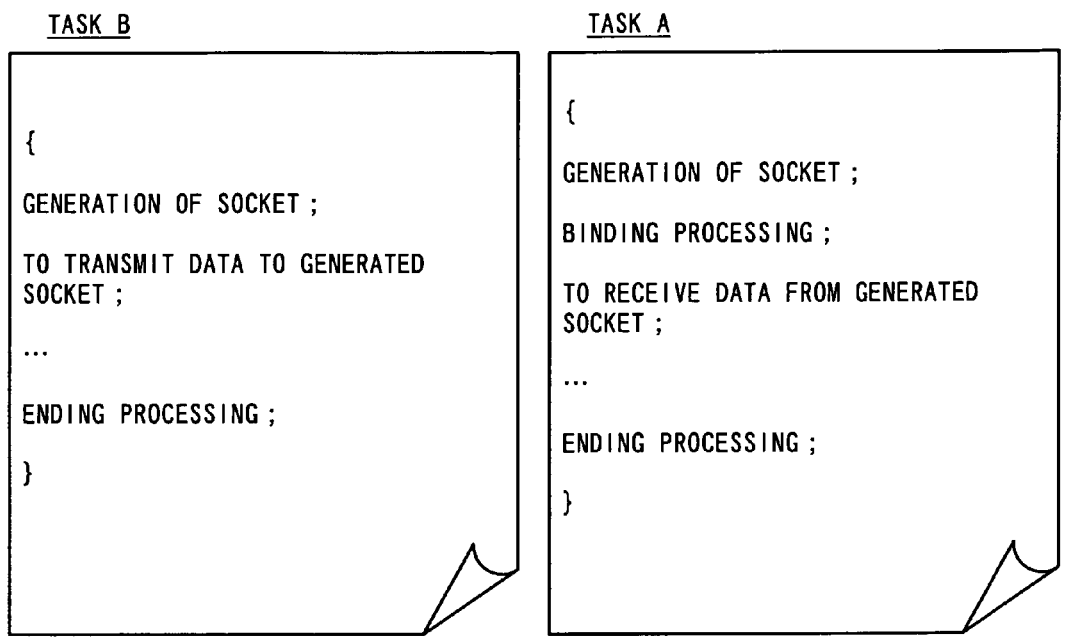
FIG. 32 is a diagram showing an outline of a program executed on a task in order to conduct inter-processor data transfer in the first embodiment of the present invention.

In this case, in each of the task PT-A on the processor P0 and the task PT-B on the processor Pn, such a program as shown in FIG. 32 is executed.

Executed are socket generation of setting, as an input/output unit of data transfer, address information as a combination of a processor number (address) of the processor and a port number, binding processing, transmission and reception of data to/from a generated socket and ending processing.

Execution of the above-described program on the task PT-A and the task PT-B leads to socket generation, which is then followed by execution of binding processing by each task PT-A.

Figure 31:
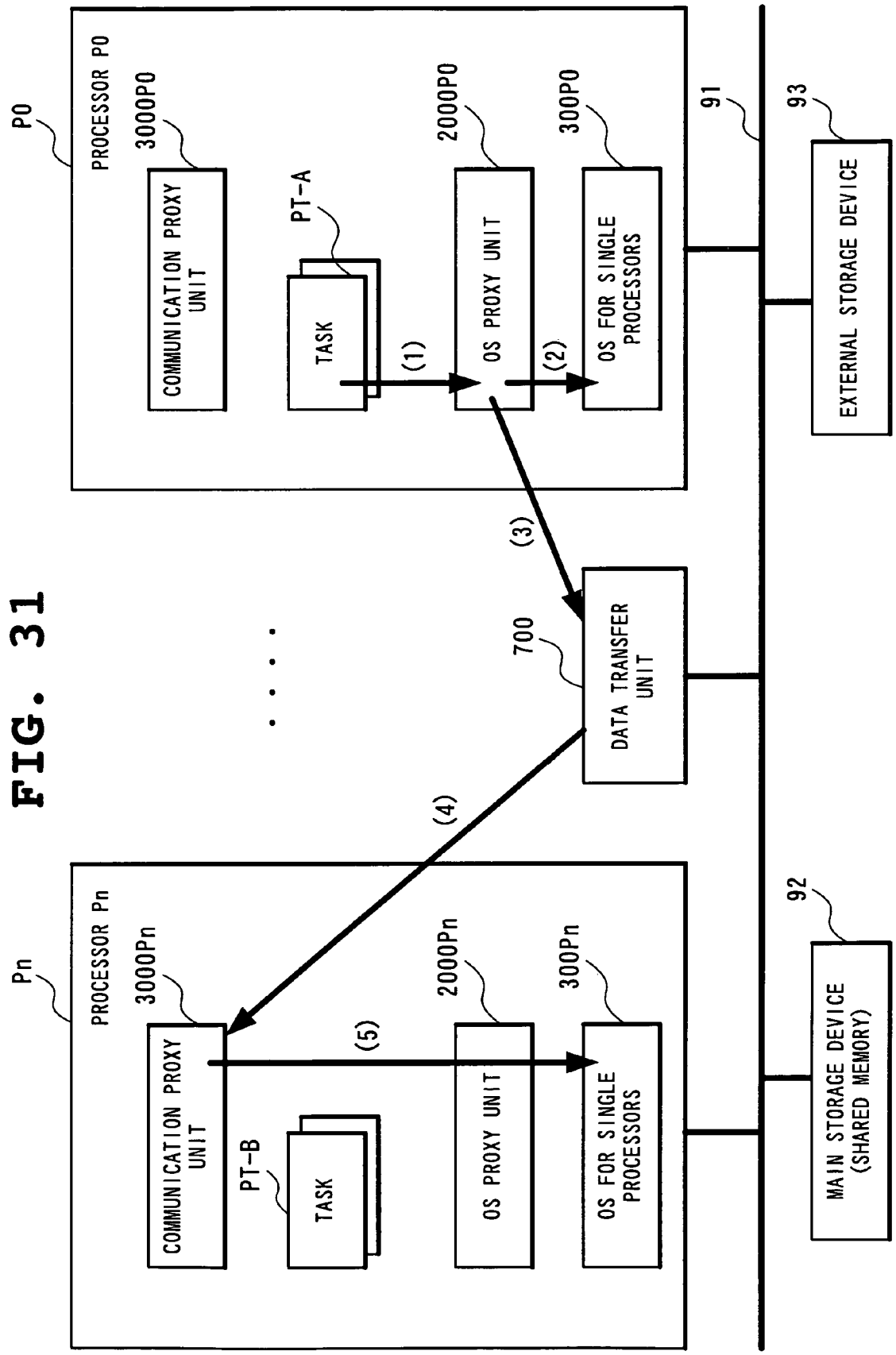
FIG. 31 is a diagram for use in explaining operation of binding processing according to the first embodiment of the present invention.

The binding processing by the task PT-A of the processor P0 will be described with reference to FIG. 31.

Here, binding processing denotes processing for relating a communication socket and a processor address (processor number), which is executed by a task by calling up a binding processing function for using a communication function (e.g. communication function by a UNIX domain socket) that the OS for single processors has.

The binding processing is processing conventionally executed in inter-task communication by a UNIX domain socket, for example.

(1) The task PT-A of the processor P0 calls up a binding processing function.

(2) The OS proxy unit 2000P0 of the processor P0 hooks the above-described calling of the binding processing function to request, as a proxy, an OS300P0 for single processors of the processor P0 for binding processing.

(3) The OS proxy unit 2000P0 of the processor P0 transfers binding processing information 800 to other processor by means of the data transfer unit 700. As a result, the binding processing information 800 is transferred by broadcasting to the communication proxy units 3000P1~3000Pn of other processors P1~Pn than the processor P0.

(4) The communication proxy unit 3000Pn of the processor Pn receives the binding processing information 800 to prepare for receiving data to the task PT-A of the processor P0 as a proxy of the task PT-A.

(5) For proxy reception, the communication proxy unit 3000Pn of the processor Pn requests an OS300Pn for single processors of the processor Pn for execution of the binding processing and enters a data reception state.

Figure 33:
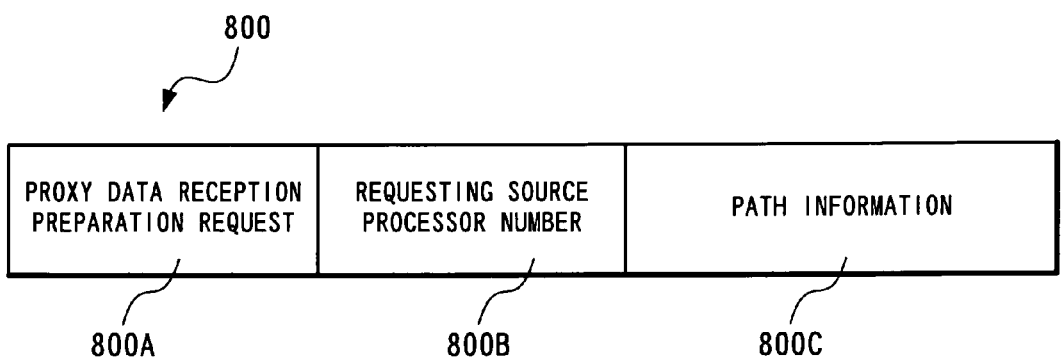
FIG. 33 is a diagram showing an example of arrangement of binding processing information transferred by the binding processing in the first embodiment of the present invention.

Example of arrangement of the binding processing information 800 transferred in the binding processing is shown in FIG. 33. In FIG. 33, the binding processing information 800 is composed of a proxy data reception preparation request 800A, a requesting source processor number 800B and path information 800C.

The proxy data reception preparation request 800A represents that the information requests execution of data reception as a proxy.

The requesting source processor number 800B is a number to be address information of a processor which will be required in inter-processor data transfer. Used as this number is a number which can uniquely identify a processor on the system.

The path information 800C is information indicative of a path to each task (data input/output path) managed by the OS for single processors in the processor. Used as the path information 800C is, for example, a file name handled by a task. The path information 800C corresponds, in the same processor, to each task which receives data sent through the relevant path.

In the foregoing description, the communication proxy unit 3000Pn of the processor Pn which has received the binding processing information 800 makes preparations for receiving data to the task PT-A by recognizing the path information 800C of the task PT-A included in the binding processing information.

Figure 34:
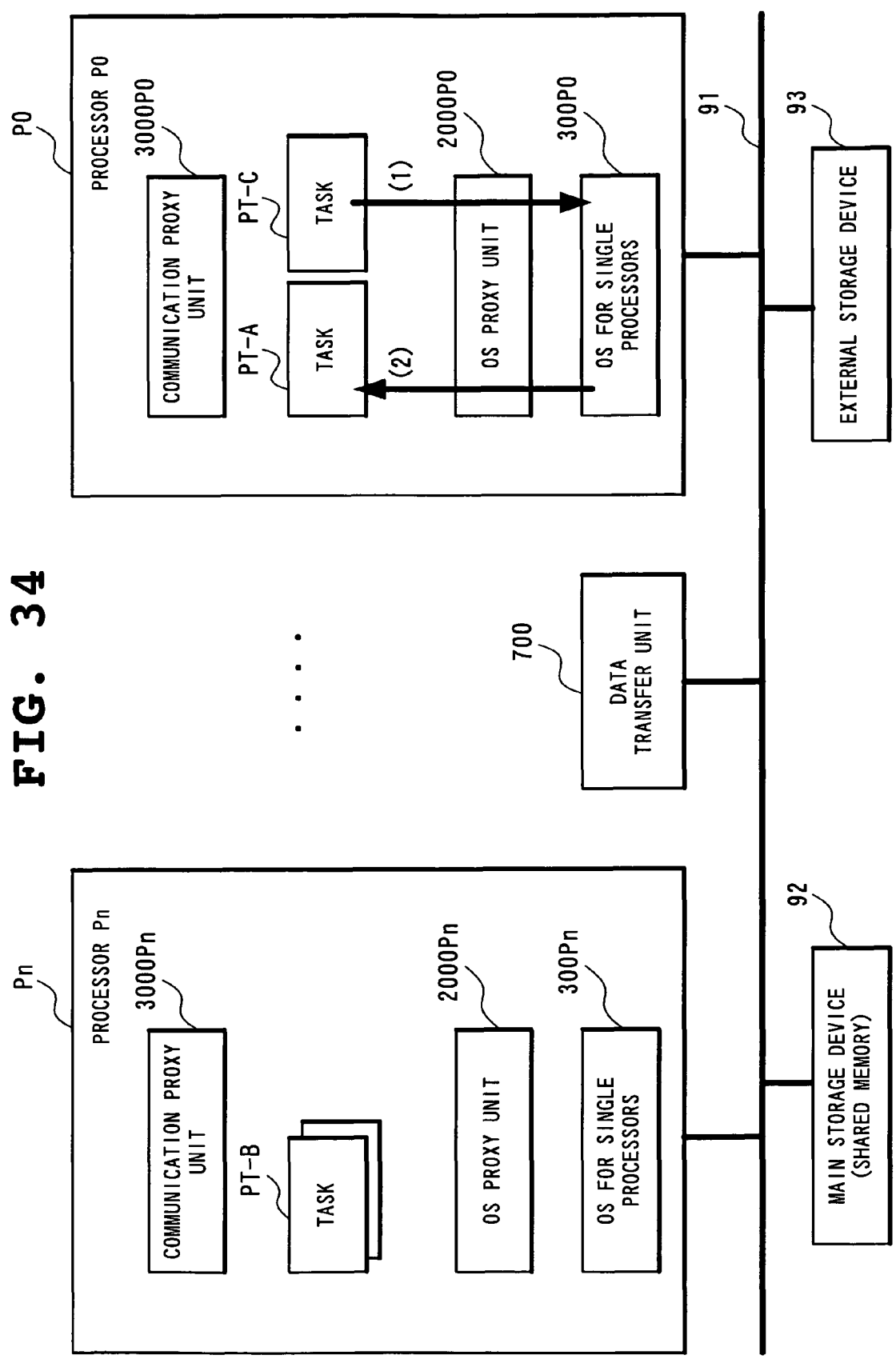
FIG. 34 is a diagram for use in explaining operation of data transfer within a processor in the first embodiment of the present invention.

Here, prior to description of inter-processor data transfer, data transfer between tasks within the same processor in the system of the present embodiment will be described with reference to FIG. 34.

As to the processing of transferring data between the tasks in the processor, the same processing will be executed as that conventionally executed.

Assume here that the task PT-A executes the binding processing in a manner as described above to be at the data reception state.

(1) A task PT-C of the processor P0 makes a request for transferring data related to the path information held by the task PT-A to the OS300P0 for single processors of the processor P0.

(2) The OS300P0 for single processors of the processor P0 transfers the data from the task PT-C to the task PT-A based on the data transfer request.

Figure 35:
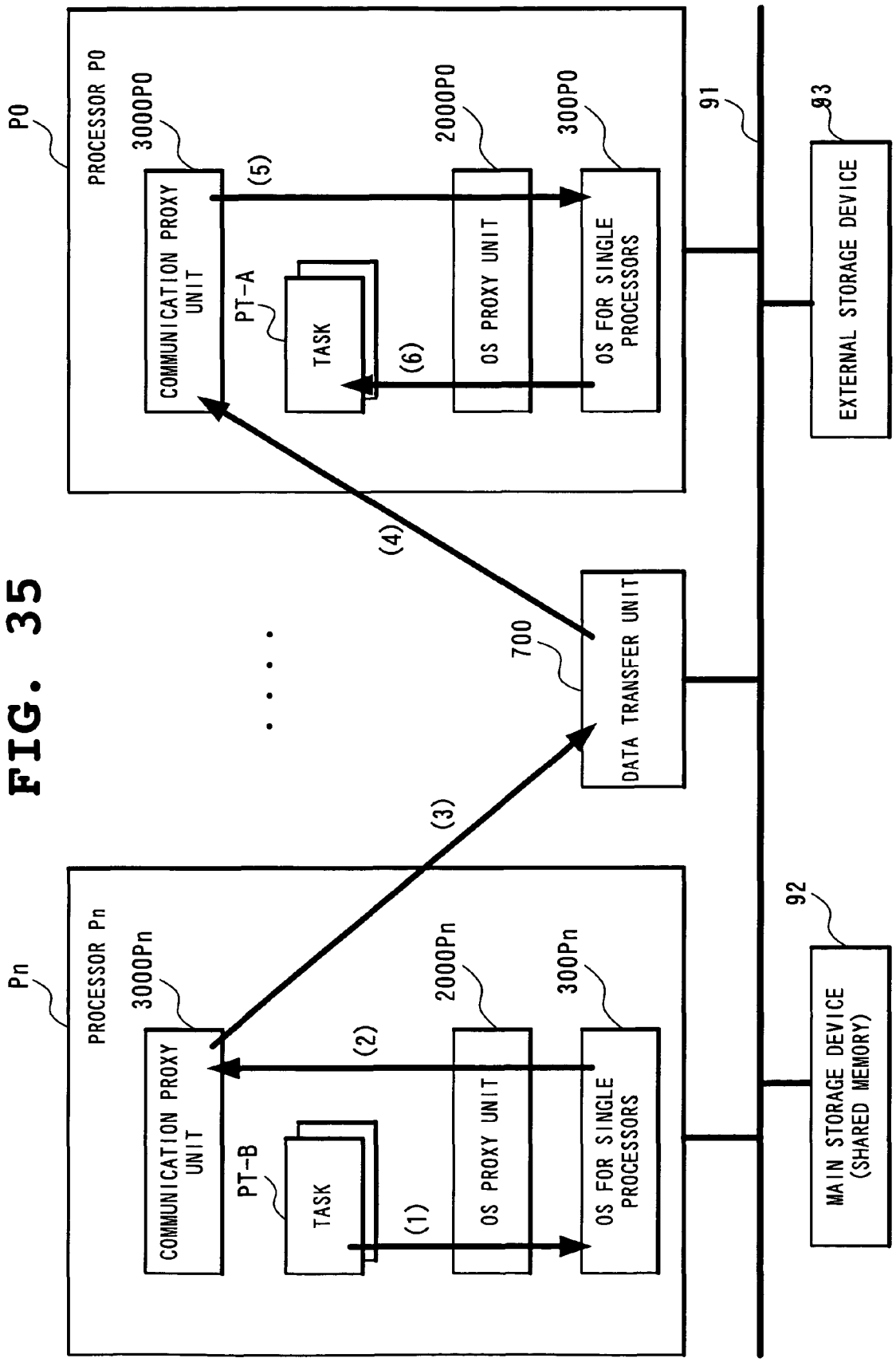
FIG. 35 is a diagram for use in explaining operation of data transfer between processors in the first embodiment of the present invention.

Next, processing of data transfer between the processors will be described with reference to FIG. 35.

In inter-processor data transfer, the communication proxy units 3000P0~3000Pn relay data transfer as a proxy of each task to execute data transfer from the task PT-B to the task PT-A between the processors.

(1) The task PT-B of the processor Pn makes a request for data transfer related to the path information of the task PT-A to the OS300Pn for single processors of the processor Pn.

(2) The OS300Pn for single processors of the processor Pn transfers data to the communication proxy unit 3000Pn of the processor Pn which receives, as a proxy, the data to be transferred to the task PT-A. In other words, the OS300Pn for single processors transfers the data considering the communication proxy unit 3000Pn as the task PT-A.

(3) The communication proxy unit 3000Pn of the processor Pn transfers data transfer information 810 through the data transfer unit 700 to the communication proxy unit 3000P0 of the processor P0 which is a requesting source indicated by the requesting source processor number 800B of the binding processing information 800.

(4) The communication proxy unit 3000P0 of the processor P0 receives the data transfer information 810 sent from the data transfer unit 700.

(5) The communication proxy unit 3000P0 of the processor P0 makes a request for transfer of data related to the path information of the task PT-A to the OS300P0 for the single processors of the processor P0.

(6) The OS300P0 for single processors of the processor P0 transfers the data whose data transfer is requested to the task PT-A.

Figure 36:
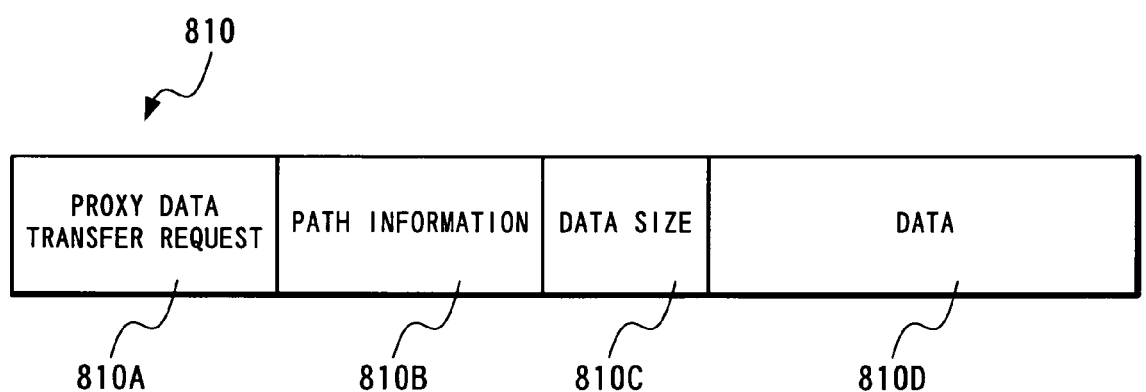
FIG. 36 is a diagram showing an example of arrangement of data transfer information transmitted in data transfer between processors in the first embodiment of the present invention.

Example of arrangement of the data transfer information 810 transmitted in the above-described inter-processor data transfer is shown in FIG. 36. In FIG. 36, the data transfer information 810 is composed of a proxy data transfer request 810A, path information 810B, a data size 810C and data 810D.

The proxy data transfer request 810A represents that the information requests data transfer.

The path information 810B designates path information of a task of a transfer destination to which data is transferred. In the above-described example, path information of the task PT-A notified by the above binding processing information 800 is designated.

The data size 810C designates a size of data contained in the information. The data 810D is a main body of data transferred based on the information.

Figure 37:
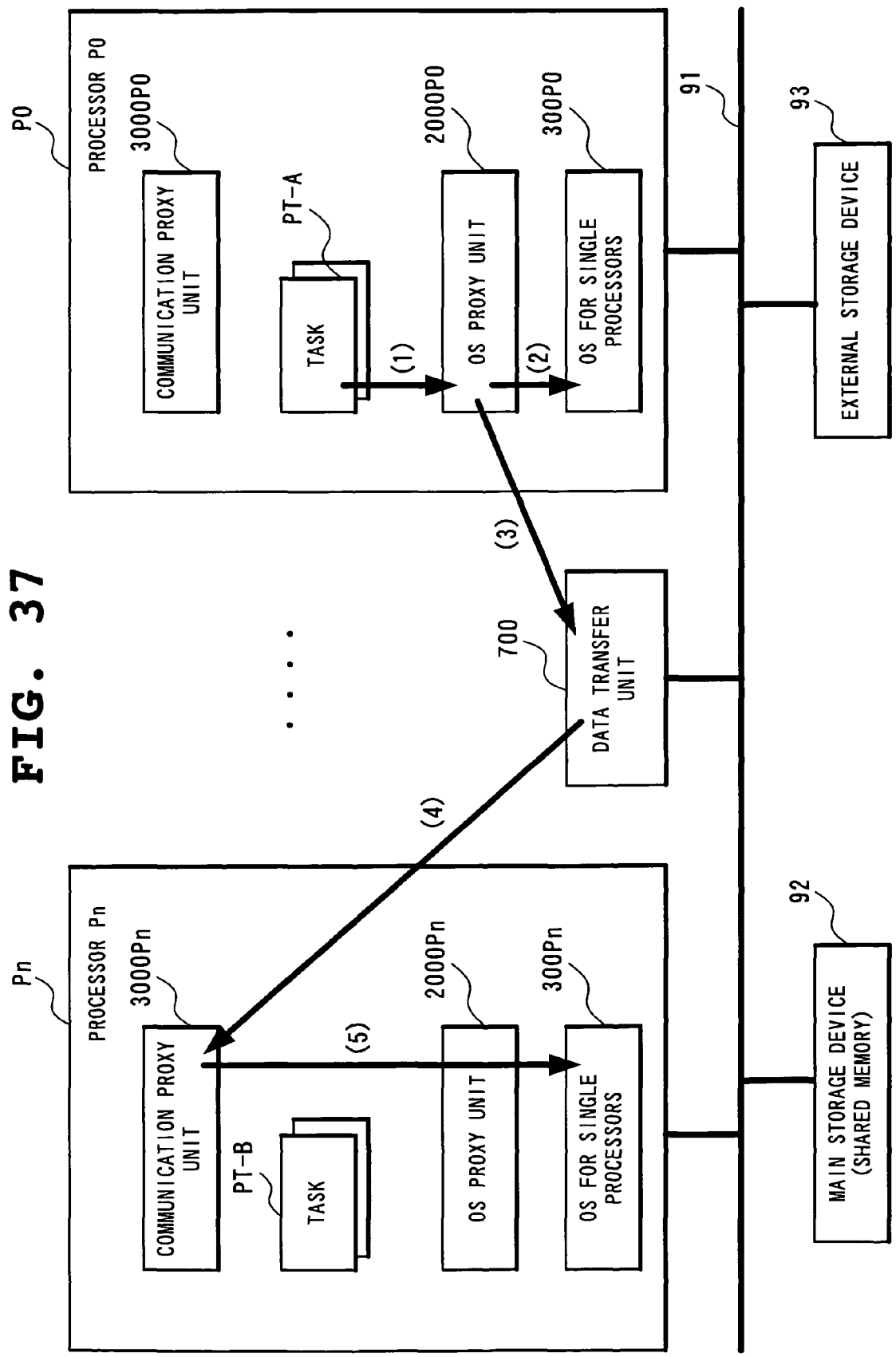
FIG. 37 is a diagram for use in explaining operation of ending processing according to the first embodiment of the present invention.

After the completion of the above-described data transfer processing, ending processing is executed. The ending processing will be described with reference to FIG. 37.

Here, the ending processing represents processing of closing a communication socket generated prior to data transfer.

(1) The task PT-A of the processor P0 calls up an ending processing function.

(2) The OS proxy unit 2000P0 of the processor P0 hooks the calling of the ending processing function and requests, as a proxy, the OS300P0 for single processors of the processor P0 for ending processing.

(3) When the request is for ending processing for closing a communication socket, the OS proxy unit 2000P0 of the processor P0 transfers ending processing information 820 through the data transfer unit 700. As a result, the ending processing information 820 is transferred by broadcasting to the communication proxy units 3000P1~3000P$n$ of other processors than the processor P0.

(4) The communication proxy unit 3000P$n$ of the processor Pn receives the ending processing information 820 to make preparations for ending the proxy processing of the task PT-A of the processor P0. As a result, path information related to the task PT-A notified by the above-described binding processing is abandoned.

(5) For ending the proxy processing, the communication proxy unit 3000P$n$ of the processor Pn requests the OS300P$n$ for single processors of the processor Pn for ending processing. As a result, the generated socket is closed.

Figure 38:
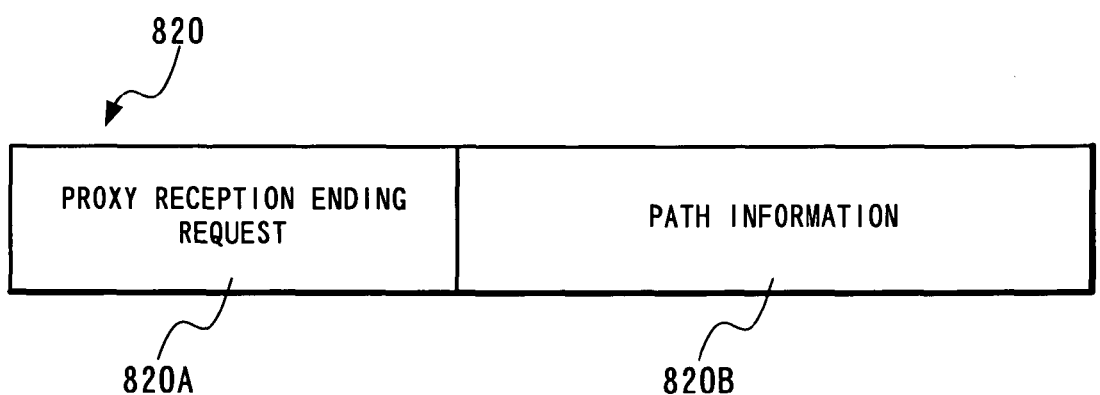
FIG. 38 is a diagram showing an example of arrangement of ending information transferred in the ending processing in the first embodiment of the present invention.

Example of arrangement of the ending processing information transferred in the above-described ending processing is shown in FIG. 38. In FIG. 38, the ending processing information 820 is composed of a proxy reception ending request 820A and path information 820B.

The proxy reception ending request 820A indicates that the information requests ending processing. The path information 820B designates path information whose proxy reception is to be ended. In the above-described case, path information of the task PT-A will be designated.

By the foregoing operation, inter-processor data transfer from the task PT-B on the processor Pn to the task PT-A on the processor P0 is completed.

Since for a task on each processor, the communication proxy unit 3000P0~3000P$n$ existing in a processor in which a task as its communication partner is executed conducts inter-processor data transfer as its own proxy, data transfer, even if it is conducted between the processors, can be realized with a task on other processor by the same processing as that of data transfer between tasks within the processor.

Accordingly, by using communication between tasks in a processor which is provided as a function of the OS for single processors, an application as a task operating on the OS for single processors enables inter-processor data transfer with a task on other processor. In other words, the application as a task operating on the OS for single processors requires no modification for conducting inter-processor data transfer.

Although in the above-described embodiment, the description has been made of a case of inter-process data transfer by the communication using a socket (e.g. UNIX domain socket), it is possible to use communication by a message queue in the parallel processing system of the third example shown in FIG. 22.

When using the communication by a message queue, the same processing can be realized by replacing a key (numerical value) with path information of a task, the binding processing with msgget processing and the ending processing with msgctl processing.

It is also possible to use communication by FIFO system and in such a case, the same processing can be realized by replacing a file name (character string) with path information, the binding processing with mkfifo processing and the ending processing with close processing.

The parallel processing systems according to each of the above-described examples can be realized by a parallel processing program having the respective functions of the parallel processing unit, the OS service unit, the control processing relay unit, the proxy unit and the inter-process communication unit, and the inter-processor communication system can be also realized by a program having the functions of the OS proxy unit and the communication proxy unit. These programs are stored in a recording medium such as a magnetic disk or a semiconductor memory and loaded from the recording medium into a computer processing device to control operation of the computer processing device, thereby realizing each of the above-described functions.

Although the present invention has been described with respect to the preferred examples and embodiment in the foregoing, the present invention is not always limited thereto but can be embodied in various forms within its technical idea.

According to the inter-processor communication system of the present invention, such excellent effects as described in the following can be attained.

First, since for a task on each processor, a communication proxy unit existing in a processor in which a task as its communication partner is executed conducts inter-processor data transfer as its own proxy, data transfer, even if it is conducted between the processors, can be realized with a task on other processor by the same processing as that of data transfer between tasks within the processor.

Accordingly, by using communication between tasks in a processor which is provided as a function of the OS for single processors, an application as a task operating on the OS for single processors enables inter-processor data transfer with a task on other processor. In other words, the application as a task operating on the OS for single processors requires no modification for conducting inter-processor data transfer.

Eliminating the need of modifying an application as mentioned above leads to eliminating the need of costs required for modification and for maintenance.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A parallel processing system comprising:
a plurality of processors and a storage device configured to execute at least an operating system (OS) designed for a single processor and an application to achieve parallel processing by said plurality of processors with respect to said application, wherein
said plurality of processors are logically divided into at least two groups, including at least a first processor group and a second processor group, and
units of work being parallel processible within said application on one processor of said first processor group are controlled as a new units of work on another processor of said second processor group, each processor includes an OS proxy unit and a communication proxy unit, wherein said OS proxy unit and said communication proxy unit are functionally independent of said OS designed for a single processor, wherein said OS proxy unit is configured to receive a system call to said OS related to binding or closing of a communication object issued from a server process on said first processor group or said second processor group, is configured to issue said system call to said OS designed for a single processor of said first processor group and said second processor group as a proxy, and is configured to notify reception of said system call to said communication proxy unit, any process on said first processor group or said second processor group directly issues system calls related to data transfer of said communication object other than said binding or closing of said communication object to said OS designed for a single processor, and said communication proxy unit is configured to execute starting processing and ending processing of communication between said OSes designed for a single processor of said first processor group and said second processor group based on notification of reception of said system call, is configured to receive data from or to send data to said OS by issuing data transfer system calls related to said communication object, and is configured to execute transfer processing for data transmitted and received in communication between said OSes designed for a single processor of said first processor group and said second processor group.

2. The parallel processing system as set forth in claim 1, wherein said communication proxy unit on a processor in which units of work which transmit data operate is configured to hold information about an address of the processor in which units of work which receive data operate, and is configured to receive data transferred from the units of work on said transmission side as proxy for the unit of work which receive data.

3. The parallel processing system as set forth in claim 1, wherein address information of a processor in which units of work which receive data operate and processing information containing information indicative of a path to a processor of the units work are transferred by multicasting to said communication proxy unit on another processor, and said communication proxy unit on said other processor is configured to receive said processing information to enter a state of receiving data as proxy for the units of work which receive data.

4. The parallel processing system as set forth in claim 1, wherein said communication proxy unit on a processor in which units of work which transmit data operate, is configured to receive data transmitted from said OS designed for a single processor as proxy for units of work which receive data in response to a request from units of work which transmit data, and is configured to transmit the received data to said communication proxy unit on a processor which receives data through a predetermined data transfer unit which executes communication among the processors, and said communication proxy unit on the processor which receives data which has received said data is configured to request the processor running said OS designed for a single processor which receives data to transfer data to said units of work.

5. The parallel processing system as set forth in claim 1, wherein said communication proxy unit is configured to process data transfer between units of work spreading over the processors by proxy by a communication system using a socket.

6. The parallel processing system as set forth in claim 1, wherein said communication proxy unit is configured to process data transfer between units of work spreading over the processors by proxy by a communication system using a message queue or FIFO.

7. The parallel processing system as set forth in claim 5, comprising said OS proxy unit is configured to hook calling of a binding processing function made by the units of work which receive data and requests said OS designed for a single processor for binding processing by proxy, and said OS proxy unit is configured to notify binding processing information containing path information of the units of work which receives data by broadcasting to said communication proxy unit of other processor.

8. The parallel processing system as set forth in claim 5, wherein said communication proxy unit is configured to communicate with the units of work in a processor to which said units belongs based on an inter-process communication system enabling communication only within the processor to which said units belong.

9. The parallel processing system as set forth in claim 8, wherein said inter-process communication system is configured to enable communication only within the processor to which said units belong comprises an inter-process domain socket.

10. The parallel processing system as set forth in claim 1, wherein said OS proxy unit is configured to notify the proxy processing only of the generation and end of a communication resource.

11. The parallel processing system as set forth in claim 1, wherein in a first processor, data relating to a unit of work is passed from said OS designed for a single processor to the communication proxy unit, which is configured to then pass the data relating to a unit of work to the communication proxy unit on another processor which receives the data, and in the other processor, the communication proxy unit is configured to pass the received data to said OS designed for a single processor on the other processor, and said OS designed for a single processor on the said other processor processes the unit of work.

12. The parallel processing system as set forth in claim 11, wherein said application is an application designed for single processor systems.

13. The parallel processing system as set forth in claim 11, wherein communication between said communication proxy unit of different processors is by sockets, a message queue, or a FIFO.

14. The parallel processing system as set forth in claim 1, wherein the units of work being parallel processible within said application on one processor of said first processor group are controlled as the new units of work on a processor of said second processor group.

15. A parallel processing method for operating at least an operating system (OS) designed for a single processor and an application on a plurality of processors and for achieving parallel processing by the plurality of processors with respect to the application, comprising the steps of
   logically dividing said plurality of processors into at least two groups, including at least a first processor group and a second processor group, and
   controlling units of work within the application that are parallel processible on one processor of the first processor group as new units of work on another processor of the plurality of processors, thereby executing parallel processing by the second processor group with respect to the application,
   each processor including an OS proxy program and a communication proxy program, wherein the OS proxy program and the communication proxy program are functionally independent of the OS designed for a single processor,
   the OS proxy program receiving a system call to said OS related to binding or closing of a communication object issued from a server process on said first processor group or said second processor group, issues said system call to said OS designed for a single processor of said first processor group and said second processor group as a proxy, and notifying reception of said system call to said communication proxy unit,
   any process on said first processor group or said second processor group directly issues system calls related to data transfer of said communication object other than said binding or closing of said communication object to said OS designed for a single processor, and
   the communication proxy program executes starting processing and ending processing of communication between said OSes designed for a single processor of said first processor group and said second processor group based on notification of reception of said system call, receives data from or sends data to said OS by issuing data transfer system calls related to said communication object, and executes transfer processing for data transmitted and received in communication between said OSes designed for a single processor of said first processor group and said second processor group.

16. The parallel processing method as set forth in claim 15, wherein
   said communication proxy program has a function of processing data transfer between units of work spreading over the processors by proxy by a communication system using a socket.

17. The parallel processing method as set forth in claim 15, wherein said communication proxy program processes data transfer between units of work spreading over the processors by proxy by a communication system using a message queue or FIFO.

18. The parallel processing method as set forth in claim 16, wherein
   said OS proxy program hooks calling of a binding processing function made by the units of work which receives data and requests said OS designed for a single processor for binding processing by proxy, and
   said OS proxy program notifies binding processing information containing path information of the units of work which receives data by broadcasting to said communication proxy function of other processor.

19. The parallel processing method as set forth in claim 16, wherein
   said communication proxy function communicates with the units of work in a processor to which said units belong based on an inter-process communication system enabling communication only within the processor to which said units belong.

20. The parallel processing method as set forth in claim 19, wherein
   said inter-process communication system enabling communication only within the processor to which said units belong comprises an inter-process domain socket.

21. The parallel processing method as set forth in claim 15, wherein said OS proxy program notifies the proxy processing only of the generation and end of a communication resource.

22. The parallel processing method as set forth in claim 15, wherein said controlling step comprises controlling said units of work that are parallel processible within said application on one processor of said first processor group are controlled as the new units of work on a processor of said second processor group, thereby executing parallel processing by said plurality of processors with respect to said application.

* * * * *